US009661215B2

(12) United States Patent
Sivan

(10) Patent No.: US 9,661,215 B2
(45) Date of Patent: May 23, 2017

(54) SYSTEM AND METHOD FOR CONTROLLING A CAMERA BASED ON PROCESSING AN IMAGE CAPTURED BY OTHER CAMERA

(71) Applicant: SnapAid Ltd., Tel Aviv (IL)

(72) Inventor: Ishay Sivan, Tel-Aviv (IL)

(73) Assignee: SNAPAID LTD., Tel Aviv (IL)

( * ) Notice: Subject to any disclaimer, the term of this patent is extended or adjusted under 35 U.S.C. 154(b) by 0 days.

(21) Appl. No.: 15/028,852

(22) PCT Filed: Apr. 19, 2015

(86) PCT No.: PCT/IL2015/050413
§ 371 (c)(1),
(2) Date: Apr. 12, 2016

(87) PCT Pub. No.: WO2015/162605
PCT Pub. Date: Oct. 29, 2015

(65) Prior Publication Data
US 2016/0261793 A1    Sep. 8, 2016

Related U.S. Application Data

(60) Provisional application No. 61/982,482, filed on Apr. 22, 2014, provisional application No. 62/060,020, (Continued)

(51) Int. Cl.
*H04N 5/232*    (2006.01)
*H04N 19/137*    (2014.01)
(Continued)

(52) U.S. Cl.
CPC ..... *H04N 5/23219* (2013.01); *G06K 9/00228* (2013.01); *H04N 5/238* (2013.01);
(Continued)

(58) Field of Classification Search
None
See application file for complete search history.

(56) References Cited

U.S. PATENT DOCUMENTS

| 4,047,187 A | 9/1977 | Mashimo et al. |
| 4,248,123 A | 2/1981 | Bunger et al. |

(Continued)

FOREIGN PATENT DOCUMENTS

| CN | 101815174 A | 8/2010 |
| CN | 103051795 A | 3/2013 |

(Continued)

OTHER PUBLICATIONS

Cha Zhang and Zhengyou Zhang, "A Survey of Recent Advances in Face Detection", published by Microsoft Research on Jun. 2010 (17 pages).

(Continued)

*Primary Examiner* — James Hannett
(74) *Attorney, Agent, or Firm* — May Patents Ltd. c/o Dorit Shem-Tov

(57) ABSTRACT

A device comprises a first digital camera having a first center line of sight and a second digital camera having a second center line of sight that is parallel and opposing the first camera. A method for controlling the first camera based on estimating the angular deviation between a person gaze direction and the line of sight of the first digital camera. A human face is detected in an image captured as an image file by the second digital camera, using a face detection algorithm. An angular deviation α is estimated, defined between the second center line of sight and an imaginary line from the second camera to the detected human face based on the captured image, and an angular deviation β is estimated, defined between the imaginary line from the second camera to the detected face and the human face gaze direction based on the captured image.

96 Claims, 18 Drawing Sheets

Related U.S. Application Data filed on Oct. 6, 2014, provisional application No. 62/085,284, filed on Nov. 27, 2014, provisional application No. 62/131,854, filed on Mar. 12, 2015, provisional application No. 62/143,117, filed on Apr. 5, 2015.

(51) Int. Cl.

| | | |
|---|---|---|
| *H04N 19/597* | (2014.01) | |
| *G06K 9/00* | (2006.01) | |
| *H04N 5/235* | (2006.01) | |
| *H04N 5/238* | (2006.01) | |

(52) U.S. Cl.
CPC ....... *H04N 5/2353* (2013.01); *H04N 5/23293* (2013.01); *H04N 19/137* (2014.11); *H04N 19/597* (2014.11)

(56) References Cited

U.S. PATENT DOCUMENTS

| | | |
|---|---|---|
| 4,317,991 A | 3/1982 | Stauffer |
| 4,367,027 A | 1/1983 | Stauffer |
| RE31,370 E | 9/1983 | Mashimo et al. |
| 4,496,149 A | 1/1985 | Schwartzberg |
| 4,516,260 A | 5/1985 | Breedlove et al. |
| 4,638,364 A | 1/1987 | Hiramatsu |
| 4,796,891 A | 1/1989 | Milner |
| 4,840,602 A | 6/1989 | Rose |
| 4,968,255 A | 11/1990 | Lee et al. |
| RE33,682 E | 9/1991 | Hiramatsu |
| 5,138,459 A | 8/1992 | Roberts et al. |
| 5,291,234 A | 3/1994 | Shindo et al. |
| 5,386,103 A | 1/1995 | DeBan et al. |
| 5,402,170 A | 3/1995 | Parulski et al. |
| 5,488,429 A | 1/1996 | Kojima et al. |
| 5,578,755 A | 11/1996 | Offenberg |
| 5,638,136 A | 6/1997 | Kojima et al. |
| 5,642,431 A | 6/1997 | Poggio et al. |
| 5,710,833 A | 1/1998 | Moghaddam et al. |
| 5,724,456 A | 3/1998 | Boyack et al. |
| 5,781,650 A | 7/1998 | Lobo et al. |
| 5,812,193 A | 9/1998 | Tomitaka et al. |
| 5,818,975 A | 10/1998 | Goodwin et al. |
| 5,835,616 A | 11/1998 | Lobo et al. |
| 5,870,138 A | 2/1999 | Smith et al. |
| 5,962,786 A | 10/1999 | Le Traon et al. |
| 5,978,519 A | 11/1999 | Bollman et al. |
| 5,987,154 A | 11/1999 | Gibbon et al. |
| 5,991,456 A | 11/1999 | Rahman et al. |
| 6,097,470 A | 8/2000 | Buhr et al. |
| 6,101,271 A | 8/2000 | Yamashita et al. |
| 6,128,397 A | 10/2000 | Baluja et al. |
| 6,148,092 A | 11/2000 | Qian |
| 6,151,073 A | 11/2000 | Steinberg et al. |
| 6,188,777 B1 | 2/2001 | Darrell et al. |
| 6,192,149 B1 | 2/2001 | Eschbach et al. |
| 6,249,315 B1 | 6/2001 | Holm |
| 6,263,113 B1 | 7/2001 | Abdel-Mottaleb et al. |
| 6,268,939 B1 | 7/2001 | Klassen et al. |
| 6,282,317 B1 | 8/2001 | Luo et al. |
| 6,301,370 B1 | 10/2001 | Steffens et al. |
| 6,332,033 B1 | 12/2001 | Qian |
| 6,393,148 B1 | 5/2002 | Bhaskar |
| 6,404,900 B1 | 6/2002 | Qian et al. |
| 6,407,777 B1 | 6/2002 | DeLuca |
| 6,421,468 B1 | 7/2002 | Ratnakar et al. |
| 6,438,264 B1 | 8/2002 | Gallagher et al. |
| 6,456,732 B1 | 9/2002 | Kimbell et al. |
| 6,459,436 B1 | 10/2002 | Kumada et al. |
| 6,473,199 B1 | 10/2002 | Gilman et al. |
| 6,501,857 B1 | 12/2002 | Gotsman et al. |
| 6,504,942 B1 | 1/2003 | Hong et al. |
| 6,504,951 B1 | 1/2003 | Luo et al. |
| 6,516,154 B1 | 2/2003 | Parulski et al. |
| 6,526,161 B1 | 2/2003 | Yan |
| 6,527,611 B2 | 3/2003 | Cummings |
| 6,670,212 B2 | 12/2003 | McNie et al. |
| 6,940,545 B1 | 9/2005 | Ray et al. |
| 7,110,575 B2 | 9/2006 | Chen et al. |
| 7,315,630 B2 | 1/2008 | Steinberg et al. |
| 7,317,815 B2 | 1/2008 | Steinberg et al. |
| 7,326,866 B2 | 2/2008 | Kelley, Jr. et al. |
| 7,412,077 B2 | 8/2008 | Li et al. |
| 7,414,186 B2 | 8/2008 | Scarpa et al. |
| 7,432,952 B2 | 10/2008 | Fukuoka |
| 7,466,844 B2 | 12/2008 | Ramaswamy et al. |
| 7,466,866 B2 | 12/2008 | Steinberg |
| 7,508,961 B2 | 3/2009 | Chen et al. |
| 7,617,729 B2 | 11/2009 | Axelrod et al. |
| 7,716,985 B2 | 5/2010 | Zhang et al. |
| 7,774,155 B2 | 8/2010 | Sato et al. |
| 7,892,876 B2 | 2/2011 | Mehregany |
| 8,077,914 B1 | 12/2011 | Kaplan |
| 8,131,118 B1 | 3/2012 | Jing et al. |
| 8,218,832 B2 | 7/2012 | Inada |
| 8,244,053 B2 | 8/2012 | Steinberg et al. |
| 8,265,348 B2 | 9/2012 | Steinberg et al. |
| 8,285,067 B2 | 10/2012 | Steinberg et al. |
| 8,558,921 B2 | 10/2013 | Walker et al. |
| 8,614,674 B2 | 12/2013 | Binder |
| 8,687,880 B2 | 4/2014 | Wei et al. |
| 8,700,626 B2 | 4/2014 | Bedingfield |
| 8,781,162 B2 | 7/2014 | Zhu et al. |
| 8,873,850 B2 | 10/2014 | Krishnaswamy |
| 8,913,791 B2 | 12/2014 | Datta et al. |
| 2003/0156214 A1 | 8/2003 | Guimaraes et al. |
| 2004/0066970 A1 | 4/2004 | Matsugu |
| 2005/0196018 A1* | 9/2005 | Toyama ............ G06K 9/00228 382/103 |
| 2006/0268302 A1 | 11/2006 | Chen et al. |
| 2007/0242877 A1 | 10/2007 | Peters et al. |
| 2007/0256337 A1 | 11/2007 | Segan |
| 2008/0212831 A1 | 9/2008 | Hope |
| 2009/0141973 A1 | 6/2009 | Wallack et al. |
| 2009/0154910 A1 | 6/2009 | Weinberg et al. |
| 2009/0304232 A1 | 12/2009 | Tsukizawa |
| 2010/0123805 A1 | 5/2010 | Craig et al. |
| 2010/0268772 A1 | 10/2010 | Romanek et al. |
| 2011/0096180 A1 | 4/2011 | McCloskey et al. |
| 2011/0116712 A1 | 5/2011 | Matsuhira |
| 2011/0157221 A1 | 6/2011 | Ptucha et al. |
| 2012/0086847 A1 | 4/2012 | Foster |
| 2012/0155753 A1 | 6/2012 | Masato |
| 2012/0169596 A1 | 7/2012 | Zhuang |
| 2012/0182447 A1 | 7/2012 | Gabay |
| 2012/0213445 A1 | 8/2012 | Luu et al. |
| 2012/0219236 A1 | 8/2012 | Ali et al. |
| 2012/0249768 A1 | 10/2012 | Binder |
| 2012/0278705 A1 | 11/2012 | Yang et al. |
| 2012/0293635 A1 | 11/2012 | Sharma et al. |
| 2013/0050507 A1 | 2/2013 | Syed et al. |
| 2013/0063538 A1 | 3/2013 | Hubner et al. |
| 2013/0188834 A1 | 7/2013 | Ebisawa |
| 2013/0201316 A1 | 8/2013 | Binder et al. |
| 2014/0050367 A1 | 2/2014 | Chen et al. |
| 2014/0085451 A1* | 3/2014 | Kamimura ......... H04N 5/23219 348/78 |
| 2014/0119655 A1 | 5/2014 | Liu et al. |
| 2014/0139667 A1 | 5/2014 | Kang |
| 2014/0184854 A1 | 7/2014 | Musatenko |
| 2014/0226864 A1 | 8/2014 | Venkatraman et al. |
| 2016/0210503 A1* | 7/2016 | Yin ..................... G06F 3/00 |

FOREIGN PATENT DOCUMENTS

| | | |
|---|---|---|
| CN | 103747183 A | 4/2014 |
| JP | 2006050494 A | 2/2006 |
| JP | 2007208922 A | 8/2007 |
| JP | 2008033200 A | 2/2008 |
| WO | 2013044983 A1 | 4/2013 |

(56) References Cited

FOREIGN PATENT DOCUMENTS

| WO | 2014064690 A1 | 5/2014 |
|---|---|---|
| WO | 2015022700 A2 | 2/2015 |

OTHER PUBLICATIONS

Paul Viola and Michael Jones, "Robust Real-Time Face Detection", International Journal of Computer Vision 2004 pp. 137-154 (18 pages).
Paul Viola and Michael Jones, "Rapid Object Detection using a Boosted Cascade of Simple Features", Accepted Conference on Computer Vision and Pattern Recognition 2001 (9 pages).
Ahmed Elgammal, Crystal Muang, and Dunxu Hu from the Department of Computer Science, Rutgers University, "Skin Detection—a Short Tutorial", Springer-Verlag Berlin Heidelberg 2009 (10 pages).
Chelsia Amy Doukim, Jamal Ahmed Dargham, and Ali Chekima of the School of Engineering & Information Technology, University Malaysia Sabah, "Comparison of Three Colour Spaces in Skin Detection", Borneo Science 24: Mar. 2009 (7 pages).
Dilip K. Prasad, "Survey of the Problem of Object Detection in Real Images" published International Journal of Image Processing (IJIP), vol. 6, Issue 6—2012 (26 pages).
A. Ashbrook and N. A. Thacker, "Tutorial: Algorithms for 2-dimensional Object Recognition", published by the Imaging Science and Biomedical Engineering Division of the University of Manchester, Tina Memo No. 1996-003, Jan. 12, 1998 (15 pages).
Computer Vision: Mar. 2000 Chapter 4 entitled: "Pattern Recognition Concepts" (38 pages).
Isabelle Guyon, et al., "Hands-On Pattern Recognition—Challenges in Machine Learning, vol. 1", published by Microtome Publishing, 2011 (ISBN-13:978-0-9719777-1-6) (482 pages).
Richard Taylor, "Interpretation of the Correlation Coefficient: A Basic Review", JDMS 1:3539, Jan./Feb. 1990 (5 pages).
Dr. Rick Yount, Chapter 22: "Correlation Coefficients", 4th ed., 2006 (10 pages).
NASA Technical Note (NATA TN D-6374), "A Least-Square-Distance Curve-Fitting Technique" by John Q. Howell, Jul. 1971 (27 pages).
Data-sheet LIS302DL STMicroelectronics NV, 'MEMS motion sensor 3-axis—±2g/±8g smart digital output "piccolo" accelerometer', Rev. 4, Oct. 2008 (42 pages).
Data-sheet 'Datasheet SQ-SEN-200 Omnidirectional Tilt and Vibration Sensor' Updated Aug. 3, 2009, available from SignalQuest, Inc. of Lebanon, NH, USA (6 pages).
Lite-On Electronics, Inc., Publication BNS-OD-C131/A4 downloaded Mar. 2011 (6 pages).
YMF721 OPL4-ML2 FM + Wavetable Synthesizer LSI available from Yamaha Corporation described in YMF721 Catalog No. LSI-4MF721A20, Jul. 10, 1997 (41 pages).
Data-sheet "Programmable Single-/Dual-/Triple-Tone Gong, SAE 800, Siemens semiconductor Group, 09.94" (14 pages).
Data sheet "36 Melody Music Generator", Holtek HT3834 CMOS VLSI Integrated Circuit (IC), available from Holtek Semiconductor Inc., Rev. 1.00 dated Nov. 2, 2006 (16 pages).
Data sheet "PF226-04" EPSON 7910 series 'Multi-Melody IC' available from Seiko-Epson Corporation, Electronic Devices Marketing Division located in Tokyo, Japan, dated 1998 (5 pages).
International Search Report of PCT/IL2015/050413 dated Oct. 26, 2015.
Howell, A Least Square Distance Curve Fitting Technique, 1971 (27 pages).
Written Opinion of PCT/IL2015/050413 dated Oct. 26, 2015.
Standard Microsystems Corporation (SMSC) data-sheet "LAN91C111 10/100 Non-PCI Ethernet Single Chip Mac + PHY" Data-Sheet, Rev. 15 (Feb. 20, 2004) (127 pages).
Robert D. Doverspike, K.K. Ramakrishnan, and Chris Chase, "Guide to Reliable Internet Services and Applications", Chapter 2: "Structural Overview of ISP Networks", published 2010 (ISBN: 978-1-84882-827-8) (76 pages).
Al Bovik, "Handbook of Image & Video Processing", by Academic Press, ISBN: 0-12-119790-5, 2000 (500 pages).
IETF RFC 5013, "The Dublin Core Metadata Element Set", Aug. 2007 (9 pages).
IETF RFC 2731, "Encoding Dublin Core Metadata in HTML", Dec. 1999 (22 pages).
Andrew Oran and Vince Roth, "Color Space Basics" published May 2012, Issue 4 of the journal 'The Tech Review' by the Association of Moving Image Archivists (22 pages).
Adrian Ford and Alan Roberts, "Colour Space Conversions", Aug. 11, 1998 (31 pages).
Philippe Colantoni and Al, "Color Space Transformations", dated 2004 (28 pages).
Danny Pascale, "A Review of RGB Color Spaces . . . from xyY to R'G'B'", published by the BabelColor Company, (Revised Oct. 6, 2003) (35 pages).
Gnanatheja Rakesh and Sreenivasulu Reddy of the University College of Engineering, Tirupati, "YCoCg color Image Edge detection", International Journal of Engineering Research and Applications (IJERA) ISSN: 2248-9622 vol. 2, Issue 2, Mar.-Apr. 2012, pp. 152-156 (5 pages).
Douglas A. Kerr, "The HSV and HSL Color Models and the Infamous Hexcones", Issue 3, May 12, 2008 (30 pages).
J. L. Baron, D.J. Fleet, and S.S. Beauchemin, "Performance of Optical Flow Techniques", IJCV 12:1, pp. 43-77, 1994 (60 pages).
Joseph Ciaglia et al., "Absolute Beginner's Guide to Digital Photography", Que Publishgin (ISBN—0-7897-3120-7), published on Apr. 2004 (381 pages).
Daniel Kormann, Peter Dunker, and Ronny Paduscheck, all of the Fraunhofer Institute for Digital Media in Ilmenau, Germany, "Automatic Rating and Selection of Digital Photographs", Springer-Verlag Berlin Heidelberg 2009 (4 pages).
Pallabi Saikia, Gollo Janam and Margaret Kathing, "Face Detection using Skin Colour Model and distance between Eyes", the International Journal of Computing, Communication and Networking (IJCCN), vol. 1, No. 3, Nov.-Dec. 2012 (ISSN 2319-2720) (4 pages).
Amanpreet Kaur and B.V. Kranthi, both of Lovely Professional University, Jalandhar, India, "Comparison between YCbCr Color Space and CIELab Color Space for Skin Color Segmentation", published by the International Journal of Applied Information Systems (IJAIS) vol. 3, No. 4, Jul. 2012 (ISSN: 2249-0868), (4 pages).
Elli Angelopoulou, "The Reflectance Spectrum of Human Skin", University of Pennsylvania, Department of Computer & Information Science Technical Report MS-CIS-99-29 (Dec. 20, 1999) (16 pages).
Tim Weyrich et al., "Analysis of Human Faces Using a Measurement-Based Skin Reflectance Model", published in ACM Transactions on Graphics (TOG), ISSN:0730-0301, vol. 25, Issue 3, pp. 1013-1024, Jul. 2006 (ACM Press) (12 pages).
Erik Murphy-Chutorian and Mohan Trivedi, "Head Pose Estimation in Computer Vision: A Survey", IEEE Transaction on Pattern Analysis and Machine Intelligence published 2008 (Digital Object Identifier 10.1109/TPAMI.2008.106) (20 pages).
User's Manual Revision 'Natural Speech & Complex Sound Synthesizer', available from Magnevation LLC, 1.0 Jul. 27, 2004 (17 pages).
Jian-Gang Wang, Eric Sung, and Ronda Venkateswarlu, all of Singapore, "Eye Gaze Estimation from a Single Image of One Eye", published in Proceedings of the Ninth IEEE International Conference on Computer Vision (ICCV 2003) (8 pages).
Dinh Quang Tri, Van Tan Thang, Nguyen Dinh Huy, and Doan the Thao of the University of Technology, HoChin Minh, Viet Nam, "Gaze Estimation with a Single Camera based on an ARM-based Embedded Linux Platform", published in the International Symposium on Mechatronics and Robotics (Dec. 10, 2013, HCMUT, Viet Nam) (5 pages).
M. Uricar, "Detector of Facial Landmarks", May 13, 2011 (79 pages).

(56) References Cited

OTHER PUBLICATIONS

Roberto Valenti and Theo Gevers, "Accurate Eye Center Location through Invariant Isocentric Patterns", published in IEEE Transaction on Pattern Analysis and Machine Intelligence (2011) (14 pages).
Roberto Valenti et al., "Combining Head Pose and Eye Information for Gaze Estimation", published in IEEE Transaction on Image Processing, vol. 21, No. 2, Feb. 2012 (14 pages).
J. Sivic, M. Everingham and A. Zisserman, "'Who are you?'—Learning Person Specific Classifiers from Video", published in Proc. of IEEE Conference on Computer Vision and Pattern Recognition, 2009 (8 pages).
M. Uricar, V. Franc and V. Hlavac, "Detector of Facial Landmarks Learned by the Structured Output SVM" published in VISAPP '12: Proceedings of the 7th International Conference on Computer Vision Theory and Applications, 2012 (10 pages).
Mattew Antone and Seth Teller, "Scalable Extrinsic Calibration of Omni-Directional Image Networks", IJCV 49(2/3), pp. 143-174, Sep./Oct. 2002 (33 pages).
Francisco Vasconcelos and Joan P. Barreto of the University of Coimbra, Coimbra, Portugal, "Towards a minimal solution for the relative pose between axial cameras", 2013 (11 pages).
OPTi 82C931 'Plug and Play Integrated Audio Controller', described in Data Book 912-3000-035 Revision: 2.1, published on Aug. 1, 1997 (64 pages).
Alan Chalmers et al., "Image Quality Metrics", Jul. 23-28, 2000 (Course #44, SIGGRAPH 2000) (117 pages).
John C. Russ, "The Image Processing Handbook", CRC Press, Taylor & Francis Group, Sixth Edition, 2011 (858 pages).

\* cited by examiner

SYSTEM AND METHOD FOR CONTROLLING A CAMERA BASED ON PROCESSING AN IMAGE CAPTURED BY OTHER CAMERA

CROSS-REFERENCES TO RELATED APPLICATIONS

This is a national phase of a PCT/IL2015/050413 filed on Apr. 19, 2015 which claims priority to U.S. Provisional Patent Application No. 62/131,854 filed Mar. 12, 2015, to U.S. Provisional Patent Application No. 62/085,284 filed Nov. 27, 2014, to U.S. Provisional Patent Application No. 62/060,020 filed Oct. 6, 2014, to U.S. Provisional Patent Application No. 61/982,482 filed Apr. 22, 2014, and to U.S. Provisional Patent Application No. 62/143,117 filed Apr. 5, 2015. All of the above provisional applications are commonly assigned and are incorporated herein by reference in their entirety for all purposes.

TECHNICAL FIELD

This disclosure generally relates to an apparatus and method for controlling a rear camera based on image captured by a front camera, in particular using an image processing of the captured image for estimating deviation of a user gaze direction and the rear camera field of view.

BACKGROUND

Unless otherwise indicated herein, the materials described in this section are not prior art to the claims in this application and are not admitted to be prior art by inclusion in this section.

FIG. 1 shows a block diagram that illustrates a system 10 including a computer system 11 and an associated Internet 22 connection. Such configuration is typically used for computers (hosts) connected to the Internet 22 and executing a server or a client (or a combination) software. The computer system 11 may be used as a portable electronic device such as a notebook/laptop computer, a media player (e.g., MP3 based or video player), a desktop computer, a laptop computer, a cellular phone, a Personal Digital Assistant (PDA), an image processing device (e.g., a digital camera or video recorder), any other handheld or fixed location computing devices, or a combination of any of these devices. Note that while FIG. 1 illustrates various components of the computer system 11, it is not intended to represent any particular architecture or manner of interconnecting the components; as such details are not germane. It is also be appreciated that network computers, handheld computers, cell phones and other data processing systems that have fewer components or perhaps more components may also be used. For example, the computer of FIG. 1 may be an Apple Macintosh computer or a Power Book, or an IBM compatible PC. The computer system 11 includes a bus 13, an interconnect, or other communication mechanism for communicating information, and a processor 127, commonly in the form of an integrated circuit, coupled to the bus 13 for processing information and for executing the computer executable instructions. The computer system 11 also includes a main memory 125a, such as a Random Access Memory (RAM) or other dynamic storage device, coupled to the bus 13 for storing information and instructions to be executed by the processor 127. The main memory 125a also may be used for storing temporary variables or other intermediate information during execution of instructions to be executed by the processor 127. The computer system 11 further includes a Read Only Memory (ROM) 125b (or other non-volatile memory) or other static storage device coupled to the bus 13 for storing static information and instructions for the processor 127. A storage device 125c, that may be a magnetic disk or optical disk, such as a hard disk drive (HDD) for reading from and writing to a hard disk, a magnetic disk drive for reading from and writing to a magnetic disk, and/or an optical disk drive (such as DVD) for reading from and writing to a removable optical disk, is coupled to the bus 13 for storing information and instructions. The hard disk drive, magnetic disk drive, and optical disk drive may be connected to the system bus 13 by a hard disk drive interface, a magnetic disk drive interface, and an optical disk drive interface, respectively. The drives and their associated computer-readable media provide non-volatile storage of computer readable instructions, data structures, program modules and other data for the general-purpose computing devices. Typically, the computer system 11 includes an Operating System (OS) stored in a non-volatile storage 125b for managing the computer resources and provides the applications and programs with an access to the computer resources and interfaces. An operating system commonly processes system data and user input, and responds by allocating and managing tasks and internal system resources, such as controlling and allocating memory, prioritizing system requests, controlling input and output devices, facilitating networking and managing files. Non-limiting examples of operating systems are Microsoft Windows, Mac OS X, and Linux.

The computer system 11 may be coupled via the bus 13 to a display 17, such as a Cathode Ray Tube (CRT), a Liquid Crystal Display (LCD), a flat screen monitor, a touch screen monitor or similar means for displaying text and graphical data to a user. The display 17 may be connected via a video adapter for supporting the display. The display 17 allows a user to view, enter, and/or edit information that is relevant to the operation of the system 10. An input device 18, including alphanumeric and other keys, is coupled to the bus 13 for communicating information and command selections to the processor 127. Another type of user input device is a cursor control 19, such as a mouse, a trackball, or cursor direction keys for communicating direction information and command selections to the processor 127 and for controlling cursor movement on the display 17. This cursor control 19 typically has two degrees of freedom in two axes, a first axis (e.g., x) and a second axis (e.g., y), that allows the device to specify positions in a plane.

The computer system 11 may be used for implementing the methods and techniques described herein. According to one embodiment, these methods and techniques are performed by the computer system 11 in response to the processor 127 executing one or more sequences of one or more instructions contained in the main memory 125a. Such instructions may be read into the main memory 125a from another computer-readable medium, such as the storage device 125c. Execution of the sequences of instructions contained in the main memory 125a causes the processor 127 to perform the process steps described herein. In alternative embodiments, hard-wired circuitry may be used in place of or in combination with software instructions to implement the arrangement. Thus, embodiments of the invention are not limited to any specific combination of hardware circuitry and software.

The term "processor" is used herein to include, but not limited to, any integrated circuit or any other electronic device (or collection of electronic devices) capable of performing an operation on at least one instruction, including, without limitation, a microprocessor (μP), a microcontroller (μC), a Digital Signal Processor (DSP), or any combination thereof. A processor, such as the processor 127, may further be a Reduced Instruction Set Core (RISC) processor, a Complex Instruction Set Computing (CISC) microprocessor, a Microcontroller Unit (MCU), or a CISC-based Central Processing Unit (CPU). The hardware of the processor 127 may be integrated onto a single substrate (e.g., silicon "die"), or distributed among two or more substrates. Furthermore, various functional aspects of a processor 127 may be implemented solely as a software (or a firmware) associated with the processor 127.

The terms "memory" and "storage" are used interchangeably herein and refer to any physical component that can retain or store information (that can be later retrieved) such as digital data on a temporary or permanent basis, typically for use in a computer or other digital electronic device. A memory can store computer programs or any other sequence of computer readable instructions, or data, such as files, text, numbers, audio and video, as well as any other form of information represented as a string or structure of bits or bytes. The physical means of storing information may be electrostatic, ferroelectric, acoustic, optical, chemical, electronic, electrical, or mechanical. A memory may be in a form of an Integrated Circuit (IC, a.k.a. chip or microchip). Alternatively or in addition, a memory may be in the form of a packaged functional assembly of electronic components (module). Such module may be based on a Printed Circuit Board (PCB) such as PC Card according to Personal Computer Memory Card International Association (PCMCIA) PCMCIA 2.0 standard, or a Single In-line Memory Module (SIMM) or a Dual In-line Memory Module (DIMM), standardized under the JEDEC JESD-21C standard. Further, a memory may be in the form of a separately rigidly enclosed box such as an external Hard-Disk Drive (HDD). Capacity of a memory is commonly featured in bytes (B), where the prefix 'K' is used to denote kilo=$2^{10}$=$1024^1$=1024, the prefix 'M' is used to denote mega=$2^{20}$=$1024^2$=1,048,576, the prefix 'G' is used to denote Giga=$2^{30}$=$1024^3$=1,073,741,824, and the prefix 'T' is used to denote tera=$2^{40}$=$1024^4$=1,099,511,627,776.

Various forms of computer-readable media may be involved in carrying one or more sequences of one or more instructions to the processor 127 for execution. For example, the instructions may initially be carried on a magnetic disk of a remote computer. The remote computer can load the instructions into its dynamic memory and send the instructions over a telephone line using a modem. A modem local to the computer system 11 can receive the data on the telephone line and use an infrared transmitter to convert the data to an infrared signal. An infrared detector can receive the data carried in the infrared signal and appropriate circuitry can place the data on the bus 13. The bus 13 carries the data to the main memory 125a, from which the processor 127 retrieves and executes the instructions. The instructions received by the main memory 125a may optionally be stored on the storage device 125c either before or after execution by the processor 127.

The computer system 11 commonly includes a communication interface 129 coupled to the bus 13. The communication interface 129 provides a two-way data communication coupling to a network link 128 that is connected to a Local Area Network (LAN) 24. For example, the communication interface 129 may be an Integrated Services Digital Network (ISDN) card or a modem to provide a data communication connection to a corresponding type of telephone line. As another non-limiting example, the communication interface 129 may be a Local Area Network (LAN) card to provide a data communication connection to a compatible LAN. For example, Ethernet based connection based on IEEE802.3 standard may be used, such as 10/100BaseT, 1000BaseT (gigabit Ethernet), 10 gigabit Ethernet (10GE or 10 GbE or 10 GigE per IEEE Std. 802.3ae-2002as standard), 40 Gigabit Ethernet (40 GbE), or 100 Gigabit Ethernet (100 GbE as per Ethernet standard IEEE P802.3ba). These technologies are described in Cisco Systems, Inc. Publication number 1-587005-001-3 (June 1999), "*Internetworking Technologies Handbook*", Chapter 7: "Ethernet Technologies", pages 7-1 to 7-38, which is incorporated in its entirety for all purposes as if fully set forth herein. In such a case, the communication interface 129 typically includes a LAN transceiver or a modem, such as Standard Microsystems Corporation (SMSC) LAN91C111 10/100 Ethernet transceiver, described in the Standard Microsystems Corporation (SMSC) data-sheet "*LAN91C111 10/100 Non-PCI Ethernet Single Chip MAC+PHY*" Data-Sheet, Rev. 15 (Feb. 20, 2004), which is incorporated in its entirety for all purposes as if fully set forth herein.

An Internet Service Provider (ISP) 26 is an organization that provides services for accessing, using, or participating in the Internet 22. The Internet Service Provider 26 may be organized in various forms, such as commercial, community-owned, non-profit, or otherwise privately owned. Internet services, typically provided by ISPs, include Internet access, Internet transit, domain name registration, web hosting, and colocation. Various ISP Structures are described in Chapter 2: "*Structural Overview of ISP Networks*" of the book entitled: "*Guide to Reliable Internet Services and Applications*", by Robert D. Doverspike, K. K. Ramakrishnan, and Chris Chase, published 2010 (ISBN: 978-1-84882-827-8), which is incorporated in its entirety for all purposes as if fully set forth herein.

An arrangement 20 of a computer system connected to the Internet 22 is shown in FIG. 2. A computer system or a workstation 27 is shown, including a main unit box 28, which encloses a motherboard on which the processor 127 and the memories 125a, 125b, and 125c are typically mounted. The workstation 27 includes a keyboard 212 (corresponding to the input device 18), a printer 211, a computer mouse (corresponding to the cursor control 19), and a display 29 (corresponding to the display 17). FIG. 2 illustrates various devices connected via the Internet 22, such as client device #1 21a, client device #2 21b, data server #1 23a, data server #2 23b, and the workstation 27, connected to the Internet 22 via the router or gateway 25 and the ISP 26.

Operating system. An Operating System (OS) is software that manages computer hardware resources and provides common services for computer programs. The operating system is an essential component of any system software in a computer system, and most application programs usually require an operating system to function. For hardware functions such as input/output and memory allocation, the operating system acts as an intermediary between programs and the computer hardware, although the application code is usually executed directly by the hardware and will frequently make a system call to an OS function or be interrupted by it. Common features typically supported by operating systems include process management, interrupts handling, memory management, file system, device drivers, networking (such as TCP/IP and UDP), and Input/Output (I/O) handling. Examples of popular modern operating systems include Android, BSD, iOS, Linux, OS X, QNX, Microsoft Windows, Windows Phone, and IBM z/OS.

A camera 30 shown in FIG. 3 may be a digital still camera which converts captured image into an electric signal upon a specific control, or can be a video camera, wherein the conversion between captured images to the electronic signal is continuous (e.g., 24 frames per second). The camera 30 is preferably a digital camera, wherein the video or still images are converted using an electronic image sensor 32. The digital camera 30 includes a lens 71 (or few lenses) for focusing the received light onto the small semiconductor image sensor 32. The image sensor 32 commonly includes a panel with a matrix of tiny light-sensitive diodes (photocells), converting the image light to electric charges and then to electric signals, thus creating a video picture or a still image by recording the light intensity. Charge-Coupled Devices (CCD) and CMOS (Complementary Metal-Oxide-Semiconductor) are commonly used as the light-sensitive diodes. Linear or area arrays of light-sensitive elements may be used, and the light sensitive sensors may support monochrome (black & white), color or both. For example, the CCD sensor KAI-2093 Image Sensor 1920 (H)×1080 (V) Interline CCD Image Sensor or KAF-50100 Image Sensor 8176 (H)×6132 (V) Full-Frame CCD Image Sensor can be used, available from Image Sensor Solutions, Eastman Kodak Company, Rochester, N.Y.

An image processor block 33 receives the analog signal from the image sensor 32. The Analog Front End (AFE) in the block 33 filters, amplifies, and digitizes the signal, using an analog-to-digital (A/D) converter. The AFE further provides Correlated Double Sampling (CDS), and provides a gain control to accommodate varying illumination conditions. In the case of a CCD-based sensor 32, a CCD AFE (Analog Front End) component may be used between the digital image processor 33 and the sensor 32. Such an AFE may be based on VSP2560 'CCD Analog Front End for Digital Cameras' from Texas Instruments Incorporated of Dallas, Tex., U.S.A. The block 33 further contains a digital image processor, which receives the digital data from the AFE, and processes this digital representation of the image to handle various industry-standards, and to execute various computations and algorithms. Preferably, additional image enhancements may be performed by the block 33 such as generating greater pixel density or adjusting color balance, contrast, and luminance. Further, the block 33 may perform other data management functions and processing on the raw digital image data. Commonly, the timing relationship of the vertical/horizontal reference signals and the pixel clock are also handled in this block. Digital Media System-on-Chip device TMS320DM357 from Texas Instruments Incorporated of Dallas, Tex., U.S.A. is an example of a device implementing in a single chip (and associated circuitry) part or all of the image processor 33, part or all of a video compressor 34 and part or all of a transceiver 35. In addition to a lens or lens system, color filters may be placed between the imaging optics and the photosensor array 32 to achieve desired color manipulation.

The processing block 33 converts the raw data received from the photosensor array 32 (which can be any internal camera format, including before or after Bayer translation) into a color-corrected image in a standard image file format. The camera 30 further comprises a connector 39a, and a transmitter or a transceiver 35 is disposed between the connector 39a and the image processor 33. The transceiver 35 also includes isolation magnetic components (e.g. transformer-based), balancing, surge protection, and other suitable components required for providing a proper and standard interface via the connector 39a. In the case of connecting to a wired medium, the connector 39 further contains protection circuitry for accommodating transients, over-voltage and lightning, and any other protection means for reducing or eliminating the damage from an unwanted signal over the wired medium. A band pass filter may also be used for passing only the required communication signals, and rejecting or stopping other signals in the described path. A transformer may be used for isolating and reducing common-mode interferences. Further a wiring driver and wiring receivers may be used in order to transmit and receive the appropriate level of signal to and from the wired medium. An equalizer may also be used in order to compensate for any frequency dependent characteristics of the wired medium.

Other image processing functions performed by the image processor 33 may include adjusting color balance, gamma and luminance, filtering pattern noise, filtering noise using Wiener filter, changing zoom factors, recropping, applying enhancement filters, applying smoothing filters, applying subject-dependent filters, and applying coordinate transformations. Other enhancements in the image data may include applying mathematical algorithms to generate greater pixel density or adjusting color balance, contrast and/or luminance.

The image processing may further include an algorithm for motion detection by comparing the current image with a reference image and counting the number of different pixels, where the image sensor 32 or the digital camera 30 are assumed to be in a fixed location and thus assumed to capture the same image. Since images are naturally differ due to factors such as varying lighting, camera flicker, and CCD dark currents, pre-processing is useful to reduce the number of false positive alarms. Algorithms that are more complex are necessary to detect motion when the camera itself is moving, or when the motion of a specific object must be detected in a field containing other movement that can be ignored.

The image processing may further include video enhancement such as video denoising, image stabilization, unsharp masking, and super-resolution. Further, the image processing may include a Video Content Analysis (VCA), where the video content is analyzed to detect and determine temporal events based on multiple images, and is commonly used for entertainment, healthcare, retail, automotive, transport, home automation, safety and security. The VCA functionalities include Video Motion Detection (VIVID), video tracking, and egomotion estimation, as well as identification, behavior analysis, and other forms of situation awareness. A dynamic masking functionality involves blocking a part of the video signal based on the signal itself, for example because of privacy concerns. The egomotion estimation functionality involves the determining of the location of a camera or estimating the camera motion relative to a rigid scene, by analyzing its output signal. Motion detection is used to determine the presence of a relevant motion in the observed scene, while an object detection is used to determine the presence of a type of object or entity, for example a person or car, as well as fire and smoke detection. Similarly, face recognition and Automatic Number Plate Recognition may be used to recognize, and therefore possibly identify persons or cars. Tamper detection is used to determine whether the camera or the output signal is tampered with, and video tracking is used to determine the location of persons or objects in the video signal, possibly with regard to an external reference grid. A pattern is defined as any form in an image having discernible characteristics that provide a distinctive identity when contrasted with other forms. Pattern recognition may also be used, for ascertaining differences, as well as similarities, between patterns under observation and partitioning the patterns into appropriate categories based on these perceived differences and similarities; and may include any procedure for correctly identifying a discrete pattern, such as an alphanumeric character, as a member of a predefined pattern category. Further, the video or image processing may use, or be based on, the algorithms and techniques disclosed in the book entitled: "*Handbook of Image & Video Processing*", edited by Al Bovik, by Academic Press, ISBN: 0-12-119790-5, which is incorporated in its entirety for all purposes as if fully set forth herein.

A controller 37, located within the camera device or module 30, may be based on a discrete logic or an integrated device, such as a processor, microprocessor or microcomputer, and may include a general-purpose device or may be a special purpose processing device, such as an ASIC, PAL, PLA, PLD, Field Programmable Gate Array (FPGA), Gate Array, or other customized or programmable device. In the case of a programmable device as well as in other implementations, a memory is required. The controller 37 commonly includes a memory that may include a static RAM (random Access Memory), dynamic RAM, flash memory, ROM (Read Only Memory), or any other data storage medium. The memory may include data, programs, and/or instructions and any other software or firmware executable by the processor. Control logic can be implemented in hardware or in software, such as a firmware stored in the memory. The controller 37 controls and monitors the device operation, such as initialization, configuration, interface, and commands. The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor.

The digital camera device or module 30 requires power for its described functions such as for capturing, storing, manipulating, and transmitting the image. A dedicated power source may be used such as a battery or a dedicated connection to an external power source via connector 39*b*. The power supply 38 contains a DC/DC converter. In another embodiment, the power supply 38 is power fed from the AC power supply via AC plug as the connector 39*b* and a cord, and thus may include an AC/DC converter, for converting the AC power (commonly 115 VAC/60 Hz or 220 VAC/50 Hz) into the required DC voltage or voltages. Such power supplies are known in the art and typically involves converting 120 or 240 volt AC supplied by a power utility company to a well-regulated lower voltage DC for electronic devices. In one embodiment, the power supply 38 is integrated into a single device or circuit, in order to share common circuits. Further, the power supply 38 may include a boost converter, such as a buck boost converter, charge pump, inverter and regulators as known in the art, as required for conversion of one form of electrical power to another desired form and voltage. While the power supply 38 (either separated or integrated) can be an integral part and housed within the camera 30 enclosure, it may be enclosed as a separate housing connected via cable to the camera 30 assembly. For example, a small outlet plug-in step-down transformer shape can be used (also known as wall-wart, "power brick", "plug pack", "plug-in adapter", "adapter block", "domestic mains adapter", "power adapter", or AC adapter). Further, the power supply 38 may be a linear or switching type.

Various formats that can be used to represent the captured image are TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards. In many cases, video data is compressed before transmission, in order to allow its transmission over a reduced bandwidth transmission system. A video compressor 34 (or video encoder) is shown in FIG. 3 disposed between the image processor 33 and the transceiver 35, allowing for compression of the digital video signal before its transmission over a cable or over-the-air. In some cases, compression may not be required, hence obviating the need for such compressor 34. Such compression can be lossy or lossless types. Common compression algorithms are JPEG (Joint Photographic Experts Group) and MPEG (Moving Picture Experts Group). The above and other image or video compression techniques can make use of intraframe compression commonly based on registering the differences between part of single frame or a single image. Interframe compression can further be used for video streams, based on registering differences between frames. Other examples of image processing include run length encoding and delta modulation. Further, the image can be dynamically dithered to allow the displayed image to appear to have higher resolution and quality.

The single lens or a lens array 31 is positioned to collect optical energy representative of a subject or a scenery, and to focus the optical energy onto the photosensor array 32. Commonly, the photosensor array 32 is a matrix of photosensitive pixels, which generates an electric signal that is a representative of the optical energy directed at the pixel by the imaging optics.

While the digital camera 30 has been exampled above with regard to capturing a single image using the single lens 31 and the single sensor 32, it is apparent that multiple images can be equally considered, using multiple image capturing mechanisms. An example of two capturing mechanisms is shown for a digital camera 40 shown in FIG. 4. Lenses 31*a* and 31*b* are respectively associated with sensors 32*a* and 32*b*, which in turn respectively connects to image processors 33*a* and 33*b*. In the case where a compression function is used, video compressors 34*a* and 34*b*, respectively, compress the data received from the processors 33*a* and 33*b*. In one embodiment, two transceivers (each of the same as transceiver 35, for example) and two ports (each of the same type as port 39*a*, for example) are used. Further, two communication mediums (each similar or the same as described above) can be employed, each carrying the image corresponding to the respective lens. Further, the same medium can be used using Frequency Division/Domain Multiplexing (FDM). In such an environment, each signal is carried in a dedicated frequency band, distinct from the other signals concurrently carried over the same medium. The signals are combined onto the medium and separated from the medium using various filtering schemes, employed in a multiplexer 41. In another embodiment, the multiple images are carried using Time Domain/Division Multiplexing (TDM). The digital data stream from the video compressors 34a and 34b is multiplexed into a single stream by the multiplexer 41, serving as a time multiplexer. The combined signal is then fed to the single transceiver 35 for transmitting onto the medium. Using two or more image-capturing components can further be used to provide stereoscopic video, allowing 3-D or any other stereoscopic view of the content, or other methods of improving the displayed image quality of functionality.

A prior art example of a portable electronic camera connectable to a computer is disclosed in U.S. Pat. No. 5,402,170 to Parulski et al. entitled: "Hand-Manipulated Electronic Camera Tethered to a Personal Computer". A digital electronic camera which can accept various types of input/output cards or memory cards is disclosed in U.S. Pat. No. 7,432,952 to Fukuoka entitled: "Digital Image Capturing Device having an Interface for Receiving a Control Program", and the use of a disk drive assembly for transferring images out of an electronic camera is disclosed in U.S. Pat. No. 5,138,459 to Roberts et al., entitled: "Electronic Still Video Camera with Direct Personal Computer (PC) Compatible Digital Format Output", which are all incorporated in their entirety for all purposes as if fully set forth herein. A camera with human face detection means is disclosed in U.S. Pat. No. 6,940,545 to Ray et al., entitled: "Face Detecting Camera and Method", and in U.S. Patent Application Publication No. 2012/0249768 to Binder entitled: "System and Method for Control Based on Face or Hand Gesture Detection", which are both incorporated in their entirety for all purposes as if fully set forth herein.

Face detection (also known as face localization) includes algorithms for identifying a group of pixels within a digitally acquired image that relates to the existence, locations and sizes of human faces. Common face-detection algorithms focused on the detection of frontal human faces, and other algorithms attempt to solve the more general and difficult problem of multi-view face detection. That is, the detection of faces that are either rotated along the axis from the face to the observer (in-plane rotation), or rotated along the vertical or left-right axis (out-of-plane rotation), or both. Various face detection techniques and devices (e.g. cameras) having face detection features are disclosed in U.S. Pat. RE33,682, RE31,370, U.S. Pat. Nos. 4,047,187, 4,317,991, 4,367,027, 4,638,364, 5,291,234, 5,386,103, 5,488,429, 5,638,136, 5,642,431, 5,710,833, 5,724,456, 5,781,650, 5,812,193, 5,818,975, 5,835,616, 5,870,138, 5,978,519, 5,987,154, 5,991,456, 6,097,470, 6,101,271, 6,128,397, 6,148,092, 6,151,073, 6,188,777, 6,192,149, 6,249,315, 6,263,113, 6,268,939, 6,282,317, 6,301,370, 6,332,033, 6,393,148, 6,404,900, 6,407,777, 6,421,468, 6,438,264, 6,456,732, 6,459,436, 6,473,199, 6,501,857, 6,504,942, 6,504,951, 6,516,154, 6,526,161, 6,940,545, 7,110,575, 7,315,630, 7,317,815, 7,466,844, 7,466,866 and 7,508,961, which are all incorporated in its entirety for all purposes as if fully set forth herein.

Image. A digital image is a numeric representation (normally binary) of a two-dimensional image. Depending on whether the image resolution is fixed, it may be of a vector or raster type. Raster images have a finite set of digital values, called picture elements or pixels. The digital image contains a fixed number of rows and columns of pixels, which are the smallest individual element in an image, holding quantized values that represent the brightness of a given color at any specific point. Typically, the pixels are stored in computer memory as a raster image or raster map, a two-dimensional array of small integers, where these values are commonly transmitted or stored in a compressed form. The raster images can be created by a variety of input devices and techniques, such as digital cameras, scanners, coordinate-measuring machines, seismographic profiling, airborne radar, and more. Common image formats include GIF, JPEG, and PNG.

The Graphics Interchange Format (better known by its acronym GIF) is a bitmap image format that supports up to 8 bits per pixel for each image, allowing a single image to reference its palette of up to 256 different colors chosen from the 24-bit RGB color space. It also supports animations and allows a separate palette of up to 256 colors for each frame. GIF images are compressed using the Lempel-Ziv-Welch (LZW) lossless data compression technique to reduce the file size without degrading the visual quality. The GIF (GRAPHICS INTERCHANGE FORMAT) Standard Version 89a is available from www.w3.org/Graphics/GIF/spec-gif89a.txt.

JPEG (seen most often with the .jpg or peg filename extension) is a commonly used method of lossy compression for digital images, particularly for those images produced by digital photography. The degree of compression can be adjusted, allowing a selectable tradeoff between storage size and image quality and typically achieves 10:1 compression with little perceptible loss in image quality. JPEG/Exif is the most common image format used by digital cameras and other photographic image capture devices, along with JPEG/JFIF. The term "JPEG" is an acronym for the Joint Photographic Experts Group, which created the standard. JPEG/JFIF supports a maximum image size of 65535×65535 pixels—one to four gigapixels (1000 megapixels), depending on the aspect ratio (from panoramic 3:1 to square). JPEG is standardized under as ISO/IEC 10918-1:1994 entitled: "*Information technology—Digital compression and coding of continuous-tone still images: Requirements and guidelines*".

Portable Network Graphics (PNG) is a raster graphics file format that supports lossless data compression that was created as an improved replacement for Graphics Interchange Format (GIF), and is the commonly used lossless image compression format on the Internet. PNG supports palette-based images (with palettes of 24-bit RGB or 32-bit RGBA colors), grayscale images (with or without alpha channel), and full-color non-palette-based RGB images (with or without alpha channel). PNG was designed for transferring images on the Internet, not for professional-quality print graphics, and, therefore, does not support non-RGB color spaces such as CMYK. PNG was published as an ISO/IEC15948:2004 standard entitled: "*Information technology—Computer graphics and image processing—Portable Network Graphics (PNG): Functional specification*".

Metadata. The term "metadata", as used herein, refers to data that describes characteristics, attributes, or parameters of other data, in particular, files (such as program files) and objects. Such data is typically structured information that describes, explains, locates, and otherwise makes it easier to retrieve and use an information resource. Metadata typically includes structural metadata, relating to the design and specification of data structures or "data about the containers of data"; and descriptive metadata about individual instances of application data or the data content. Metadata may include the means of creation of the data, the purpose of the data, time and date of creation, the creator or author of the data, the location on a computer network where the data were created, and the standards used.

For example, metadata associated with a computer word processing file might include the title of the document, the name of the author, the company to whom the document belongs, the dates that the document was created and last modified, keywords which describe the document, and other descriptive data. While some of this information may also be included in the document itself (e.g., title, author, and data), metadata may be a separate collection of data that may be stored separately from, but associated with, the actual document. One common format for documenting metadata is eXtensible Markup Language (XML). XML provides a formal syntax, which supports the creation of arbitrary descriptions, sometimes called "tags." An example of a metadata entry might be <title>War and Peace</title>, where the bracketed words delineate the beginning and end of the group of characters that constitute the title of the document that is described by the metadata. In the example of the word processing file, the metadata (sometimes referred to as "document properties") is entered manually by the author, the editor, or the document manager. The metadata concept is further described in a National Information Standards Organization (NISO) Booklet entitled: "*Understanding Metadata*" (ISBN: 1-880124-62-9), in the IETF RFC 5013 entitled: "*The Dublin Core Metadata Element Set*", and in the IETF RFC 2731 entitled: "*Encoding Dublin Core Metadata in HTML*", which are all incorporated in their entirety for all purposes as if fully set forth herein. An extraction of metadata from files or objects is described in a U.S. Pat. No. 8,700,626 to Bedingfield, entitled: "Systems, Methods and Computer Products for Content-Derived Metadata", and in a U.S. Patent Application Publication 2012/0278705 to Yang et al., entitled: "System and Method for Automatically Extracting Metadata from Unstructured Electronic Documents", which are both incorporated in their entirety for all purposes as if fully set forth herein.

Metadata can be stored either internally in the same file, object, or structure as the data (this is also called internal or embedded metadata), or externally in a separate file or field separated from the described data. A data repository typically stores the metadata detached from the data, but can be designed to support embedded metadata approaches. Metadata can be stored in either human-readable or binary form. Storing metadata in a human-readable format such as XML can be useful because users can understand and edit it without specialized tools, however, these formats are rarely optimized for storage capacity, communication time, and processing speed. A binary metadata format enables efficiency in all these respects, but requires special libraries to convert the binary information into a human-readable content.

Tag. A tag is a type of metadata relating to non-hierarchical keyword or term assigned to a digital image, describing the image and allows it to be found again by browsing or searching. Tags may be chosen informally and personally by the item's creator or by its viewer, depending on the system.

Color space. A color space is a specific organization of colors, allowing for reproducible representations of color, in both analog and digital representations. A color model is an abstract mathematical model describing the way colors can be represented as tuples of numbers (e.g., three tuples/channels in RGB or four in CMYK). When defining a color space, the usual reference standard is the CIELAB or CIEXYZ color spaces, which were specifically designed to encompass all colors the average human can see. Colors are commonly created in printing with color spaces based on the CMYK color model, using the subtractive primary colors of pigment (Cyan (C), Magenta (M), Yellow (Y), and Black (K)). To create a three-dimensional representation of a given color space, we can assign the amount of magenta color to the representation's X axis, the amount of cyan to its Y axis, and the amount of yellow to its Z axis. The resulting 3-D space provides a unique position for every possible color that can be created by combining those three pigments. Colors are typically created on computer monitors with color spaces based on the RGB color model, using the additive primary colors (red, green, and blue). A three-dimensional representation would assign each of the three colors to the X, Y, and Z axes. Popular color models include RGB, CMYK, HSL, YUV, YCbCr, and YPbPr color formats.

Color spaces and the various color space models are described in an article by Marko Tkalcic and Jurij F. Tasic of the University of Ljubljana, Slovenia entitled: "*Colour spaces—perceptual, historical and applicational background*", and in the article entitled: "*Color Space Basics*" by Andrew Oran and Vince Roth, published May 2012, Issue 4 of the journal 'The Tech Review' by the Association of Moving Image Archivists, which are both incorporated in their entirety for all purposes as if fully set forth herein. Conversions between color spaces or models are described in an article entitled: "*Colour Space Conversions*" by Adrian Ford and Alan Roberts (Aug. 11, 1998), and in an article by Philippe Colantoni and Al dated 2004, entitled: "*Color Space Transformations*", which are both incorporated in their entirety for all purposes as if fully set forth herein.

A color space maps a range of physically produced colors (from mixed light, pigments, etc.) to an objective description of color sensations registered in the eye, typically in terms of tristimulus values, but not usually in the LMS space defined by the cone spectral sensitivities. The tristimulus values associated with a color space can be conceptualized as amounts of three primary colors in a tri-chromatic additive color model. In some color spaces, including LMS and XYZ spaces, the primary colors used are not real colors, in the sense that they cannot be generated with any light spectrum.

CIE color space. The CIE 1931 standards were created by the International Commission on Illumination (CIE) in 1931 and include the CIE 1931 RGB, the CIE 1931 XYZ, the CIELUV, and the CIEUVW color models. When judging the relative luminance (brightness) of different colors in well-lit situations, humans tend to perceive light within the green parts of the spectrum as brighter than red or blue light of equal power. The luminosity function that describes the perceived brightnesses of different wavelengths is thus roughly analogous to the spectral sensitivity of M cones. The CIE model capitalizes on this fact by defining Y as luminance. Z is quasi-equal to blue stimulation, or the S cone response, and X is a mix (a linear combination) of cone response curves chosen to be nonnegative. The XYZ tristimulus values are thus analogous to, but different to, the LMS cone responses of the human eye. Defining Y as luminance has the useful result that for any given Y value, the XZ plane contains all possible chromaticities at that luminance. CIE color space is described in a paper by Gernot Hoffmann entitled: "*CIE Color Space*", which is incorporated in its entirety for all purposes as if fully set forth herein.

RGB color space. RGB is an abbreviation for Red-Green-Blue. An RGB color space is any additive color space based on the RGB color model. A particular RGB color space is defined by the three chromaticities of the red, green, and blue additive primaries, and can produce any chromaticity by the triangle defined by those primary colors. The complete specification of an RGB color space also requires a white point chromaticity and a gamma correction curve.

RGB (Red, Green, and Blue) describes what kind of light needs to be emitted to produce a given color. Light is added together to create form from darkness. RGB stores individual values for red, green and blue. RGB is a color model, and there are many different RGB color spaces derived from this color model, such as RGBA that is RGB with an additional channel, alpha, to indicate transparency. RGB color spaces are described in an article published by The BabelColor Company by Danny Pascale (Revised 2003 Oct. 6) entitled: "*A Review of RGB Color Spaces . . . from xyY to R'G'B'*", and in an article by Sabine Susstrunk, Robert Buckley, and Steve Swen from the Laboratory of audio-visual Communication (EPFL) entitled: "*Standard RGB Color Spaces*", which are both incorporated in their entirety for all purposes as if fully set forth herein. The RGB color space includes the RGB, sRGB, Adobe RGB, Adobe Wide Gamut RGB, ProPhoto RGB color space, Apple RGB, ISO RGB, ROMM RGB, International Telecommunication Union (ITU) Radiocommunication Sector (ITU-R) Recommendation ITU-R BT.709, and ITU-R BT.202.

Luma plus chroma/chrominance (YUV). Some color spaces are based on separating the component (Y) that represents the luma information, from the components (U+V, or I+Q) that represent the chrominance information. YUV is a color space typically used as part of a color image pipeline, where it encodes a color image or video taking human perception into account, allowing reduced bandwidth for chrominance components, thereby typically enabling transmission errors or compression artifacts to be more efficiently masked by the human perception than using a "direct" RGB-representation. Other color spaces have similar properties, and the main reason to implement or investigate properties of Y'UV would be for interfacing with analog or digital television or photographic equipment that conforms to certain Y'UV standards.

The Y'UV model defines a color space in terms of one luma (Y') and two chrominance (UV) components. The Y'UV color model is used in the PAL and SECAM composite color video standards. Previous black-and-white systems used only luma (Y') information. Color information (U and V) was added separately via a sub-carrier so that a black-and-white receiver would still be able to receive and display a color picture transmission in the receiver's native black-and-white format. Y' stands for the luma component (the brightness) and U and V are the chrominance (color) components; luminance is denoted by Y and luma by Y'—the prime symbols (') denote gamma compression, with "luminance" meaning perceptual (color science) brightness, while "luma" is electronic (voltage of display) brightness. The YPbPr color model used in analog component video and its digital version YCbCr used in digital video are more or less derived from it, and are sometimes called Y'UV. (CB/PB and CR/PR are deviations from grey on blue-yellow and red-cyan axes, whereas U and V are blue-luminance and red-luminance differences.) The Y'IQ color space used in the analog NTSC television broadcasting system is related to it, although in a more complex way. YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries. Color models based on the YUV color space include YUV (used in PAL), YDbDr (used in SECAM), YIQ (used in NTSC), YCbCr (described in ITU-R BT.601, BT.709, and BT.2020), YPbPr, xvYCC, and YCgCo. The YUV family is further described in an article published in the International Journal of Engineering Research and Applications (IJERA) ISSN: 2248-9622 Vol. 2, Issue 2, March-April 2012, pp. 152-156 by Gnanathej a Rakesh and Sreenivasulu Reddy of the University College of Engineering, Tirupati, entitled: "*YCoCg color Image Edge detection*", which is incorporated in its entirety for all purposes as if fully set forth herein.

Hue and saturation. HSL (Hue-Saturation-Lightness) and HSV (Hue-Aaturation-Value) are the two most common cylindrical-coordinate representations of points in an RGB color model, and are commonly used today in color pickers, in image editing software, and in image analysis and computer vision. The two representations rearrange the geometry of RGB in an attempt to be more intuitive and perceptually relevant than the Cartesian (cube) representation, by mapping the values into a cylinder loosely inspired by a traditional color wheel. The angle around the central vertical axis corresponds to "hue" and the distance from the axis corresponds to "saturation". These first two values give the two schemes the 'H' and 'S' in their names. The height corresponds to a third value, the system's representation of the perceived luminance in relation to the saturation.

Perceived luminance is a notoriously difficult aspect of color to represent in a digital format (see disadvantages section), and this has given rise to two systems attempting to solve this issue: HSL (L for lightness) and HSV or HSB (V for value or B for brightness). A third model, HSI (I for intensity), common in computer vision applications, attempts to balance the advantages and disadvantages of the other two systems. While typically consistent, these definitions are not standardized. HSV and HSL color models are described in an article by Darrin Cardanu entitled: "*Adventures in HSV Space*", and in an article by Douglas A. Kerr (Issue 3, May 12, 2008) entitled: "*The HSV and HSL Color Models and the Infamous Hexcones*", which are both incorporated in their entirety for all purposes as if fully set forth herein.

Optical flow. Optical flow or optic flow is the pattern of apparent motion of objects, surfaces, and edges in a visual scene caused by the relative motion between an observer (an eye or a camera) and the scene. Motion estimation and video compression schemes have developed as a major aspect of the optical flow research, and typically use gradient-based optical flow estimation. Motion estimation is the process of determining motion vectors that describe the transformation from one 2D image to another, usually from adjacent frames in a video sequence. The motion vectors may be represented by a translational model or by many other models that can approximate the motion of a real video camera, such as rotation and translation in all three dimensions and zoom. Optical flow techniques are described in an article by David J. Fleet and Yair Weiss entitled: "*Optical Flow Estimation*", and in an article by J. L. Baron, D. J. Fleet, and S. S. Beauchemin entitled: "*Performance of Optical Flow Techniques*", which are both incorporated in their entirety for all purposes as if fully set forth herein.

Digital photography is described in an article by Robert Berdan (downloaded from www.canadianphotographer.com) entitled: Digital Photography Basics for Beginners", and in a guide published on April 2004 by Que Publishing (ISBN—0-7897-3120-7) entitled: Absolute Beginner's Guide to Digital Photography" authored by Joseph Ciaglia et al., which are both incorporated in their entirety for all purposes as if fully set forth herein.

Aperture. Camera aperture is the unit of measurement that defines the size of the opening in the lens (typically measured in f-stop), that can be adjusted to control the amount of light reaching the film or digital sensor, and determines the cone angle of a bundle of rays that come to a focus in the image plane. The aperture determines how collimated the admitted rays are, and if an aperture is narrow, then highly collimated rays are admitted, resulting in a sharp focus at the image plane, while if an aperture is wide, then uncollimated rays are admitted, resulting in a sharp focus only for rays with a certain focal length. Commonly, camera aperture refers to the diameter of the aperture stop rather than the physical stop or the opening itself. Most digital cameras provide automatic aperture control, which allows viewing and metering at the lens's maximum aperture, stops the lens down to the working aperture during exposure, and returns the lens to maximum aperture after exposure.

The aperture stop of a photographic lens can usually be adjusted to control the amount of light reaching the film or image sensor. In combination with variation of shutter speed, the aperture size regulates the image sensor degree of exposure to light. Typically, a fast shutter requires a larger aperture to ensure sufficient light exposure, and a slow shutter requires a smaller aperture to avoid excessive exposure. The lens aperture is usually specified as an f-number, the ratio of focal length to effective aperture diameter. A lens typically has a set of marked "f-stops" that the f-number can be set to. A lower f-number denotes a greater aperture opening which allows more light to reach the film or image sensor. The photography term "one f-stop" refers to a factor of $\sqrt{2}$ (approx. 1.41) change in f-number, which in turn corresponds to a factor of 2 change in light intensity. Typical ranges of apertures used in photography are about f/2.8-f/22 or f/2-f/16 covering 6 stops, which may be divided into wide, middle, and narrow of 2 stops each, roughly (using round numbers) f/2-f/4, f/4-f/8, and f/8-f/16 or (for a slower lens) f/2.8-f/5.6, f/5.6-f/11, and f/11-f/22.

Exposure Index (ISO). An Exposure Index (EI) rating (a.k.a. ISO setting) refers to a relationship between exposure and sensor data values, that can be achieved by setting the signal gain of the sensor, and is specified by a digital camera manufacturer such that the image files produced by the camera has a lightness similar to what would be obtained with film of the same EI rating at the same exposure. Commonly few EI choices are provided by adjusting the signal gain of an image sensor in the digital realm.

Focal length. An optical focus, also called an image point, is the point where light rays originating from a point on the object converge, and although the focus is conceptually a point, physically the focus has a spatial extent, called the blur circle. An image, or image point or region, is in focus if the light from object points is converged almost as much as possible in the image, and out of focus if the light is not well converged. For a lens, or a spherical or parabolic mirror, it is a point onto which collimated light parallel to the axis is focused. Since light can pass through a lens in either direction, a lens has two focal points—one on each side. The distance in air from the lens or mirror's principal plane to the focus is referred to as the focal length. A photographic lens for which the focus is not adjustable is called a fixed-focus lens or sometimes focus-free, and the focus is set at the time of manufacture, and remains fixed. It is usually set to the hyperfocal distance, so that the depth of field ranges all the way down from half that distance to infinity, which is acceptable for most cameras used for capturing images of humans or objects larger than a meter.

For an interchangeable lens camera, the Flange Focal Distance (FFD) (also known as the flange-to-film distance, flange focal depth, Flange Back Distance (FBD), Flange Focal Length (FFL), or register, depending on the usage and source) of a lens mount system is the distance from the mounting flange (the metal ring on the camera and the rear of the lens) to the film or sensor plane. This value is different for different camera systems, and the range of this distance which renders an image clearly in focus within all focal lengths is usually measured in hundredths of millimeters and is known as the depth of focus (not to be confused with the similarly named depth of field).

Autofocus (AF) systems rely on one or more sensors to determine correct focus. Some AF systems rely on a single sensor while others use an array of sensors. Most modern SLR cameras use through-the-lens optical AF sensors, with a separate sensor array providing light metering, although the latter can be programmed to prioritize its metering to the same area as one or more of the AF sensors. Through-the-lens optical autofocusing is often speedier and more precise than can be achieved manually with an ordinary viewfinder, although more precise manual focus can be achieved with special accessories such as focusing magnifiers. Autofocus accuracy within ⅓ of the depth of field (DOF) at the widest aperture of the lens is not uncommon in professional AF SLR cameras. Most multi-sensor AF cameras allow manual selection of the active sensor, and many offer an automatic selection of the sensor using algorithms that attempt to discern the location of the subject.

Exposure time. Shutter speed (or exposure time) is the length of time interval a digital camera shutter is open when taking a photograph, so that the amount of light that reaches the film or image sensor is proportional to the exposure time. The camera's shutter speed, the lens's brightness (f-number), and the scene's luminance together determine the amount of light that reaches the film or sensor (the exposure), and Exposure Value (EV) is a quantity that accounts for the shutter speed and the f-number. In addition to its effect on exposure, the shutter speed changes the way movement appears in photographs. Very short shutter speeds can be used to freeze fast-moving subjects, for example at sporting events while very long shutter speeds are used to intentionally blur a moving subject for artistic effect. Short exposure times are sometimes called "fast", and long exposure times "slow". Adjustment to the aperture controls the depth of field, the distance range over which objects are acceptably sharp; such adjustments need to be compensated by changes in the shutter speed. Shutter speed is one of several methods used to control the amount of light recorded by the camera's digital sensor or film, and may also be used to manipulate the visual effects of the final image beyond its luminosity.

A method and an apparatus for rating a captured image based on accessing a database of reference images that have an associated rating value, and selecting reference images to form a metadata-based subset of reference images, are described in U.S. Patent Application Publication No. 2012/0213445 to LUU et al., entitled: "Method, Apparatus, and System for Rating Images", which is incorporated in its entirety for all purposes as if fully set forth herein. A method and an apparatus for disqualifying an unsatisfactory scene as an image acquisition control for a camera by analyzing mouth regions in an acquired image, are described in U.S. Pat. No. 8,265,348 to Steinberg et al., entitled: "Digital Image Acquisition Control and Correction Method and Apparatus", which is incorporated in its entirety for all purposes as if fully set forth herein. An apparatus and a method for facilitating analysis of a digital image by using image recognition processing in a server, allowing for suggesting for meta-tagging the image by a user, are described in U.S. Pat. No. 8,558,921 to Walker et al., entitled: "Systems and Methods for Suggesting Meta-Information to a Camera User", which is incorporated in its entirety for all purposes as if fully set forth herein.

Systems and methods for determining the location where an image was captured using a central system that compares the submitted images to images in an image library to identify matches are described in U.S. Pat. No. 8,131,118 to Jing et al., entitled: "Inferring Locations from an Image", which is incorporated in its entirety for all purposes as if fully set forth herein. Further, methods for automatically rating and selecting digital photographs by estimating the importance of each photograph by analyzing its content as well as its metadata, are described in an article by Daniel Kormann, Peter Dunker, and Ronny Paduscheck, all of the Fraunhofer Institute for Digital Media in Ilmenau, Germany, entitled: "*Automatic Rating and Selection of Digital Photographs*", which is incorporated in its entirety for all purposes as if fully set forth herein.

Various systems and methods are known for analyzing and for providing the user a feedback regarding the quality of a digital image captured by a digital camera. A processor within a digital camera, which generates and utilizes a recipe data file and communicates with a network-based storage location for uploading and downloading, is described in U.S. Patent Application Publication No. 2013/0050507 to Syed et al., entitled: "Recipe Based Real-Time Assistance for Digital Image Capture and Other Consumer Electronics Devices", a method and system for determining effective policy profiles that includes client devices configured to initiate a request for at least one effective policy profile, a server mechanism communicatively coupled to the client devices and configured to receive the request, and a policy data storage component configured to store a plurality of policy profiles, are described in U.S. Patent Application Publication No. 2010/0268772 to Romanek et al., entitled: "System and Method for Determining Effective Policy Profiles in a Client-Server Architecture", methods and apparatuses for analyzing, characterizing and/or rating composition of images and providing instructive feedback or automatic corrective actions are described in U.S. Patent Application Publication No. 2012/0182447 to Gabay entitled: "Methods, Circuits, Devices, Apparatuses and Systems for Providing Image Composition Rules, Analysis and Improvement", an approach for providing device angle image correction where an image (e.g., still or moving) of a subject is captured via a camera of a mobile device is described in U.S. Patent Application Publication No. 2013/0063538 to Hubner et al., entitled: "Method and Apparatus for Providing Device Angle Image Correction", an apparatus and an associated method that facilitate capturing an image in an electronic camera with the image being completely focused are described in U.S. Patent Application Publication No. 2012/0086847 to Foster entitled: "Convergence Feedback Indicator, Provided When Taking a Picture in a Camera Application", a method for providing real-time feedback of an estimated quality of a captured final image including calculating a quality score of a preliminary obtained image is described in U.S. Patent Application Publication No. 2014/0050367 to CHEN et al., entitled: "Smart Document Capture Based on Estimated Scanned-Image Quality", and methods and systems for determining augmentability information associated with an image frame captured by a digital imaging part of a user device are described in PCT International Application Publication No. WO2013/044983 to Hofmann et al., entitled: "Feedback to User for Indicating Augmentability of an Image", which are all incorporated in their entirety for all purposes as if fully set forth herein.

Further, a digital image acquisition system that includes a portable apparatus for capturing digital images and a digital processing component for detecting, analyzing, invoking subsequent image captures, and informing the photographer regarding motion blur, and reducing the camera motion blur in an image captured by the apparatus, is described in U.S. Pat. No. 8,244,053 entitled: "Method and Apparatus for Initiating Subsequent Exposures Based on Determination of Motion Blurring Artifacts", and in U.S. Pat. No. 8,285,067 entitled: "Method Notifying Users Regarding Motion Artifacts Based on Image Analysis", both to Steinberg et al. which are both incorporated in their entirety for all purposes as if fully set forth herein.

Furthermore, a camera that has the release button, a timer, a memory and a control part, and the timer measures elapsed time after the depressing of the release button is released, used to prevent a shutter release moment to take a good picture from being missed by shortening time required for focusing when a release button is depressed again, is described in Japanese Patent Application Publication No. JP2008033200 to Hyo Hana entitled: "Camera", a through image that is read by a face detection processing circuit, and the face of an object is detected, and is detected again by the face detection processing circuit while half pressing a shutter button, used to provide an imaging apparatus capable of photographing a quickly moving child without fail, is described in a Japanese Patent Application Publication No. JP2007208922 to Uchida Akihiro entitled: "Imaging Apparatus", and a digital camera that executes image evaluation processing for automatically evaluating a photographic image (exposure condition evaluation, contrast evaluation, blur or focus blur evaluation), and used to enable an image photographing apparatus such as a digital camera to automatically correct a photographic image, is described in Japanese Patent Application Publication No. JP2006050494 to Kita Kazunori entitled: "Image Photographing Apparatus", which are all incorporated in their entirety for all purposes as if fully set forth herein.

Skin Detection. Various skin detection algorithms are based on identifying a human skin by means of its color. For example, in a paper published Volume 1, No. 3, November-December 2012 (ISSN 2319-2720) of the International Journal of Computing, Communication and Networking (UCCN) entitled: "*Face Detection using Skin Colour Model and distance between Eyes*" by Pallabi Saikia, Gollo Janam, and Margaret Kathing, which is incorporated in its entirety for all purposes as if fully set forth herein, it is suggested that in YCbCr color model, a skin pixels and region may be identified by having $77 \leq Cb \leq 127$ and $133 \leq Cr \leq 173$ in 0-255 range, or $0.3 \leq Cb \leq 0.49$ and $0.51 \leq 0.678$ when using normalized 0-1 range. Detecting human skin when other color models are used is described for example in a paper published by the International Journal of Applied Information Systems (IJAIS) Volume 3, No. 4, July 2012 (ISSN: 2249-0868), entitled: "*Comparison between YCbCr Color Space and CIELab Color Space for Skin Color Segmentation*" by Amanpreet Kaur and B. V. Kranthi, both of Lovely Professional University, Jalandhar, India, which is incorporated in its entirety for all purposes as if fully set forth herein.

Other techniques for skin detection are based on skin reflectance, where the physical properties of light reflection from a human skin using a known light wavelength. Such techniques are described in a University of Pennsylvania, Department of Computer & Information Science Technical Report MS-CIS-99-29 (Dec. 20, 1999) by Elli Angelopoulou entitled: *"The Reflectance Spectrum of Human Skin"*, which is incorporated in its entirety for all purposes as if fully set forth herein, disclosing that a human skin may be detected based on that the reflection of a human skin is typically 3 times stronger at 600-700 Nanometer than in 450 and 550 Nanometer. Other technique for skin detection that are based on skin reflectance is described in an article published in Computer Methods and Programs in Biomedicine (70(2): 179-186) by I. V. Meglinski and S. J. Matcher entitled: *"Computer simulation of the skin reflectance spectra"*, which is incorporated in its entirety for all purposes as if fully set forth herein. A model providing a prediction of various human face areas is described in a study published in ACM Transactions on Graphics (TOG), ISSN:0730-0301, Vol. 25, Issue 3, pp. 1013-1024, July 2006 (ACM Press) by Tim Weyrich et al. entitled: *"Analysis of Human Faces Using a Measurement-Based Skin Reflectance Model"*, which is incorporated in its entirety for all purposes as if fully set forth herein. Any light spectrum emitted by any light source may be equally used such as a light bulb or a florescent light, and in particular a black body spectrum by the sun, having intensity centered at 450-550 Nanometer, with substantial intensity also at 600-700 Nanometer (seen as Orange/Red).

Head Pose. Various systems and methods are known for estimating the head pose using a digital camera. A method for head pose estimation based on including receiving block motion vectors for a frame of video from a block motion estimator, selecting a block for analysis, determining an average motion vector for the selected block, and estimating the orientation of the user head in the video frame based on the accumulated average motion vector is described in U.S. Pat. No. 7,412,077 to Li et al., entitled: "Apparatus and Methods for Head Pose Estimation and Head Gesture Detection", methods for generating a low dimension pose space and using the pose space to estimate head rotation angles of a user's head are described in U.S. Pat. No. 8,687,880 to Wei et al., entitled: "Real Time Head Pose Estimation", techniques for performing accurate and automatic head pose estimation, integrated with a scale-invariant head tracking method based on facial features detected from a located head in images are described in U.S. Pat. No. 8,781,162 to Zhu et al., entitled: "Method and System for Head Tracking and Pose Estimation", a three-dimensional pose of the head of a subject determined based on depth data captured in multiple images is described in U.S. Patent Application Publication No. 2012/0293635 to Sharma et al., entitled: "Head Pose Estimation Using RGBD Camera", and a device and method for estimating head pose and obtaining an excellent head pose recognition result free from the influence of an illumination change, the device including a head area extracting unit, a head pitch angle unit, a head yaw unit, and a head pose displaying unit, is disclosed in U.S. Patent Application Publication No. 2014/0119655 to LIU et al., entitled: "Device and Method for Estimating Head Pose", which are all incorporated in their entirety for all purposes as if fully set forth herein.

Further head pose techniques are described in IEEE Transaction on Pattern Analysis and Machine Intelligence published 2008 (Digital Object Identifier 10.1109/TPAMI.2008.106) by Erik Murphy-Chutorian and Mohan Trivedi entitled: *"Head Pose Estimation in Computer Vision: A Survey"*, and in an article by Xiangxin Zhu and Deva Ramanan of the University of California, Irvine, entitled: *"Face detection, Pose Estimation, and Landmark Localization in the Wild"*, which are both incorporated in their entirety for all purposes as if fully set forth herein. Further head-pose and eye-gaze information and techniques are described in a book by Jian-Gang Wang entitled: *"Head-Pose and Eye-Gaze estimation: With Use of Face Domain knowledge"* (ISBN-13: 978-3659132100).

Measuring the eye gaze using a monocular image that zooms in on only one eye of a person is described in an article published in Proceedings of the Ninth IEEE International Conference on Computer Vision (ICCV 2003) by Jian-Gang Wang, Eric Sung, and Ronda Venkateswarlu, all of Singapore, entitled: *"Eye Gaze Estimation from a Single Image of One Eye"*, and an Isophote Curvature method employed to calculate the location of irises center using faces in images from camera detected by Haar-like feature is described in a paper published in the International Symposium on Mechatronics and Robotics (Dec. 10, 2013, HCMUT, Viet Nam), by Dinh Quang Tri, Van Tan Thang, Nguyen Dinh Huy, and Doan The Thao of the University of Technology, HoChin Minh, Viet Nam, entitled: *"Gaze Estimation with a Single Camera based on an ARM-based Embedded Linux Platform"*, an approach for accurately measuring the eye gaze of faces from images of irises is described in an article by Jia-Gang Wang and Eric Sung of the Nanyang Technological University, Singapore, entitled: *"Gaze Detection via Images of Irises"*, two novel approaches, called the "two-circle" and "one-circle" algorithm respectively, for measuring eye gaze using monocular image that zooms in on two eyes or only one eye of a person are described in a paper by Jian-Gang Wang and Eric Sung of the School of Electrical and Electronic Engineering, Nanyang Technological University, Singapore 639798, entitled: *"Gaze Direction Determination"*, ASEF eye locator is described in the web-site: 'github.com/laoyang/ASEF' (preceded by https://), a locating the center of the eye within the area of the pupil on low resolution images using isophrote properties to gain invariance to linear lighting changes is described in a paper published in IEEE Transaction on Pattern Analysis and Machine Intelligence (2011) by Roberto Valenti and Theo Gevers entitled: *"Accurate Eye Center Location through Invariant Isocentric Patterns"*, and an approach for accurate and robust eye center localization by using image gradients is described in an article by Fabian Timm and Erhardt Barth entitled: *"Accurate Eye Localisation by Means of Gradients"*, which are all incorporated in their entirety for all purposes as if fully set forth herein.

A method for controlling a zoom mode function of a portable imaging device equipped with multiple camera modules based on the size of an identified user's face or based on at least one of the user's facial features is described in U.S. Patent Application Publication No. 2014/0184854 to Musatenko, entitled: "Front Camera Face Detection for Rear Camera Zoom Function", methods and apparatus for image capturing based on a first camera mounted on a rear side of a mobile terminal and a second camera mounted on the front side of the mobile terminal are described in U.S. Patent Application Publication No. 2014/0139667 to KANG, entitled: "Image Capturing Control Apparatus and Method", a method and device for capturing accurate composition of an intended image/self-image/self-image with surrounding objects, with desired quality or high resolution and quality of the image achieved by using motion sensor/direction sensor/position sensor and by matching minimum number of contrast points are described in PCT International Application Publication No. WO 2015/022700 to RAMSUNDAR SHANDILYA et al., entitled: "A Method for Capturing an Accurately Composed High Quality Self-Image Using a Multi Camera Device", a method and computer program product for remotely controlling a first image capturing unit in a portable electronic device including a first and second image capturing unit, and the device detects and tracks an object via the second capturing unit and detects changes in an area of the object are described in U.S. Patent Application Publication No. 2008/0212831 to Hope, entitled: "Remote Control of an Image Capturing Unit in a Portable Electronic Device", methods and devices for camera aided motion direction and speed estimation of a mobile device based on capturing a plurality of images that represent views from the mobile device and adjusting perspectives of the plurality of images are described in U.S. Patent Application Publication No. 2014/0226864 to Subramaniam Venkatraman et al, entitled: "Camera Aided Motion Direction and Speed Estimation", and a smart mobile phone with a front camera and a back camera where the position coordinates of pupil centers in the front camera reference system, when the mobile device holder watches a visual focus on a display screen are collected through the front camera, is described in the Abstract of Chinese Patent Application Publication No. CN 103747183 Huang Hedong, entitled: "Mobile Phone Shooting Focusing Method", which are all incorporated in their entirety for all purposes as if fully set forth herein.

In consideration of the foregoing, it would be an advancement in the art to provide an image analysis solution and other methods and systems for improving image related functionalities, that are simple, secure, cost-effective, load balanced, redundant, reliable, provide lower CPU and/or memory usage, easy to use, reduce latency, faster, has a minimum part count, minimum hardware, and/or uses existing and available components, protocols, programs and applications for providing better quality of service, overload avoidance, better or optimal resources allocation, better communication and additional functionalities, and provides a better user experience.

SUMMARY

A method for estimating a numerical value associated with a file representing an image defined is disclosed. The method may comprise the steps of capturing the image by a digital camera; obtaining the image in a first color model; detecting an object in the image by using pattern recognition algorithm; extracting a region including the detected object from the image; calculating a correlation between two channels in the extracted region; and estimating the numerical value based on the calculated correlation. A non-transitory tangible computer readable storage media may comprise a code to perform the steps of the method. Alternatively or in addition, a device in a single enclosure may comprise the digital camera, a memory for storing computer-executable instructions, and a processor for executing the instructions, and the processor may be configured by the memory to perform acts comprising the method. The single enclosure may be a portable or a hand-held enclosure and the apparatus may be battery-operated, such as a notebook, a laptop computer, a media player, a cellular phone, a Personal Digital Assistant (PDA), or an image processing device.

The first color model may be according to, or based on, the CIE color space, and may consist of, be according to, or may be based on, CIE 1931 RGB, CIE 1931 XYZ, CIELUV, or CIEUVW color model. Alternatively or in addition, the first color model may be according to, or based on, the RGB color space, and may consist of, be according to, or be based on, RGB, sRGB, Adobe RGB, Adobe Wide Gamut RGB, ProPhoto RGB color space, Apple RGB, ISO RGB, ROMM RGB, International Telecommunication Union (ITU) Radio-communication Sector (ITU-R) Recommendation ITU-R BT.709, or ITU-R BT.202 color model. Alternatively or in addition, the first color model may be according to, or be based on, the Luma plus chrominance (YUV) color space, and may be according to, or may be based on, YUV, YCbCr, Y'CbCr, YDbDr, YPbPr, xvYCC, YCgCo, or YIQ color model. Alternatively or in addition, the first color model may be according to, or based on the Hue and Saturation color space, such as HSL (Hue-Saturation-Lightness), HSV (Hue-Saturation-Value), or HSI (Hue-Saturation-Intensity) color model.

The object may be part of a human body, such as a part of, or the whole of, a human face, and the pattern recognition algorithm is a face detection algorithm. The method may further comprise the step of converting the extracted region from the first color model to a second color model, that may be according to, or may be based on, the Luma plus chrominance (YUV) color space, and may consist of, be according to, or may be based on, YUV, YCbCr, Y'CbCr, YDbDr, YPbPr, xvYCC, YCgCo, or YIQ color model.

The method may further comprise the step of detecting non-object related parts in the extracted region, and the step of removing the non-object related parts from the extracted region. The object may be a human part, such as a part of, or a whole of, a human face, and the detecting of the non-object related parts in the extracted region may comprise a skin detection algorithm. The first color model may be according to, or may be based on, the Luma plus chrominance (YUV) color space such as the YCbCr color model, and the two channels may be the chrominance channels, such as the Cb and the Cr components The method may further comprise the step of calculating a mean value and a standard deviation value of each of the two channels in the extracted region, and the correlation may be calculated based on comparing the mean value and the standard deviation value of each of the two channels in the extracted region. Alternatively or in addition, the calculating of the correlation may include calculating a correlation coefficient, that may be according to, or may be based on, the Pearson product-moment correlation coefficient, or may be according to, or may be based on, a rank correlation coefficient such as the Spearman's rank correlation coefficient or the Kendall's rank correlation coefficient. The numerical value may consist of, or be based on, the calculated correlation coefficient.

A method for associating a multi-image numerical value to N multiple files representing N multiple images captured by a digital camera. The method may comprise the steps of capturing sequentially the N multiple images by the digital camera by N multiple image files respectively designated as IMAGES (i), where i=1 to N; processing each of the N multiple image files using an image processing algorithm; assigning N image numerical values VALUE(i), where i=1 to N, to the respective image file based on the image processing results of the respective image file; obtaining N weighting factors WEIGHT(i), where i=1 to N, where WEIGHT (i)≤WEIGHT (i+1) for all 1≤i≤N−2; and calculating the multi-image numerical value based on a weighted mean of the N image numerical values, each associated with the respected weighting factor. A non-transitory tangible computer readable storage media may comprise a code to perform the steps. A device may be housed in a single enclosure and may comprise in the single enclosure the digital camera, a memory for storing computer executable instructions, and a processor for executing the instructions, and the processor may be configured by the memory to perform acts comprising the method. The single enclosure may be a portable or a hand-held enclosure and the device may be battery-operated, such as a notebook, a laptop computer, a media player, a cellular phone, a Personal Digital Assistant (PDA), or an image processing device.

The expression WEIGHT (i)<WEIGHT (i+1) may be satisfied for all 1≤i≤N−1, and N may be equal to 2, 3, 4, 5, or 10, or may be N>10. The N multiple images may be sequentially captured in less than 1 second, 0.5 second, 0.3 second, 0.2 second, or 0.1 second. The method may be performed in real time and may be completed in less than 1 second, 0.5 second, 0.3 second, 0.2 second, or 0.1 second.

The multi-image numerical value may be calculated using weighted arithmetic mean, whereby the multi-image numerical value may be equal to, or is based on, the expression:

$$\frac{\sum_{i=1}^{N} \text{WEIGHT}(i) * \text{VALUE}(i)}{\sum_{i=1}^{N} \text{WEIGHT}(i)}.$$

Alternatively or in addition, the multi-image numerical value may be calculated using weighted geometric mean, whereby the multi-image numerical value may be equal to, or is based on, the expression:

$$\left(\prod_{i=1}^{n} \text{VALUE}(i)^{\text{WEIGHT}(i)}\right)^{\frac{1}{\sum_{i=1}^{N} \text{WEIGHT}(i)}}.$$

Alternatively or in addition the multi-image numerical value may be calculated using weighted harmonic mean, whereby the multi-image numerical value may be equal to, or is based on, the expression:

$$\frac{\sum_{i=1}^{N} \text{WEIGHT}(i)}{\sum_{i=1}^{N} \frac{\text{WEIGHT}(i)}{\text{VALUE}(i)}}.$$

The method may be used with a maximum threshold value or a minimum threshold value, and wherein the method further comprising the step of respectively comparing the multi-image numerical value to the maximum or minimum threshold, and may further comprise the step of respectively taking an action if the numerical value, such as the multi-image numerical value, is higher than the maximum value or is lower than the minimum value, and the action taken may be capturing an additional image by the digital camera. Alternatively or in addition, the action taken may include storing one or more images, such as the last taken image or all of the images to a memory, or alternately discarding one or more images. The method may further comprise the step of associating the multi-image numerical value with image (N), and the numerical value may be embedded in the image(N) file, such as being embedded in the file metadata.

The weighting factor WEIGHT(i) of at least one of images used in the weighted mean calculation may be modified to be multiplied by a coefficient to result WEIGHT (i)*coefficient. Alternatively or in addition, the weighting factor WEIGHT(N) associated with the N image used in the weighted mean calculation may be modified to be multiplied by a coefficient to be WEIGHT(N)*coefficient.

The method may be used with a sensor integrated or collocated with the digital camera to sense a physical phenomenon at, or affecting, the digital camera, where the sensor senses the physical phenomenon and provides sensor data measuring or corresponding to the phenomenon, and wherein the coefficient may be based on the sensor data. The sensor may be a temperature, humidity, pressure, audio, vibration, light, sound, proximity, flow rate, electrical voltage, or electrical current sensor. Alternatively or in addition, the sensor may be a motion sensor, such as an accelerometer operative to measure the magnitude and the direction of the acceleration of the digital camera. The accelerometer may be a piezoelectric, piezoresistive, capacitive, MEMS, or electromechanical switch accelerometer, and may further be a single-axis, 2-axis, or 3-axis accelerometer.

The method may further comprise the step of fitting probability distribution to the values VALUE(i), where i=1 to N, and wherein the coefficient may be based on the fitted symmetrical probability distribution. The step of fitting probability distribution may comprise calculating the mean of the values VALUE(i), where i=1 to N, and the coefficient may be based on the difference between the calculated mean value and the VALUE(i). The probability distribution may be the normal distribution, the logistic distribution, or the Student's t-distribution, and the step of fitting probability distribution may comprise calculating the standard deviation of the values VALUE(i), where i=1 to N. The coefficient may be based on the difference between the calculated mean value and the VALUE(i), divided by the calculated standard deviation value.

Alternatively or in addition, the method may further comprise the step of curve fitting of the values VALUE(i), where i=1 to N, and the coefficient may be based on the fitted curve. The curve fitting may fit the values to a first degree polynomial (linear) equation, a second degree polynomial equation, or a third degree polynomial equation, and the curve fitting may be based on minimizing least-square distances. The coefficient may be based on difference between the fitted-curve expected value for image i and the actual value VALUE(i). Alternatively or in addition, the method may further comprise the step of assigning additional N image associated numerical values VALUE(i), where i=1 to N, to the respective image file based on the image processing results of the respective image file, and the coefficient may be based on at least one of the VALUE(i) values, such as on the VALUE(N) value. Alternatively or in addition, the method may further comprise the step of processing at least one of the N multiple image files using an additional distinct image processing algorithm; and assigning at least one numerical value VALUE(i), where i=1 to N, to the respective image file based on the additional image processing results of the respective image file IMAGE(i). The coefficient may be based on at least one of the VALUE (i) values, or on the VALUE(N) value.

A method for controlling a first camera by estimating the angular deviation between a person gaze direction and a digital camera defining a line of sight, for use with a device including a first digital camera having a first center line of sight and a second digital camera having a second center line of sight that is parallel and opposing the first center line of sight. The method may comprise the steps of capturing an image to an image file by the second digital camera; detecting a human face in the image by using a face detection algorithm; estimating an angular deviation α between the second center line of sight and an imaginary line from the second camera to the detected human face based on the captured image; estimating an angular deviation $\beta$ between the imaginary line from the second camera to the detected face and the human face gaze direction based on the captured image; estimating an angular deviation $\phi$ between the first center line of sight and the human face gaze direction based on the estimated angular deviation $\alpha$ and the estimated angular deviation $\beta$, such as $\phi=\beta-\alpha$; and taking an action, such as initiating, stopping, controlling, or inhibiting action, in response to the value of the estimated angular deviation $\phi$. The step of estimating of the angular deviation $\alpha$ may include estimating a horizontal or vertical (or both) angular deviation between the second horizontal center line of sight and the horizontally or vertically (or both) detected human face; and the step of estimating of the angular deviation $\beta$ may include estimating the horizontal or vertical (or both) angular deviation between the horizontal or vertical (or both) line of sight to the detected face and the horizontal or vertical (or both) human face gaze direction. A non-transitory tangible computer readable storage media may comprise code to perform the steps of the method.

The device may be housed in a single enclosure and may comprise in the single enclosure the first and second digital cameras, a memory for storing computer executable instructions, and a processor for executing the instructions, the processor configured by the memory to perform acts comprising the method. The single enclosure may be a portable or a hand-held enclosure, and the device may be battery-operated. The device may be a notebook, a laptop computer, a media player, a cellular phone, a Personal Digital Assistant (PDA), or an image processing device.

The angular deviation $\alpha$ may be estimated to be a set value such as 30°, 45°, or 60°. Alternatively or in addition, the angular deviation $\alpha$ may be estimated based on the equation $\alpha=\gamma*(DEV/HD)$, wherein DEV may be the detected face location horizontal deviation from the center of the image, HD may be the total Horizontal Distance of the captured image, and $\gamma$ may be the horizontal angular field of view of the second camera. Further, the angular deviation $\alpha$ may be calculated based on the equation $\alpha=\gamma*(DEV/HD)$, wherein DEV may be the detected face location vertical deviation from the center of the image, HD may be the total vertical distance of the captured image, and $\gamma$ may be the vertical angular field of view of the second camera.

The step of estimating the angular deviation $\beta$ may be based on applying a human gaze direction estimation algorithm on the captured image that may be based on, or using, eye detection or eye tracking. Alternatively or in addition, the human gaze direction estimation algorithm may be based on, or using, head pose detection that may be based on, or using, eye detection or eye tracking.

Alternatively or in addition, the human gaze direction estimation algorithm may be based on, or using, facial landmarks detection or may be based on, or using, detection of one or more human face parts, such as nose, right nostril, left nostril, right cheek, left cheek, right eye, left eye, right ear, or left ear. Alternatively or in addition, the angular deviation $\beta$ may be estimated based on the detected human face parts, such that in response to detecting both a right ear and a left ear, the angular deviation $\beta$ may be estimated to be 0°, in response to detecting a right ear, a left eye, and a right eye, and not detecting a left ear, the angular deviation $\beta$ may be estimated to be 30°, and in response to detecting only a right ear and a right eye, and not detecting a left ear and a left eye, the angular deviation $\beta$ may be estimated to be 90°.

The device may further comprise a third digital camera having a third center line of sight that may be parallel and opposing to the first center line of sight, the method may further comprise the steps of capturing an additional image to an additional image file by the third digital camera; forming a 3D representation of the detected human face by combining the captured image and the additional captured image; and the step of estimating the angular deviation $\beta$ may include analyzing the formed 3D human face representation.

The action taken may comprise controlling the first camera and may include changing a setting of the first digital camera. Alternatively or in addition, the controlling of the first digital camera may include saving or discarding an image captured by the first camera in a memory. The method may be used with a maximum threshold value or a minimum threshold value, and the method may further comprise the step of respectively comparing the angular deviation $\phi$ to the maximum or minimum threshold, and respectively taking the action upon the value of the angular deviation $\phi$ being higher than the maximum value or being lower than the minimum value, immediately or after a time interval such as 0.5, 1, 2, or 3 seconds.

A device for controlling a camera operation based on image processing of an image captured by another camera. The device may comprise a first digital camera having a first center line of sight; a second digital camera having a second center line of sight that is parallel and opposing to the first center line of sight, and configured to capturing an image to an image file; a memory for storing computer executable instructions and for storing the image file; a processor for executing the instructions, the processor coupled to the memory and to the first and second digital cameras, and configured by the memory for detecting a human face in the image by using a face detection algorithm and for estimating an angular deviation $\phi$ between the first center line of sight and the human face gaze direction based on an estimated angular deviation $\alpha$ and an estimated angular deviation $\beta$; a control port coupled to the processor for outputting a control signal in response to the value of the estimated angular deviation $\phi$; and a single portable or hand-held enclosure housing the first and second digital cameras, the memory, the processor, and the control port. The angular deviation $\alpha$ may be defined between the second center line of sight and an imaginary line from the second camera to the detected human face, and the angular deviation $\beta$ may be defined between the imaginary line from the second camera to the detected face and the human face gaze direction. The action may be taken in response to the control signal, such as initiating, stopping, controlling, or inhibiting an action.

The device may further include a visual annunciator comprising a visual signaling component that may be a visible light emitter such as a semiconductor device, an incandescent lamp or fluorescent lamp, and the taking an action may comprise activating or controlling the visual annunciator. The visible light emitter may be adapted for a steady illumination and for blinking in response to the value of the estimated angular deviation $\phi$, the multi-image numerical value, or any other numerical value. Alternatively or in addition, the illumination level, location, type, color, or steadiness of the visible light emitter may be in response to the value of the estimated angular deviation $\phi$, the multi-image numerical value, or any other numerical value. Alternatively or in addition, the visible light emitter may be a numerical or an alphanumerical display emitter that may be based on LCD (Liquid Crystal Display), TFT (Thin-Film Transistor), FED (Field Emission Display) or CRT (Cathode Ray Tube), for displaying a value corresponding to the value of the estimated angular deviation φ, the multi-image numerical value, or any other numerical value.

The device may further include an audible annunciator comprising an audible signaling component comprising an electromechanical or a piezoelectric sounder, for emitting a sound, and the taking an action may comprise activating or controlling the audible annunciator. The audible signaling component may comprise a buzzer, a chime or a ringer, or may comprise a loudspeaker and a digital to analog converter coupled to the loudspeaker.

The audible signaling component may be operative to generate a single or multiple tones, and the sound emitted from the audible signaling component may be in response to the value of the estimated angular deviation φ, the multi-image numerical value, or any other numerical value. The volume, type, steadiness, pitch, rhythm, dynamics, timbre, or texture of the sound emitted from the audible signaling component is in response to the value of the estimated angular deviation φ, the multi-image numerical value, or any other numerical value. Alternatively or in addition, the sound emitted from the audible signaling component may be a human voice talking, and the sound may be a syllable, a word, a phrase, a sentence, a short story or a long story in response to the value of estimated angular deviation φ, the multi-image numerical value, or any other numerical value.

Any image processing algorithm herein may be an object detection algorithm using pattern recognition, the object may be part of a human body, such as a part of, or the whole of, a human face, and the pattern recognition algorithm may be a face detection algorithm. The numerical value VALUE(i) associated with respective IMAGE(i) may indicate the probability of the detection of the object in the respective image. Alternatively or in addition, the numerical value VALUE(i) associated with respective IMAGE(i) may indicate the location of the detected object in the respective image.

The numerical value (such as multi-image numerical value) may be used to estimate image sharpness, noise, dynamic range, tone reproduction, contrast, color accuracy, distortion, vignetting, exposure accuracy, Lateral Chromatic Aberration (LCA), Lens flare, color moiré, backlighting, or artifacts. The image file may be in a format that is according to, based on, or consists of Portable Network Graphics (PNG), Graphics Interchange Format (GIF), Joint Photographic Experts Group (JPEG), Windows bitmap (BMP), Exchangeable image file format (Exif), Tagged Image File Format (TIFF), or Raw Image Formats (RIF).

The method may be for use with a maximum threshold value or a minimum threshold value, and may further comprise the step of respectively comparing the numerical value (such as the multi-image numerical value) to the maximum or minimum threshold, and may comprise the step of respectively taking an action if the numerical value is higher than the maximum value, or is lower than the minimum value. The action taken may include storing one or more images, such as the last taken image or all of the images, to a memory, or alternately discarding one or more images. The method may further comprise the step of associating the numerical value with the file, such as embedding the numerical value in the image file or the file metadata. The numerical value may be used to estimate image sharpness, noise, dynamic range, tone reproduction, contrast, color accuracy, distortion, vignetting, exposure accuracy, Lateral Chromatic Aberration (LCA), Lens flare, color moiré, backlighting, or artifacts.

The method may further comprise the step of controlling the digital camera in response to the numerical value (such as the multi-image numerical value), and the controlling of the digital camera may include changing a setting of the digital camera. The setting may be the aperture size, exposure time, focal length, or exposure index of the digital camera.

The method may further comprise the step of transmitting, over a digital network, by a transmitter, the image file, the numerical value (such as the multi-image numerical value), or both. The digital network may be a wireless network, and the transmitter may be a wireless transmitter. The wireless network may be an in-building or in-vehicle network that is a Wireless Personal Area Network (PAN), and the wireless transmitter may be part of a WPAN transceiver, and the WPAN may be according to, or may be based on, Bluetooth™ or IEEE 802.15.1-2005 standards, or the WPAN may be a wireless control network that is according to, or based on, Zigbee™, IEEE 802.15.4-2003, or Z-Wave™. Alternatively or in addition, the wireless network may be a Wireless LAN (WLAN) and the wireless transmitter may be part of a WLAN transceiver, and the WLAN is according to, or based on, IEEE 802.11-2012, IEEE 802.11a, IEEE 802.11b, IEEE 802.11g, IEEE 802.11n, or IEEE 802.11ac. Alternatively or in addition, the wireless network may be a cellular telephone network and the wireless transmitter may be part of a cellular telephone network transceiver, and the cellular telephone network may be according to, or may be based on, a Third Generation (3G) network that uses UMTS W-CDMA, UMTS HSPA, UMTS TDD, CDMA2000 1xRTT, CDMA2000 EV-DO, GSM EDGE-Evolution, the cellular telephone network may be a Fourth Generation (4G) network that uses HSPA+, Mobile WiMAX, LTE, LTE-Advanced, MBWA, or may be based on IEEE 802.20-2008.

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions causes the processor to perform the one or more of the methods or steps described herein. A non-transitory computer readable medium containing computer instructions that, when executed by a computer processor, cause the processor to perform at least part of the steps described herein.

The above summary is not an exhaustive list of all aspects of the present invention. Indeed, it is contemplated that the invention includes all systems and methods that can be practiced from all suitable combinations and derivatives of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

The invention is herein described, by way of non-limiting examples only, with reference to the accompanying drawings, wherein like designations denote like elements. Understanding that these drawings only provide information concerning typical embodiments and are not therefore to be considered limiting in scope.

DETAILED DESCRIPTION

Figure 1:
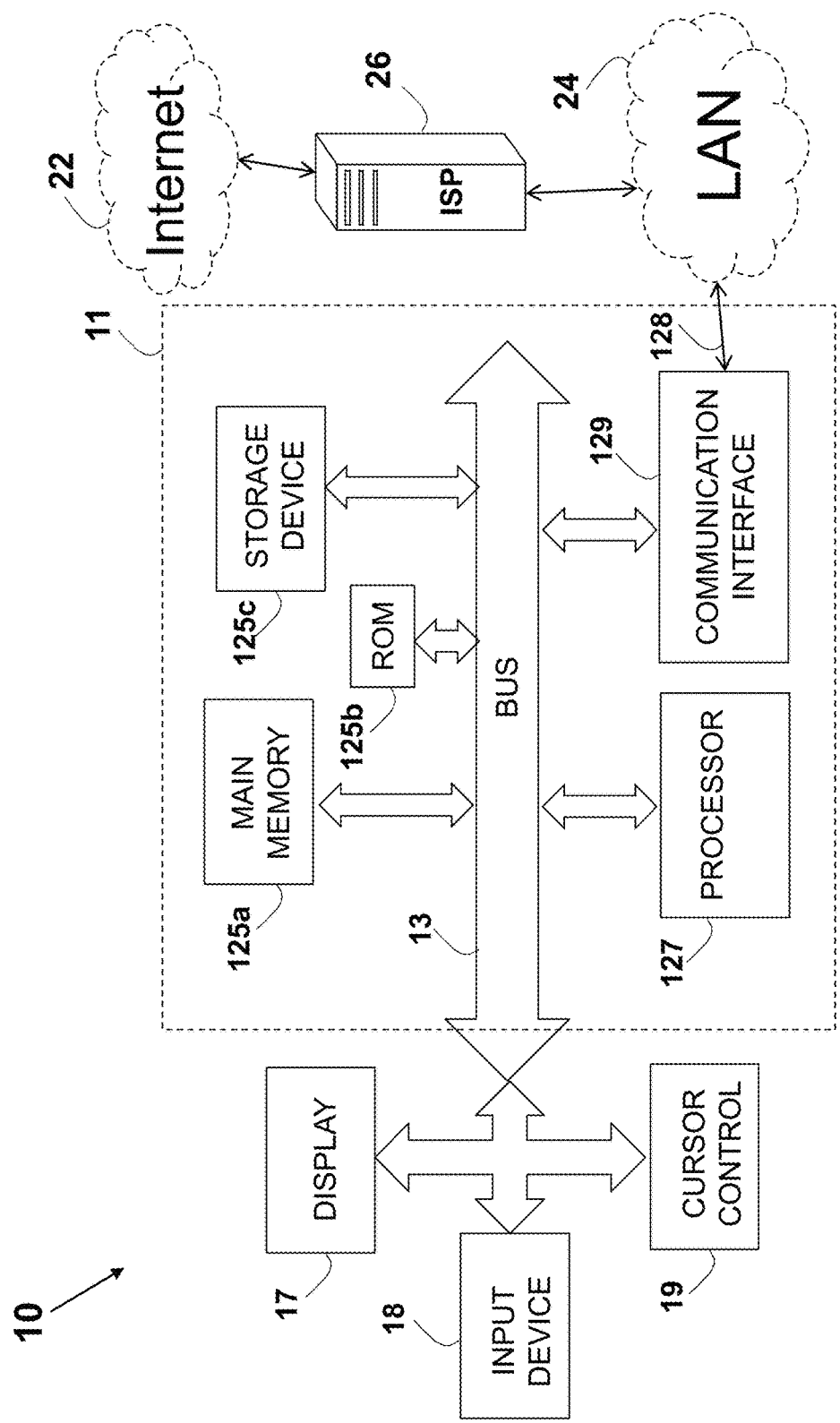
FIG. 1 illustrates schematically a block diagram of a computer.
Figure 2:
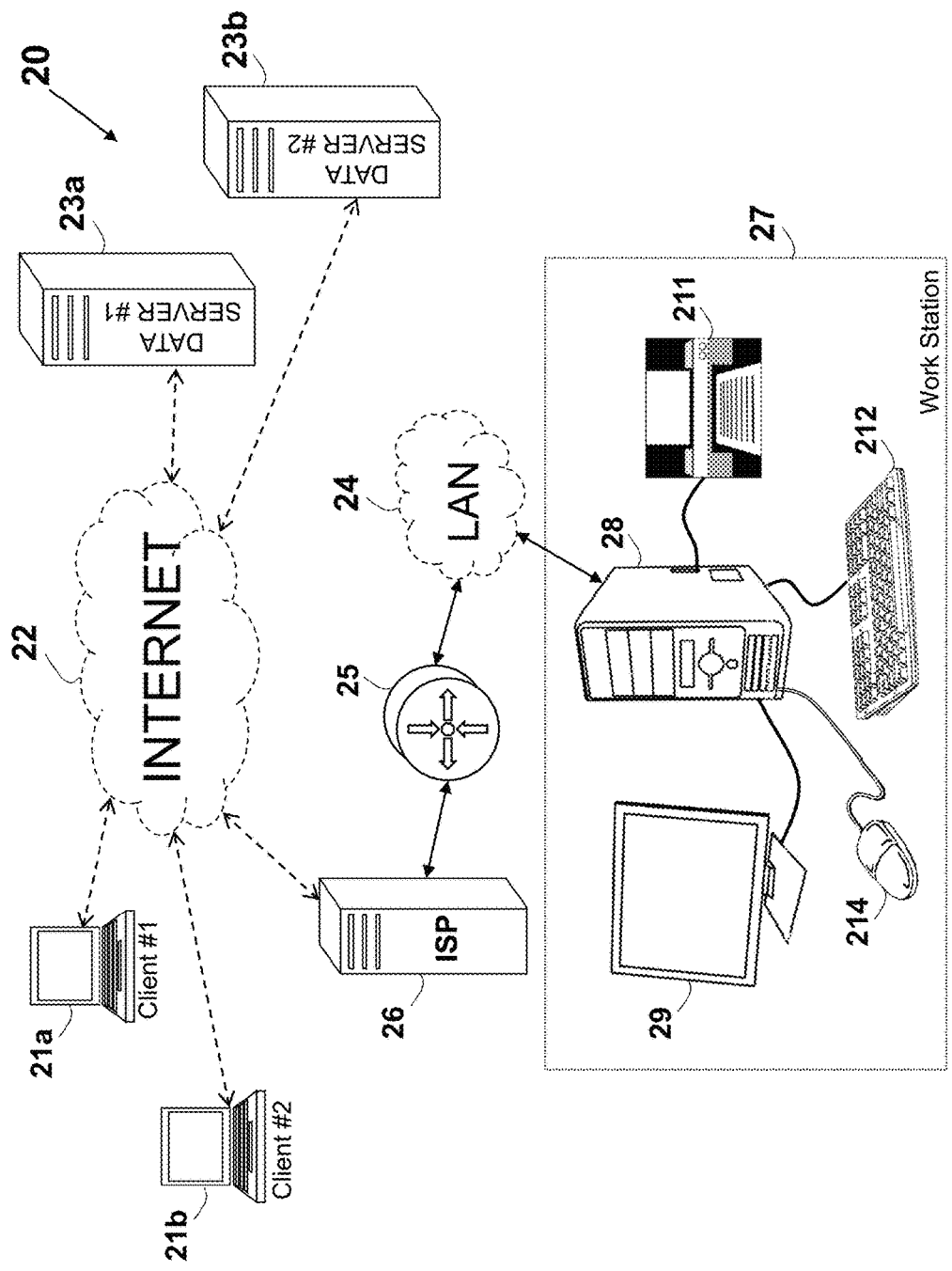
FIG. 2 illustrates schematically a block diagram of Internet and servers, clients, and a computer workstation connected to the Internet.

The principles and operation of an apparatus or a method according to the present invention may be understood with reference to the figures and the accompanying description wherein identical or similar components (either hardware or software) appearing in different figures are denoted by identical reference numerals. The drawings and descriptions are conceptual only. In actual practice, a single component can implement one or more functions; alternatively or in addition, each function can be implemented by a plurality of components and devices. In the figures and descriptions, identical reference numerals indicate those components that are common to different embodiments or configurations. Identical numerical references (in some cases, even in the case of using different suffix, such as 5, 5a, 5b and 5c) refer to functions or actual devices that are either identical, substantially similar, similar, or having similar functionality. It is readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention. It is to be understood that the singular forms "a", "an", and "the" herein include plural referents unless the context clearly dictates otherwise. Thus, for example, a reference to "a component surface" includes a reference to one or more of such surfaces. By the term "substantially" it is meant that the recited characteristic, parameter, or value need not be achieved exactly, but that deviations or variations, including, for example, tolerances, measurement error, measurement accuracy limitations and other factors known to those of skill in the art, may occur in amounts that do not preclude the effect the characteristic was intended to provide.

All directional references used herein (e.g., upper, lower, upwards, downwards, left, right, leftward, rightward, top, bottom, above, below, vertical, horizontal, clockwise, and counterclockwise, etc.) are only used for identification purposes to aid the reader's understanding of the present invention, and do not create limitations, particularly as to the position, orientation, or use of the invention.

Figure 5:
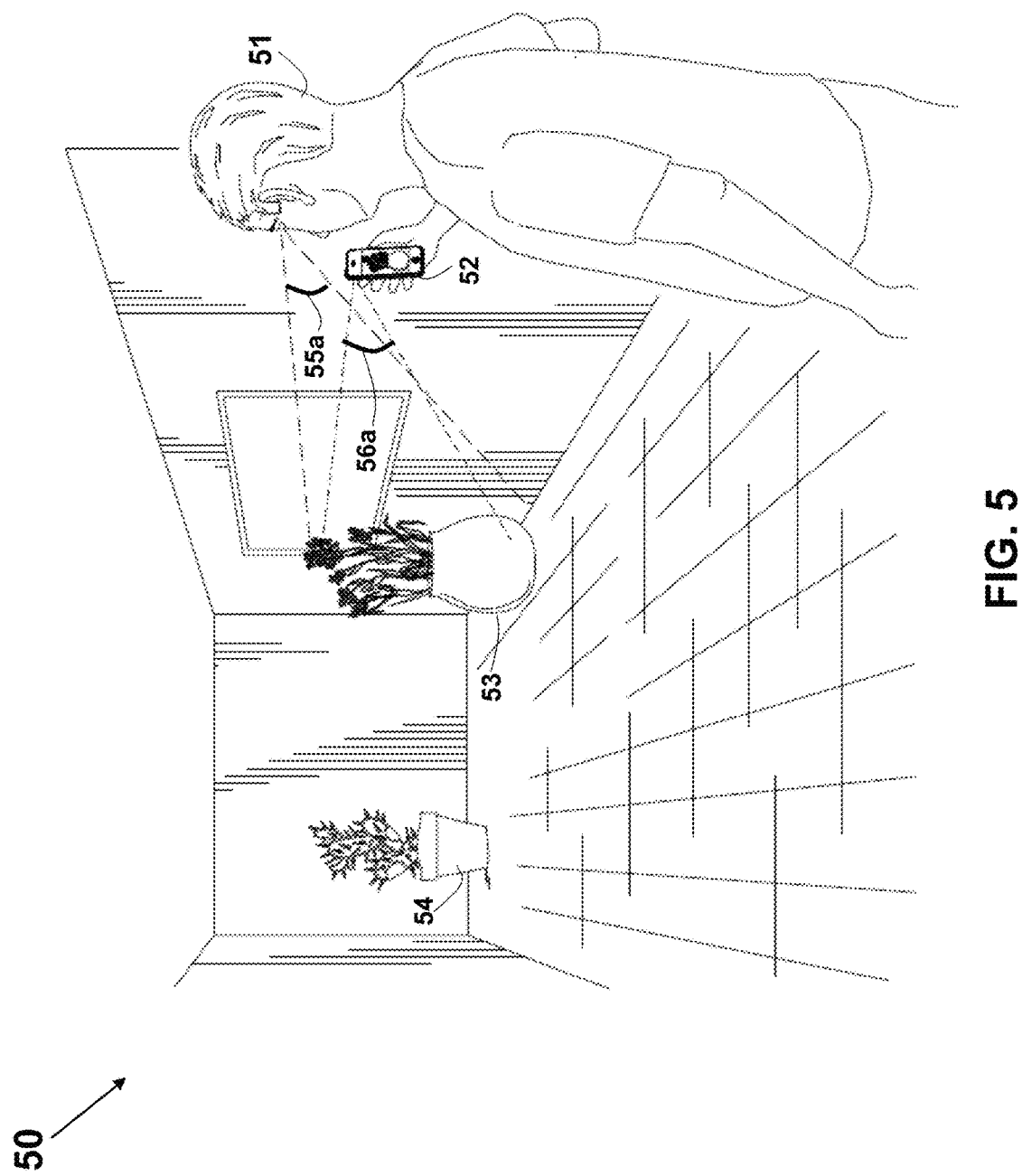
FIG. 5 depicts pictorially a perspective view of a person holding a dual-camera hand-held device, where the person and a camera are looking at the same object.
Figure 5A:
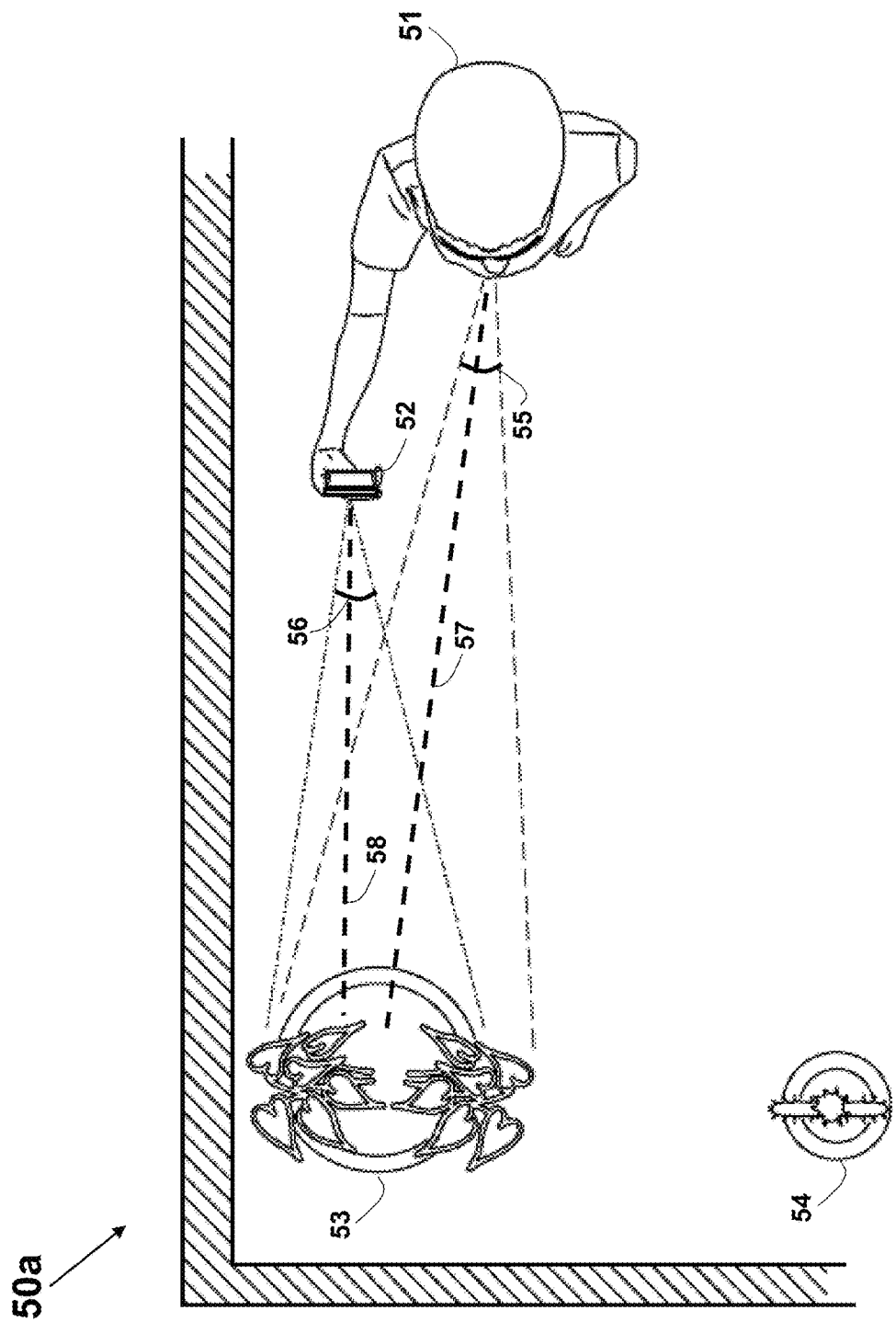
FIG. 5a depicts pictorially a top view of a person holding a dual-camera hand-held device, where the person and a camera are looking at the same object.

Various smartphones and other handheld devices are available having two camera modules, typically located to capture opposing scenes. One of the cameras, commonly referred to as the 'rear' camera is directed towards the object targeted to be captured, while the other camera, commonly referred to as the 'front' camera, typically mounted on the device screen side, is directed to capture the person holding the device, for example for video conferencing. A perspective view 50 of a person 51 holding such a dual-camera device 51 is shown in FIG. 5 and a top view 50a of the scene is shown in FIG. 5a. The person 51 is looking at the plant A 53, that is located in the person 51 Field of View (FOV) having a vertical angle 55a and a horizontal angle 55 (which may be the same, similar, or different angles), centered at the person 51 gaze direction shown by a line of sight 57. Similarly, the field of view of the rear camera in the device 52 is shown having a vertical angle 56a and a horizontal angle 56, both centered on the rear camera line of sight 58. A plant B 54 is shown in the room adjacent to the plant A 53, but is not looked at by both the person 51 and the device 52 rear camera. Since both the rear camera and the person 51 are looking at the same object, namely the plant A 53, there is a substantial overlap in their respective field of views, and the image captured by the rear camera corresponds to the image looked at by the person 51.

Figure 5B:
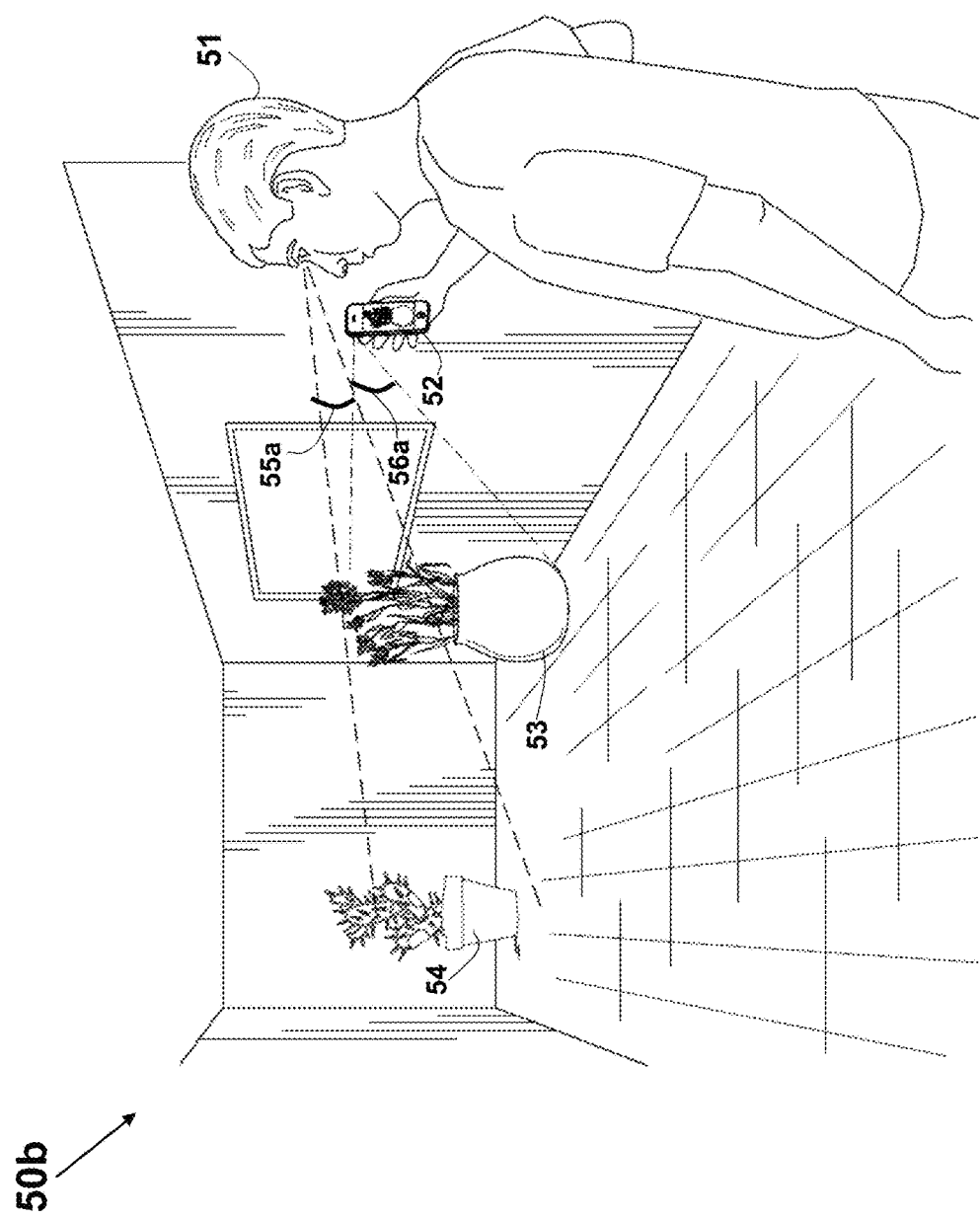
FIG. 5b depicts pictorially a perspective view of a person holding a dual-camera hand-held device, where the person and a camera are looking at different objects.
Figure 5C:
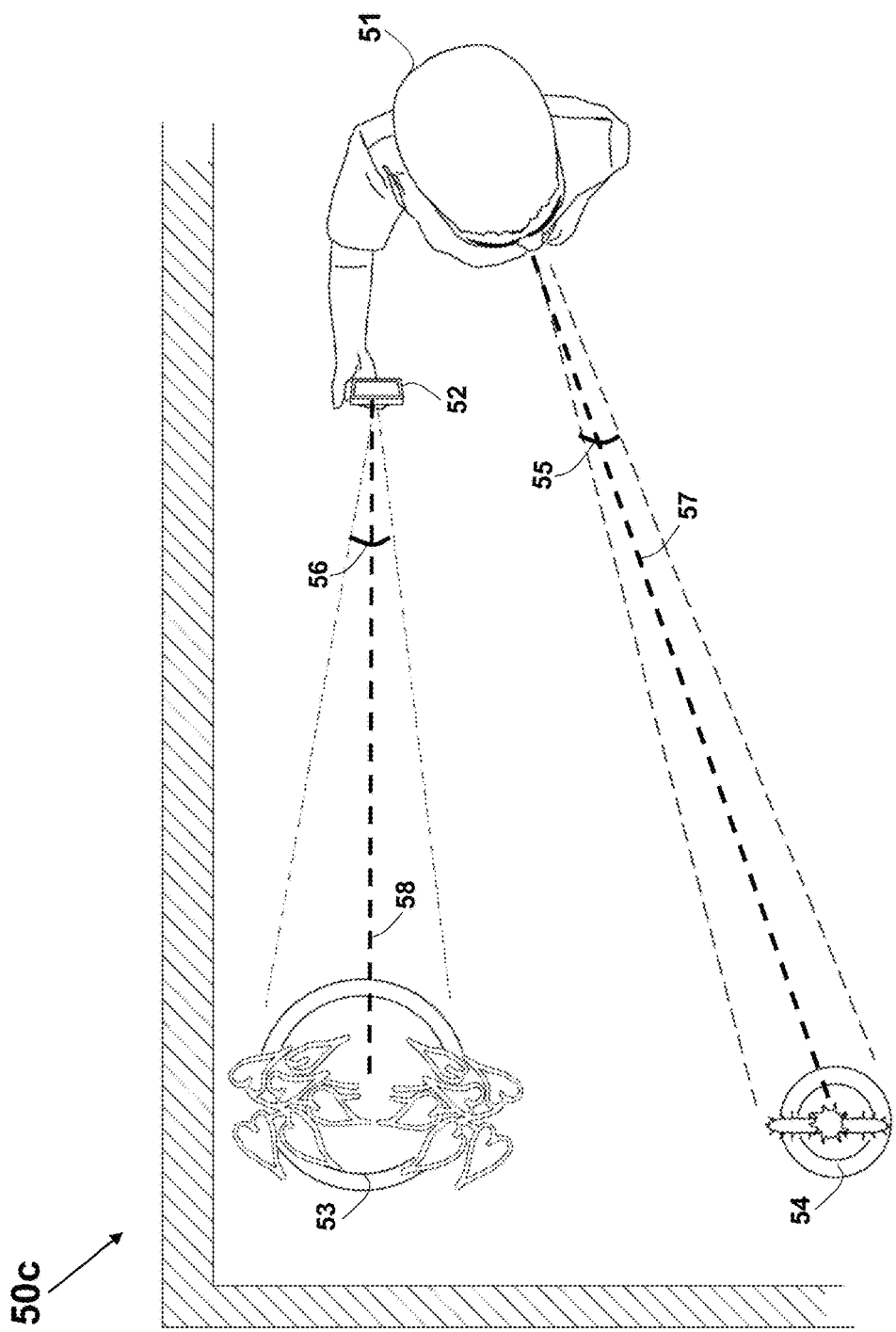
FIG. 5c depicts pictorially a top view of a person holding a dual-camera hand-held device, where the person and a camera are looking at different objects.

An arrangement where the fields of view are not overlapping is shown in a perspective view 50b of the person 51 holding the dual-camera device 52 as shown in FIG. 5b and a top view 50c of this scene is shown in FIG. 5c. The person 51 is looking at the plant B 54, that is located in the person 51 Field of View (FOV) having a vertical angle 55a and a horizontal angle 55 (which may be the same, similar, or different angles), centered at the person 51 gaze direction shown by a line of sight 57. The field of view of the rear camera in the device 52 is shown having a vertical angle 56a and a horizontal angle 56, both centered on the rear camera line of sight 58, directed towards plant A 53. The rear camera and the person 51 are not looking at the same object, as the rear camera is capturing the image of the plant A 53, and the person 51 is looking at the plant B 54. Hence there is not an overlapping in their respective field of views, and the image captured by the rear camera is different from the image looked at by the person 51.

Traditionally, the person 51 may look at the screen of the device 52 in order to verify the actual image that is captured by the rear camera, and accordingly operate the rear camera, such as by capturing the image by pressing or touching a shutter button. However, in some cases, the device 52 does not include a screen visible to the person 51, hence the scene to be captured is not apparent to the person 51. Further, it is more intuitive and easier to use if the person 51 is only required to look directly at the object of interest (such as the plant B 54) rather than at an image on a screen. In such a case, the rear camera may be used in order to estimate and evaluate whether there is partial or full overlapping between the rear camera field of view and the person 51 field of view, such as shown in views 50 and 50a, or whether there is non- or poor overlapping, such as shown in views 50b and 50c. The person 51 may be accordingly notified regarding the degree of the estimated overlapping, and may accordingly take an action such as better positioning the rear camera to improve the capturing of the object of interest, or may decide to take a frame in the case where substantial or full overlapping is estimated.

Figure 5D:
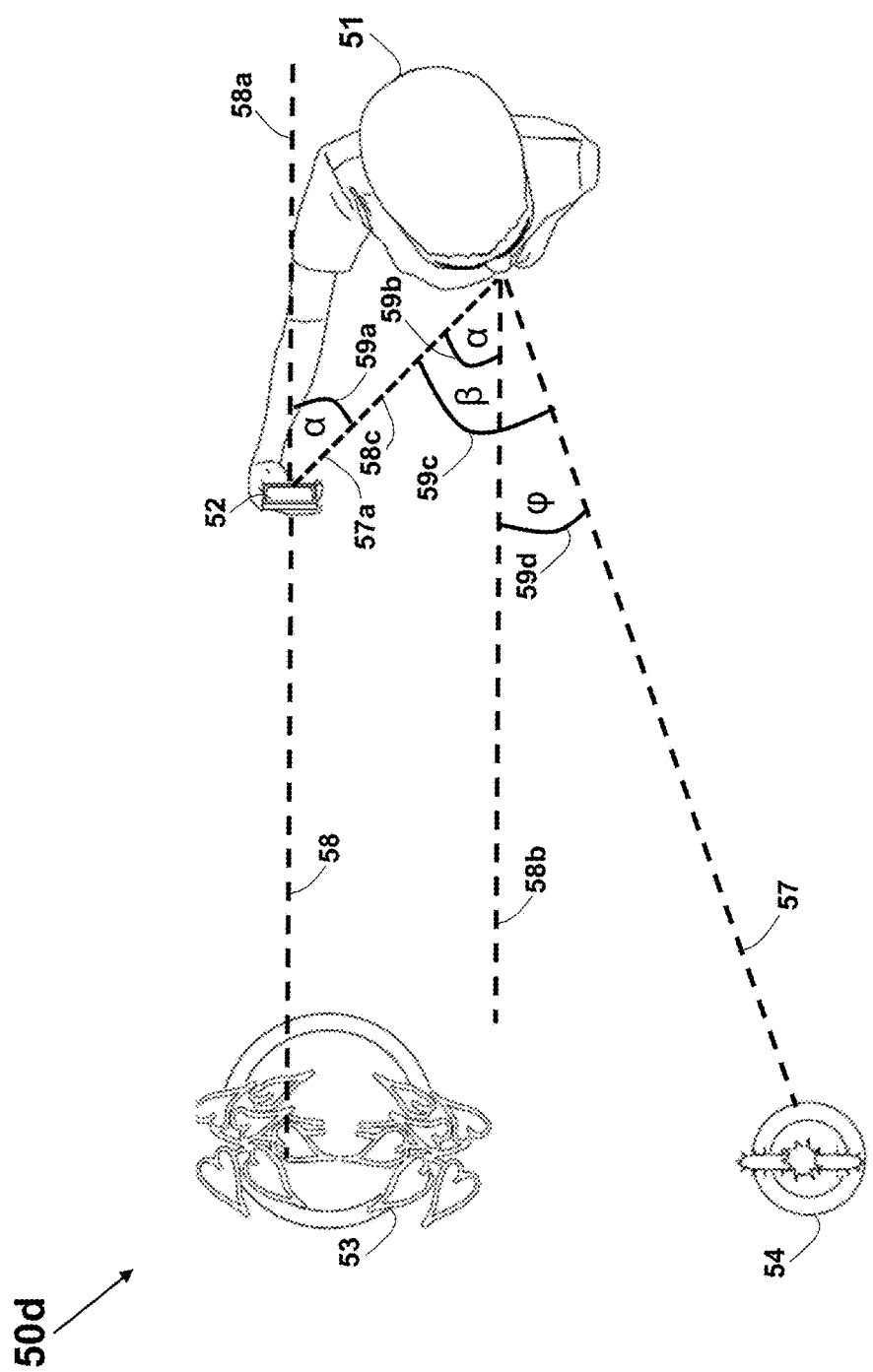
FIG. 5d depicts pictorially the geometrical relations in a top view of a person holding a dual-camera hand-held device, where the person and a camera are looking at different objects.

A geometrical scheme of the top view 50c is shown as a top view 50d in FIG. 5d. As described above, a dashed line 58 represent the horizontal line-of-sight (typically the center of the field of view) of the rear camera that is part of the handheld device 52. In most cases, the rear camera line of sight, denoted as a dashed line 58a, is parallel, and oppositely directed, to the rear camera line of sight 58, and may be considered as an extension of the line 58a. An imaginary line, denoted as dashed line 58b is parallel to the rear camera line of sight 58, but originates at the person 51 eyes, serving as the imaginary origin of the person 51 gaze direction or line of sight 57. A dashed line 57a is connecting the front camera line-of-sight origin to the person 51 gaze origin. An angle α 59a is formed between the front camera line of sight 58a and the line 57a connecting the front camera to the person 51. Since the dashed lines 58, 58a, and 58b are parallel to each other, an angle α 59b is formed between the line 57a and the dashed line 58b representing a person 51 line of sight that is parallel to the rear camera line of sight 58, which is identical to the angle α 59a. In general, the angle α 59a is the angular deviation of the detected face of the person 51 from the line of sight 58a of the front camera.

An angle β 59c is defined between the line 57a and the actual person 51 gaze direction 57. Such an angle β 59c typically represents, or is dependent upon, the head pose as detected by the front camera of the device 52. An angle φ 59d is defined as the angle between the person 51 line of sight (gaze direction) 57 and the imaginary line 58b, that is parallel to the rear camera line of sight 58. As shown in the figure, the angle φ 59d may be calculated as φ=β−α. Thus by estimating or obtaining angle α 59a and the angle β 59c, the angle φ 59d may be calculated or estimated. The angle φ 59d represents the deviation of the person 51 line of sight 57 from the rear camera line of sight 58 (or line 58a), and hence may be used to indicate or estimate the overlapping level of the field of view 56 of the rear camera and the person 51 field of view 55. For example, in the case φ=0, it is an indication that the fields of view are substantially or totally overlapping. Assuming the field of view 56 of the rear camera has a horizontal angular opening of a total of φ degrees, (±φ/2 degrees), in the case where φ≥φ/2, it is expected that the field of views are substantially or totally non-overlapping. In one example, the range may be defined where sufficient overlapping is obtained, such as where φ≤φ/2, φ≤φ/3, or φ≤φ/4. In the general case, the angle φ 59d may be used as a measurement, such as proportional estimation, of the degree of overlapping of fields of respective views.

Figure 6:
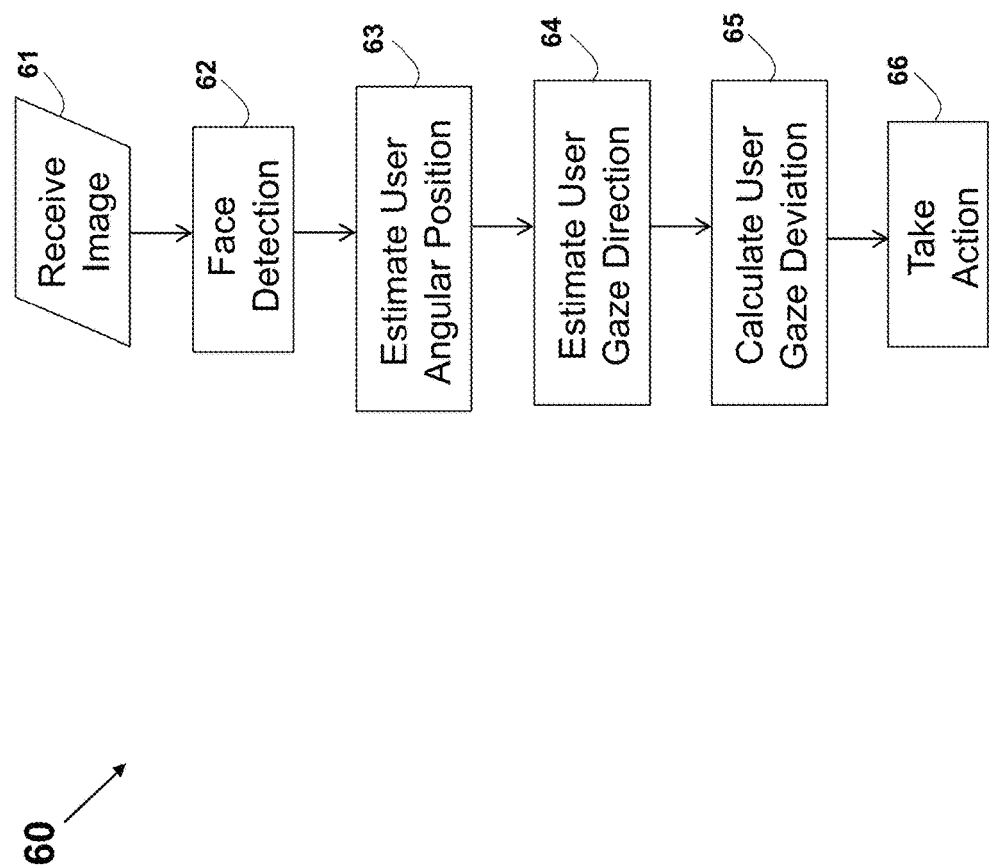
FIG. 6 illustrates schematically a flow diagram of estimating an angular deviation of a person gaze direction from a camera line of sight.

A flow chart 60 for estimation of the angle φ or the degree of the overlapping of the fields of view is shown in FIG. 6. An image of the person 51 holding the device 52 is captured by the front camera of the device 52 as part of a "Receive Image" step 61, and the image is processed by a face detection algorithm in order to detect and preferably locate the position of the face of the person 51 as part of a "Face detection" step 62.

In an "Estimate User Angular Position" step 63, the angle α 59a is estimated or calculated. In one example, a pre-set value is used. For example, a low value of the angle α 59a, such as α≤25° or α=0° is not reasonable, since the device 52 probably interferes or blocks the person 51 line of sight 57. In another example, a low value of the angle α 59a may be used only in one plane, such as vertically or horizontally. For example, a low value may be obtained in the horizontal plane when the user 51 holds the device 52 in front of his chest or above his head, yet resulting a non-low value in the vertical plane. Similarly, a high value of the angle α 59a, such as α≥75° or α=90° is not reasonable, being uncomfortable to the user 51, and making the usage of the device 52 non-intuitive and hard to hold and use. Hence, an example of reasonable values for the angle α 59a may be 30°, 45°, or 60°.

Figure 11:
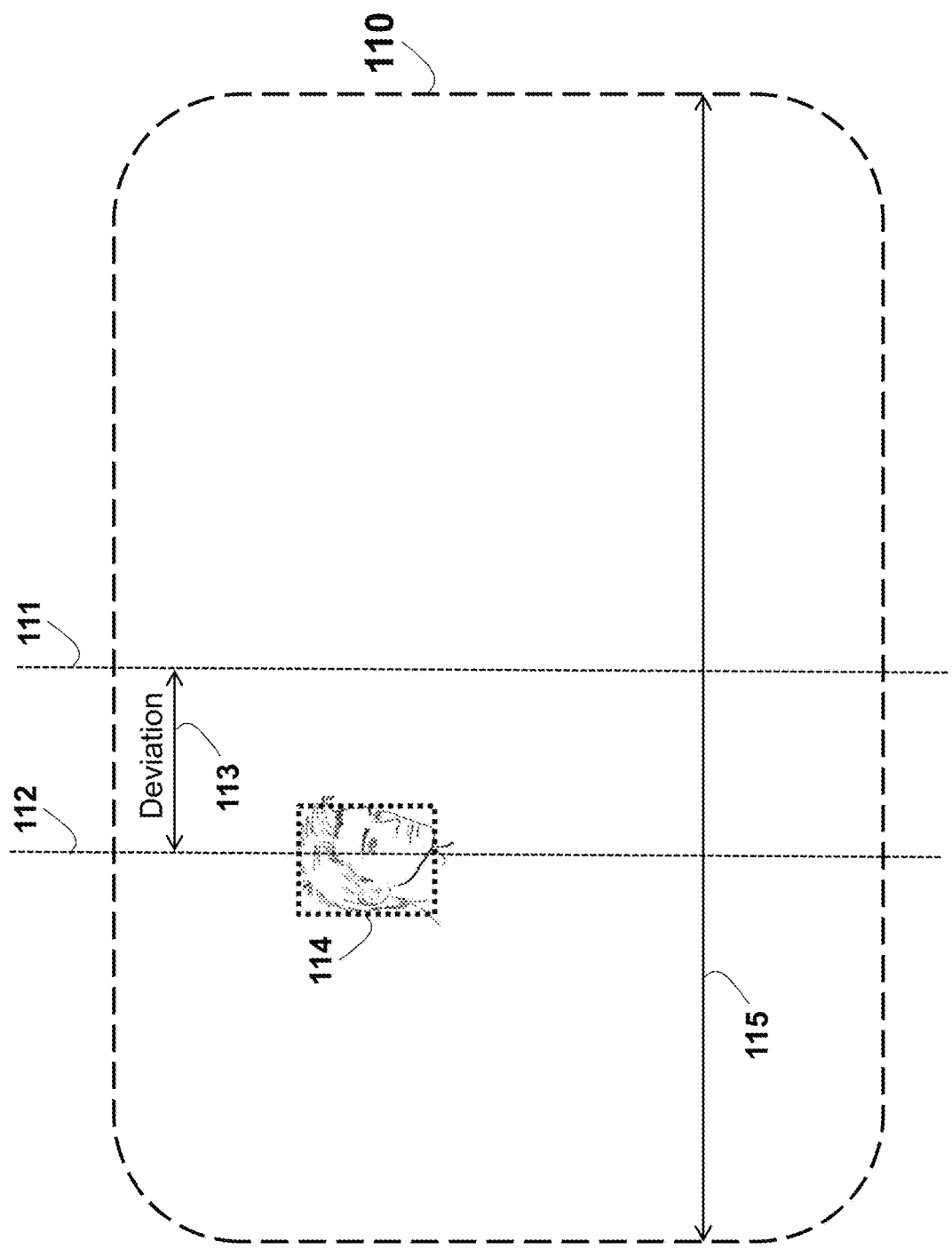
FIG. 11 illustrates schematically distance measurements in an image.

Alternatively or in addition, the user angular position is estimated or calculated based on analyzing or processing the captured image received in the "Receive Image" step 61. A pictorial view of a captured image 110 is shown in FIG. 11. In one example, a single human face 114 is detected in the "Face Detection" step 62, and the horizontal location of the face center is determined and shown as a dashed line 112 in FIG. 11. The dashed vertical line 112 is calculated to be at the detected face 114 center, or preferably between the eyes of the detected face.

Next, the distance deviation 113 between the image center represented by the imaginary dashed line 111 horizontally centered in the image, and the detected face 114 center location line 112 is calculated (shown as the deviation line 113 in FIG. 11). This distance deviation 113 (DEV) represents the deviation of the person location (particularly its face location) from the optimal viewing point represented by the image center line 111. The total horizontal distance (HD) 115 represents the horizontal end-to-end distance of the image. Both the total horizontal distance 115 and the deviation distance 113 may be measured by a number of pixels, actual distance on a printed or shown image, or any other method for estimating distances in an image. Assuming that the front camera has a horizontal angular opening of a total of γ degrees, (±γ/2 degrees), the total horizontal distance (HD) 115 is proportional to the front camera field of view (γ) at the object distance, such as a head distance.

The head distance may be estimated based on knowing that the person is holding the device at a known estimated distance such as 30-40 cm, or alternatively may be calculated or estimated by using the head size in the captured image by a known camera with known γ, compared to an average human head size. Thus by using a known (or average) head size (or any other object of a known size), the proportion between the horizontal distance 115 and front camera field of view (γ) may be calculated.

Similarly, the deviation distance (DEV) 113 is proportional to the angle α 59a. As such, the angle α 59a may be calculated as α=γ*(DEV/HD). Clearly, in the case where the detected face 114 is horizontally centered in the image 110, meaning that DEV=zero, then α=zero, suggesting that the detected face is located at the line of sight of the front camera. Assuming a common field of view of 120°, and a deviation that is centered between the center line 111 and the edge of the image (DEV=HD/4), then the resulting angle α 59a is calculated as: α 120°/4=30°.

In an "Estimate User Gaze Detection" step 64, the angle β 59c is estimated. Any algorithm for an estimation of a person gaze direction may be used. In one example, the user gaze direction may be estimated based on eye location detection, eye tracking, or any other gaze direction based on eye detection. Alternatively or in addition, the person gaze direction estimation may be based on, according to, or use, a head pose estimation or detection algorithm. Preferably, the user gaze direction may be based on a combination of both head pose and eye location detection, as described for example in a paper published in IEEE Transaction on Image Processing, Vol. 21, No. 2, February 2012 by Roberto Valenti entitled: "*Combining Head Pose and Eye Information for Gaze Estimation*", and in an article by Roberto Valenti, Adel Lablack, Nicu Sebe, Chabane Djeraba, and Theo Gevers entitled: "*Visual Gaze estimation by Joint Head and Eye Information*", which are all incorporated in their entirety for all purposes as if fully set forth herein.

Various techniques are available for detecting the existence and location of parts of a human face, such as nose, nose corner, eyes, canthi, mouth, mouth corner, cheeks, ears and other facial landmarks. An example of such an algorithm is described in a paper published in Proc. of IEEE Conference on Computer Vision and Pattern Recognition, 2009, by J. Sivic, M. Everingham and A. Zisserman, entitled: "'*Who are you?'—Learning Person Specific Classifiers from Video*", in Master's Thesis of M. Uricar May 2011 entitled: "*Detector of Facial Landmarks*", and in a paper published in VISAPP '12: Proceedings of the 7th International Conference on Computer Vision Theory and Applications, 2012, by M. Uricar, V. Franc and V. Hlavac entitled: "*Detector of Facial Landmarks Learned by the Structured Output SVM*", which are all incorporated in their entirety for all purposes as if fully set forth herein. Further, an open source implementation of a detection of facial landmarks detection is available for download (March 2015) from: cmp.felk.cvut.cz/~uricamic/flandmark/(preceded by http://).

In one example, facial landmark (or facial parts) detection may be used for estimating the user gaze by estimating the user head pose, and may be represented by the angle β 59c. For example, the existence of, or the number of, facial landmarks or parts detected may be used. In one example, if both user's ears are detected, the person 51 may be looking directly (or substantially directly) at the front camera, and accordingly the angle β 59c is zero or near zero (β=0° or β~0°), such as β≤10°. In the case illustrated in the view 50c, the person 51 left ear is probably not shown in the image and thus cannot be detected, while the other facial parts, such as left cheek and left eye, as well as the right ear, are captured and thus may be detected in the captured image. In such a case, the head pose angle β 59c may be estimated to be about 30°. Similarly, in the case where only the right side of the face is shown and detected, such as the right eye, right cheek, and right ear, it can be estimated that the user 51 head pose is substantially left and perpendicular to the front camera line of sight, hence β=90° or β~90°. Similarly, the detection of right or left nostrils or cheeks may be used for estimating the head pose.

A stereo vision is the extraction of 3D information from digital images, obtained by two or more digital cameras. By comparing information about a scene from two vantage points, three-dimension (3D) information can be extracted by examination of the relative positions of objects in the two panels, similar to the human two-eyes process referred to as Stereopsis. In a stereo vision scheme, two cameras are displaced horizontally from one another and used to obtain two differing views of a scene, in a manner similar to human binocular vision. By comparing these two images, the relative depth information can be obtained, in the form of disparities, which are inversely proportional to the differences in distance to the objects. Typically, several processing steps are required, including removing of distortions from the images, such as barrel distortion, to ensure that the observed image is purely projectional, projecting back to a common plane to allow comparison of the image pairs (known as image rectification), creating a disparity map by estimating the position of features in the two images, and converting to a height map by inversion the disparity as observed by the common projection, is, and when utilizing the correct proportionality constant, the height map can be calibrated to provide exact distances. Multi-view stereo processing algorithms are described in a paper by Steven M. Seitz, Brian Curless, James Diebel, Daniel Scharstein, and Rochard Szeliski, entitled: "*A Comparison and Evaluation of Multi-View Stereo Reconstruction Algorithms*", which is incorporated in its entirety for all purposes as if fully set forth herein. Devices having multiple cameras are becoming popular, such as Amazon Fire Phone available from AMAZON.COM, INC. Headquartered in Seattle, Wash., 98109 U.S.A., having multiple rear cameras and supporting 3D images capturing, described in the '*Fire Phone User Guide*', which is incorporated in its entirety for all purposes as if fully set forth herein.

In one example, two (or more) front cameras are used, providing stereo vision capability of the user 51, and a 3D model is formed and analyzed for estimating the head pose and the gaze direction. An algorithm for extracting head pose and gaze direction from a stereo vision information is disclosed in an article describing a research at The Australian National University by Yoshio Matsumoto and Alexander Zelinsky entitled: "*An Algorithm for Real-Time Stereo Vision Implementation of Head Pose and Gaze Direction Measurement*", which is incorporated in its entirety for all purposes as if fully set forth herein.

The person 51 angular position relative to the front camera of device 52, shown as the angle α 59a is calculated or estimated as part of the "Estimate User Angular Position" step 63. The person 51 line of sight relative to the front camera of device 52, shown as the angle β 59c is calculated or estimated as part of the "Estimate User Gaze Direction" step 64. In a "Calculate User Gaze Detection" step 65, the deviation of the user 51 gaze direction from the optimal rear camera line of sight 58 or 58b, represented by the angle φ 59d may be calculated as φ=β−α, and an action may be taken in response to the calculated or estimated value of the angle φ 59d in a "Take Action" step 66. Any action described herein, such as an action that is part of the "Take Action" step 105 or of the "Take Action" step 89, may be equally applicable to "Take Action" step 66, based on the calculated or estimated value of the angle φ 59d.

Further, the rear digital camera may be controlled based on estimated value of the angle φ 59d itself, or based on the fact that the estimated value of the angle φ 59d is above (or below) a pre-set threshold value. For example, upon the estimated value of the angle φ 59d exceeding a maximum threshold or upon falling below a minimum threshold, an action may be initiated or controlled. For example, the rear digital camera may automatically capture an additional image, or inhibit the user from capturing an image. Further, an action may be affected only when the threshold is being exceeded or any other condition is satisfied for a pre-set time interval, in order to allow for stable operation. For example, the rear digital camera may automatically capture an additional image in the case the angle φ 59d is below a set threshold (e.g., 30°) for a 0.5, 1, 2, or 3 seconds. In another example, the digital camera settings may be controlled, such as the changing the aperture size (e.g., aperture diameter), exposure time or index, focal length, exposure index, or any combination thereof. For example, the exposure index and the exposure time may be controlled in response to measured or estimated sharpness or other feature, in order to improve the captured image sharpness. Alternatively or in addition, the angle φ 59d value may be used as a condition for saving the captured image to a memory, such that only captured images associated with a value above the minimum threshold are saved, while captured images associated with a value below the minimum threshold are discarded.

While exampled above regarding calculating or estimating the horizontal deviation of the person 51 gaze from an optimal one, the method and system may equally apply to calculating or estimating the vertical deviation of the user gaze direction. In such a case, the vertical user deviation is estimated or calculated in the "Estimate User Angular Position" step 63, the vertical user gaze direction is estimated or calculated in the "Estimate User Gaze Direction" step 64, and these values are used for calculating the vertical deviation in the "Calculate User Gaze Deviation" step 65. In one example, both the vertical and the horizontal deviations are estimated or calculated, and an action may use either one or both of the obtained values. Further in such a case, a total angle φ[φ$_{total}$] may be calculated based on the vertical value φ designated as φ$_{vertical}$ and on the horizontal value φ designated as φ$_{horizontal}$, such as φ$_{total}$=φ$_{vertical}$+φ$_{horizontal}$ or φ$_{total}$=$\sqrt{\varphi vertical^2 + \varphi horizontal^2}$. The action taken in the "Take Action" step 66 may be then be based on the value of φ$_{horizontal}$.

While FIGS. 5d and 5c represent a 2D projection planes, the method may equally apply to a real world 3D scene, where multiple projections (beyond vertical and horizontal projections) may be used in order to obtain a better estimation of the overlapping of the rear camera and the user gaze field of views. For example, multiple horizontal and/or horizontal with varying depth may be used, as well as any other plane angles. A weighted average of all these multiple 2D projections may be calculated in order to obtain a better estimation of the correlation of the total angle φ$_{total}$.

The user angular position is described above as being estimated in the "Estimate User Angular Position" step 63 based on image processing of an image captured by the rear camera of the device 52. Similarly, the user gaze direction is described above as being estimated in the "Estimate User Gaze Direction" step 64 based on image processing of an image captured by the front camera of the device 52. Alternatively or in addition, the user angular position, the user gaze direction, or both, may be estimated using another sensor in the device 52. Further, the user angular position, the user gaze direction, or both, may be estimated using another sensor (or sensors) that is not part of the device 52. For example, a sensor (or sensors) may be external to the sensed person 51 body, implanted inside the body, or may be wearable.

Figure 14:
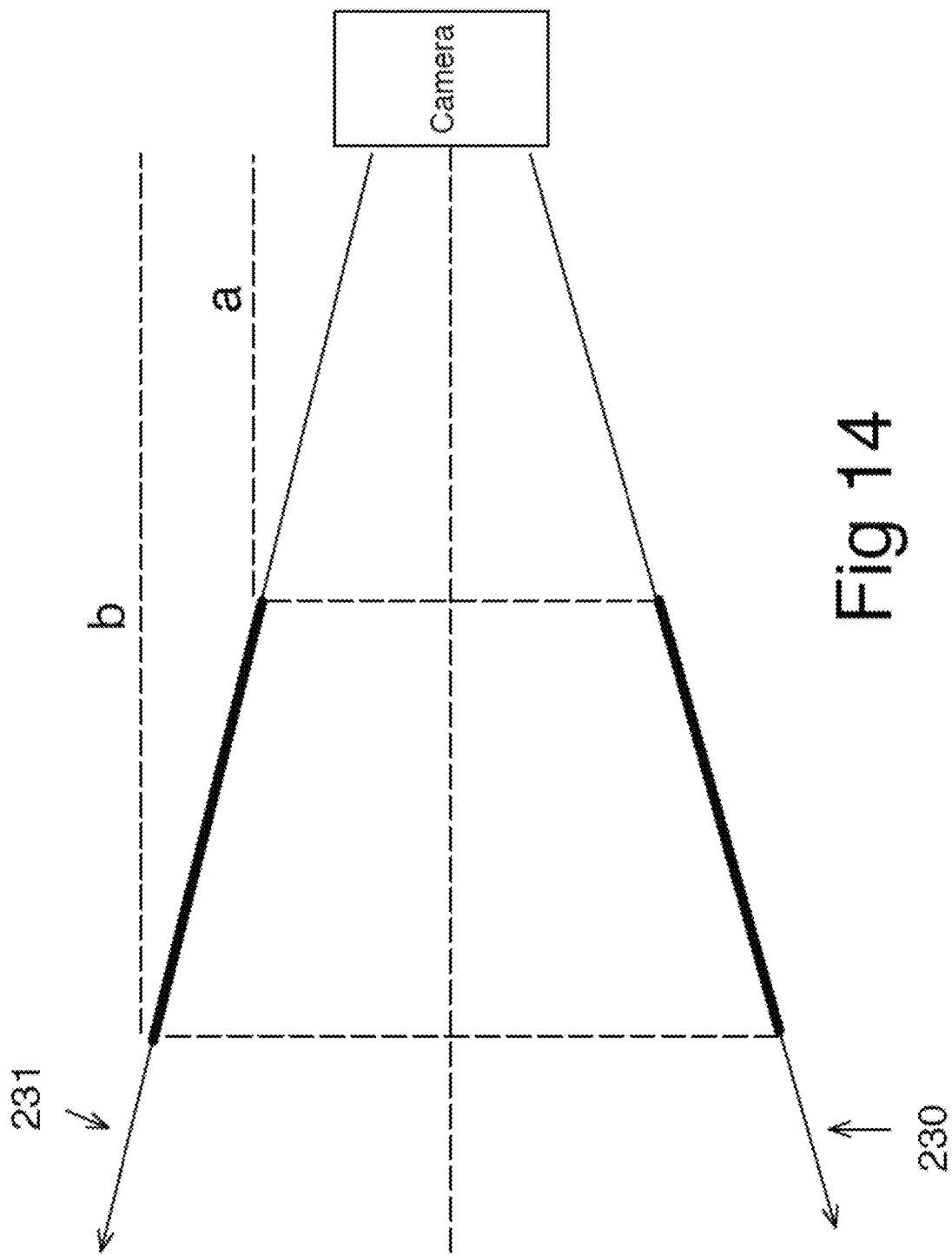
FIG. 14 depicts pictorially a cross section of a camera 2D field of view.

While explained above regarding the estimation of a 2D overlapping of the rear camera FOV and the user FOV, a 3D (volume) overlapping may equally be estimated. In one example, part of the infinite volume captured by a camera is considered, such as by setting a depth limit, as shown in FIG. 14. The volume to be considered is defined as the volume between a plane defined by distance 'a' and a plane defined by the distance 'b' from a camera, and inside the FOV. Similarly, a volume that is part of a user FOV may be defined by two distance values representing two parallel planes perpendicular to the user center line-of-sight, as shown in FIG. 14.

Figure 13:
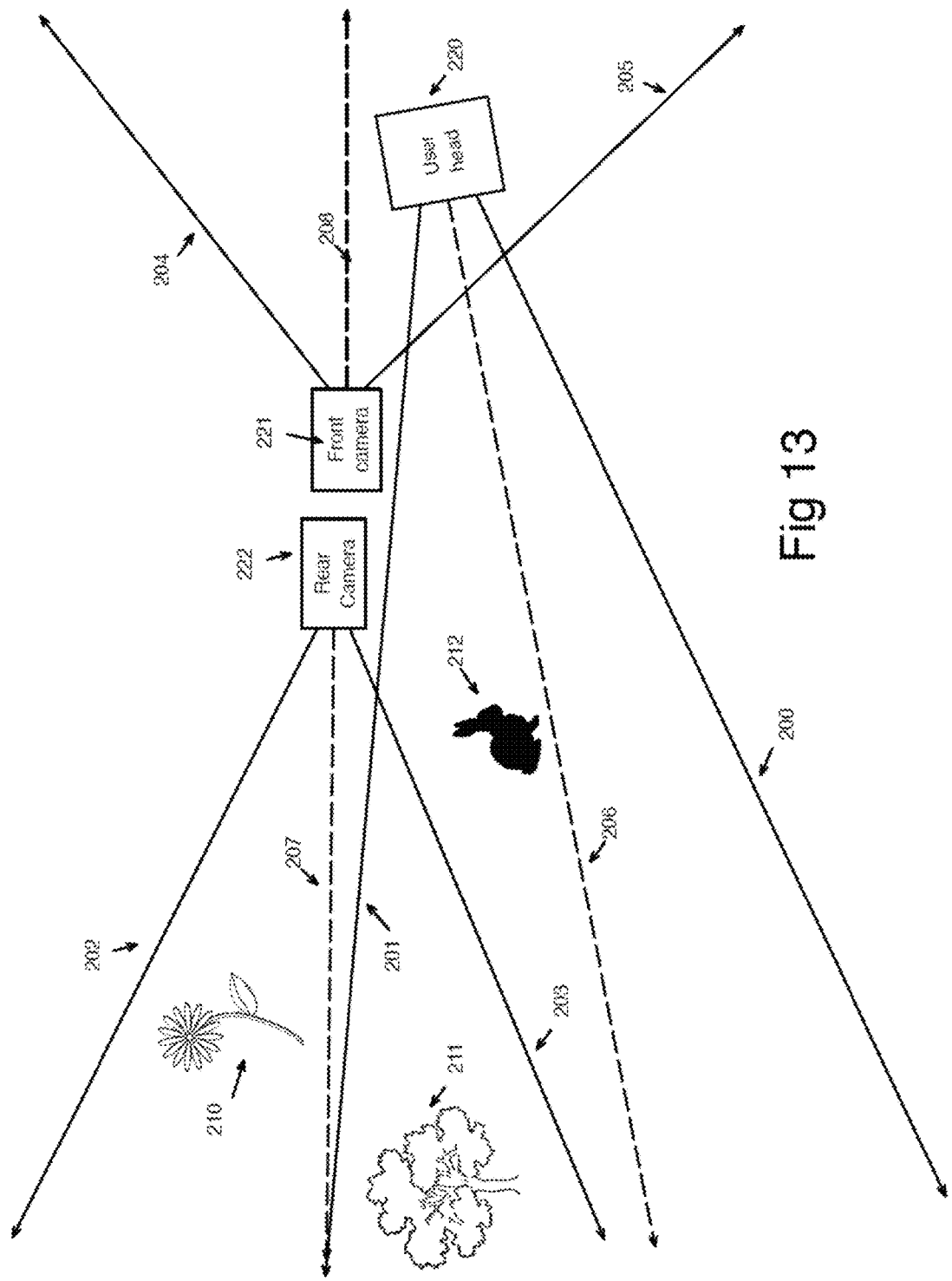
FIG. 13 depicts pictorially the geometrical relations of an arrangement including separated rear and front cameras and a user.

A top view of a general physical arrangement is shown in FIG. 13, having a rear camera 222 having a center line of sight 207, and a FOV limited by lines 202 and 203. A front camera 221, distinct and separated from the rear camera 222 is shown having a center line of sight 208, and a FOV limited by lines 204 and 205. The front camera 221 is positioned to capture a user's head 220, positioned having a gaze direction 206, and a FOV limited by lines 200 and 201.

Since the head size of human adults is known to be substantially similar to most humans, and given the known front camera 221 properties, the distance of the user 220 from the front camera 221 (represented as line 58c in view 50d in FIG. 5d) may be estimated. Further, the angle β 59c relating to the angular deviation of the person 220 line of sight 206 relative to the front camera 221 may be estimated as described above. The coordinates of origin of user field of view 206, defined as the user coordinates system (0, 0, 0), may be determined relative to the rear camera 222 coordinates system, based on the estimated distance and the estimated angle β 59c. Thus a transformation matrix may be constructed for transforming from the user coordinates system to the rear camera 222 coordinates system. The estimated distance may be used to construct a translation matrix, and the user gaze (calculated in user gaze estimation) may be used for to construct a rotation matrix, and the two matrices may be combined to form a transformation matrix. The transformation matrices to and from the rear camera 222 and to and from the front camera 221 may be calculated from the known distances and angles of the two cameras, whether or not they are integrated in a single device. The coordinates of every point inside the user field of view, given a cone to represent the 3D field of view, may be calculated using front camera 221 coordinate system. In one example, a cone formula may be used, such as $x^2+y^2=E^2*z^2$, where z is the axis of the cone.

A point in a space defined by 3D coordinates may be determined or estimated to be inside or outside the rear camera 222 field of view. Using the known distance and relations of the rear 222 and front 221 cameras, a rotation and translation matrix may be constructed, allowing for transformation of a point in one coordinate system to the other coordinate system. For example, a translation matrix may be constructed based on the known distance between the cameras, and the rotation matrix may be constructed based on the known position of the cameras in the device, such as a smartphone. Based on the known rotation and translation matrices from the front camera 221 to the user gaze coordinate system described herein, a point located in the rear camera 222 coordinate system may be transformed to the user gaze coordinate system. The rear camera 222 focus properties may be used to estimate the field of view coordinates that are inside the Depth Of Field (DOF), in order to estimate the exact object size and distance from the rear camera 222. For example, in a case wherein the depth of field is 5 to 10 meters from the camera, the camera angle of view is X, and assuming cone shape field of view, points may be calculated and determined to be inside or outside the field of view in the DOF region. A 3D coordinates system may be easily converted to another system by multiplying a point in one coordinate system in a transformation matrix that contains the appropriate rotation and translation, to obtain that point coordinates in the second coordinate system.

One way to estimate the rear camera and head FOV percentage of shared FOV is to use a Monte Carlo analysis method on points inside the rear camera FOV inside the DOF, convert them to the head coordinate system, and check if they are inside the user field of view. In the example shown in FIG. 14, the DOF of the field of view 2D cross section defined by lines 230 and 231 is defined as between the distance 'a' and 'b'. Any point inside that area may be considered "relevant FOV". In a Monte Carlo method we choose multiple random points (such as 100 or 1000 points) inside this relevant rear camera FOV, and each point is transformed to the user head coordinate system for checking if it is inside the user FOV.

The fraction obtained by dividing the number of points that passed this test by total number of points chosen randomly is defined as 'pass fraction' of points, denoted by 'G'.

This fraction calculation may be used as part of, as a substitute for, or combined with, the "Estimate User Gaze Detection" step 65. Further, as part of the "Take Action" step 66, an action may be taken when the pass fraction is above (or below) a pre-defined threshold. For example, an action may be taken if the pass fraction is above 0.8 (80%).

The calculation of the level of FOVs overlapping may use various algorithms and techniques, such as a linear-time algorithm that recovers absolute camera orientations and positions, for network of terrestrial image nodes in outdoor urban scenes described in UCV 49(2/3), pp. 143-174, September/October 2002 article by Mattew Antone and Seth Teller entitled: "*Scalable Extrinsic Calibration of Omni-Directional Image Networks*", estimating the relative pose between axial cameras from pairwise point correspondence as described in an article by Francisco Vasconcelos and Joan P. Barreto of the University of Coimbra, Coimbra, Portugal, entitled: "*Towards a minimal solution for the relative pose between axial cameras*", and in U.S. Pat. No. 8,913,791 to Datta et al., entitled: "Automatically Determining Field of View Overlap Among Multiple Cameras", which are all incorporated in their entirety for all purposes as if fully set forth herein. Other methods for calculating the FOV overlapping are described in the chapter entitled: "*Estimating the Mutual Orientation in a Multi-camera System with a Non Overlapping Field of View*" by Daniel Muhle, Steffen Abraham, Christian Heipke and Manfred Wiggenhagen, published by Photogrammetric Image Analysis, Lecture Notes in Computer Science Volume 6952, 2011, pp 13-24.

The method may be used to estimate that the tree 211 is viewable by both the rear camera 222 and user 220, that a rabbit 212 is only seen by the user 220, and that the flower 210 is only seen by the rear camera 222. It is noted that in the example shown in FIG. 13, the rear camera 222 and front camera 221 respective center-lines of FOV 207 and 208, may not be on the same line.

Assuming a camera having a sensor that is 3.39 mm tall (referenced to landscape mode), then half of that is 1.695 mm. For example, the focal length of the iPhone 4 is listed as 3.85 mm. By calculating an a tan(1.695/3.85) to be 23.75° from center to top, or 47.5° degrees top to bottom. For the longer dimension 4.52/2=2.26 mm, the calculation of a tan(2.26/3.85)=30.41° center to side, or 60.8° left to right (again referencing with respect to landscape orientation). Hence, such a camera properties may be defined by 60.8° horizontal by 47.5° vertical. A sensor size for the iPhone 5S back camera is reported to be 4.89×3.67 mm, with a focal length of 4.12 mm. In such a case, the horizontal calculation results in 2*a tan((4.89/2)/4.12)=61.4° degrees wide, and 2*a tan((3.67/2)/4.12)=48.0° top to bottom.

A method for computing a photo quality of an image captured by an image acquisition device (or system) is described in Patent Cooperation Treaty (PCT) International Application (IA) Publication No. WO 2014/064690 to Sivan, entitled: "Real Time Assessment of Picture Quality" (hereinafter the '690 PCT Publication'), which is incorporated in its entirety for all purposes as if fully set forth herein. Each of the methods of steps herein may consist of, include, be part of, or be based on, a part of, or the whole of, the functionalities or structure (such as software) described in the '690 PCT Publication. Further, each of the devices or elements herein may consist of, include, be part of, or be based on, a part of, or the whole of, the devices or elements described in the '690 PCT Publication.

The term "Quality Indicator" (QI) herein refers to a value that indicates the quality of an image or a part thereof, such as a region or an object in the image. Image quality is a characteristic of an image that measures the perceived image degradation (typically, compared to an ideal or perfect image) such as distortion or artifacts, typically introduced by imaging systems, where an image is formed on the image plane of the camera and then measured electronically or chemically to produce the photograph. In one example, image quality may be related to the deviation from an ideal model of photograph formed in a camera by measuring light that is representing the amount of light that falls on each point at a certain point in time. Further, an image for which quality should be determined is primarily not the result of a photographic process in a camera, but the result of storing or transmitting the image. A typical example is a digital image that has been compressed, stored or transmitted, and then decompressed again. Unless a lossless compression method has been used, the resulting image is normally not identical to the original image and the deviation from the (ideal) original image is then a measure of quality. In one example, a QI may be as defined in the '690 PCT Publication. Alternatively or in addition, the QI may be relating to quantifying the existence of a feature, a characteristic, or an object in the entire image or in a region thereof.

Methods for estimating a numerical value for an image file in a color model format having three channels. A region of the image including a detected object (such as a human face) is extracted and converted to a Luma/Chroma color model. The non-object parts are detected and removed (such as non-skin parts) from the extracted region, and the correlation between the chroma channels is calculated. The numerical value is estimated based on comparing the channels average and standard deviation values, or by calculating the respective correlation coefficient. A numerical value may be estimated by analyzing multiple sequentially captured images, by associating a value and a weighting factor for each image, and by calculating a multi-image numerical value using weighted arithmetic, geometric, or harmonic mean. The weighting factors may be calculated based on the image age, difference analysis, detected trend, or based on a sensor output.

Figure 3:
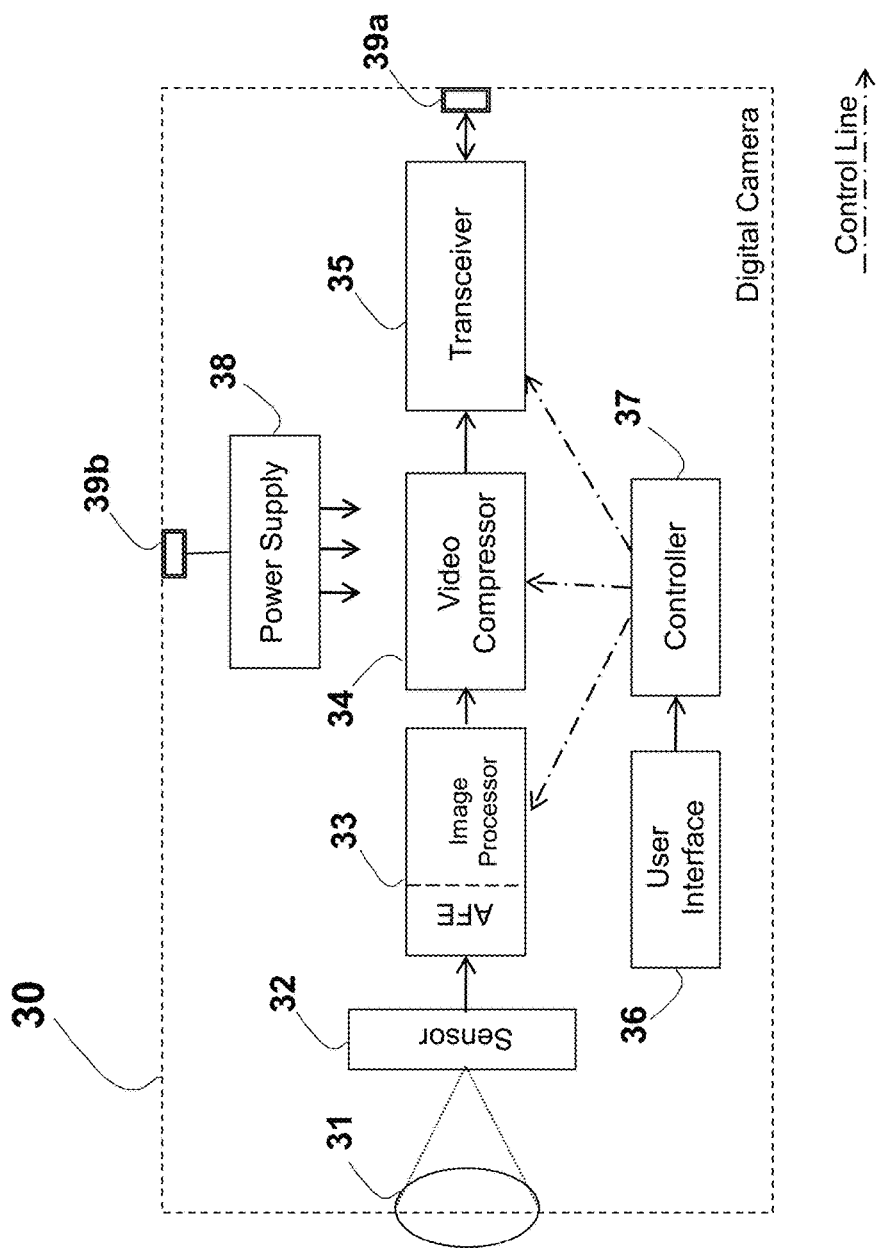
FIG. 3 illustrates schematically a block diagram of a digital camera.
Figure 4:
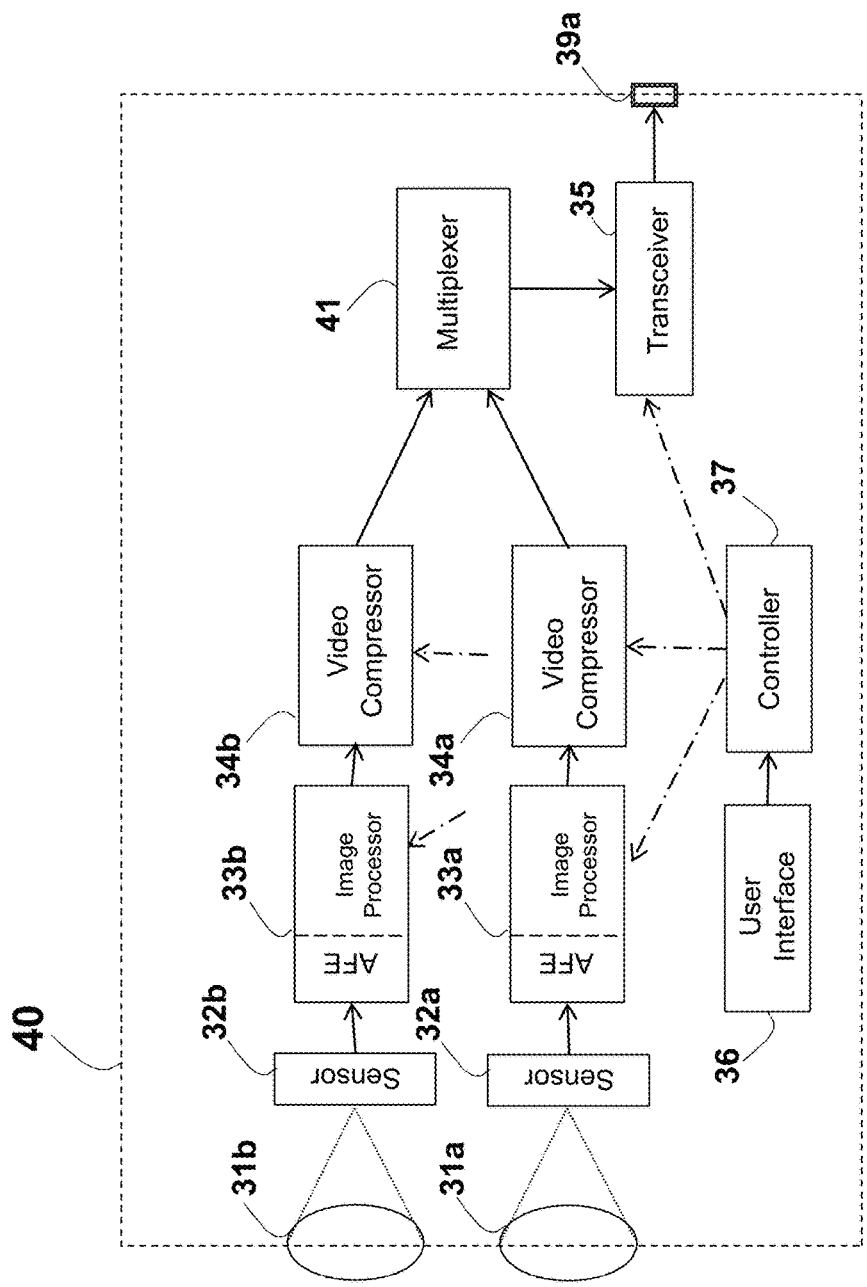
FIG. 4 illustrates schematically a block diagram of a digital camera having two image sensors.

In a typical digital camera such as the digital camera 30 shown in FIG. 3, the resulting image quality depends on all three factors mentioned above: how much the image formation process of the camera deviates from the pinhole model, the quality of the image measurement process, and the coding artifacts that are introduced in the image produced by the camera, such as by a JPEG coding method. While the image quality is typically objectively determined in terms of deviations from the ideal models, an image quality may equally be related to a subjective perception of an image, such as by a human looking at a photograph. An Image Quality Metrics (IQM) is described in an article by Kim-Han Thung and Paramesran of the Dept. of Electrical Engineering of University of Malaya, entitled: "*A survey of Image Quality Measures*", and in the paper entitled: "*Image Quality Metrics*" by Alan Chalmers et al., (Course #44, SIGGRAPH 2000), which are both incorporated in their entirety for all purposes as if fully set forth herein.

Systems and methods for determining face regions in an image, and for computing an overall image exposure score for an image are described in U.S. Pat. No. 8,873,850 to Krishnaswamy, entitled: "Detecting Exposure Quality in Images", which is incorporated in its entirety for all purposes as if fully set forth herein.

Factors of image quality may include image sharpness, noise, dynamic range, tone reproduction, contrast, color accuracy, distortion, vignetting, exposure accuracy, Lateral Chromatic Aberration (LCA), Lens flare, color moiré, or artifacts. An image sharpness is typically affected by the lens (such as lens 31 of the digital camera 30) design and manufacturing quality, focal length, aperture, and distance from the image center, by the image sensor characteristics (such as the image sensor 32), such as pixel count and anti-aliasing filter, as well as by the focus accuracy, and the atmospheric disturbances (thermal effects and aerosols). Noise is a random variation of image density, visible as grain in film and pixel level variations in digital images, and it commonly arises from the effects of basic physics—the photon nature of light and the thermal energy of heat— inside image sensors. Dynamic range (or exposure range) refers to the range of light levels a camera can capture, usually measured in f-stops, EV (Exposure Value), or zones (all factors of two in exposure). Tone reproduction is the relationship between scene luminance and the reproduced image brightness. Contrast, also known as gamma, is the slope of the tone reproduction curve in a log-log space. Color accuracy refers to the color shifts, saturation, and the effectiveness of its white balance algorithms. Distortion refers to an aberration that causes straight lines to curve. Vignetting (or light falloff) is the effect of darkening images near the corners. Lateral Chromatic Aberration (LCA), also known as "color fringing", is a lens aberration that causes colors to focus at different distances from the image center, and it is most visible near corners of images. Lens flare may refer to a stray light in lenses and optical systems caused by reflections between lens elements and the inside barrel of the lens, and may cause image-fogging (loss of shadow detail and color) as well as "ghost" images. Color moiré is artificial color banding that can appear in images with repetitive patterns of high spatial frequencies, like fabrics or picket fences. It is affected by lens sharpness, the anti-aliasing (low-pass) filter (which softens the image), and de-mosaicing software.

Flare. Flare, or lens flare, is the light scattered in lens systems through generally unwanted image formation mechanisms, such as internal reflection and scattering from material inhomogeneities in the lens. Flare manifests itself in two ways: as visible artifacts, and as a haze across the image. The haze makes the image look "washed out" by reducing contrast and color saturation (adding light to dark image regions, and adding white to saturated regions, reducing their saturation). Visible artifacts, usually in the shape of the lens iris, are formed when light follows a pathway through the lens that contains one or more reflections from the lens surfaces. Flare is particularly caused by a very bright light source in either the image, which produces visible artifacts, or shining into the lens but not in the image—which produces a haze. Most commonly, this occurs when shooting into the sun (when the sun is in the frame or the lens is pointed at the direction of the sun), and is reduced by using a lens hood or other shade.

The spatial distribution of the lens flare typically manifests as several starbursts, rings, or circles in a row across the image or view. Lens flare patterns typically spread widely across the scene and change location with the camera's movement relative to light sources, tracking with the light position and fading as the camera points away from the bright light until it causes no flare at all. The specific spatial distribution of the flare depends on the shape of the aperture of the image formation elements. When a bright light source is shining on the lens but not in its field of view, lens flare appears as a haze that washes out the image and reduces contrast. Modern lenses use lens coatings to reduce the amount of reflection and minimize flare. The use of photographic filters can cause flare, particularly ghosts of bright lights (under central inversion). In digital cameras, where the sun is shining on an unprotected lens, a flare may be in the form of a group of small rainbows. This artifact is formed by internal diffraction on the image sensor, which acts like a diffraction grating.

Backlighting. Backlighting refers to bright lighting that originates from behind an object of interest leads to underexposure for the main subject. A person standing in front of a window or entering through an outside door are common examples. When viewed using a regular digital camera, the person entering through the door appears silhouetted.

Blur. Motion blur is the apparent streaking of relative movement between a camera and an object in a still image, and typically results when the position of an image or object being captured (or the camera) changes during the recording of a single frame, either due to rapid movement or long exposure, since a camera creates an image that does not represent a single instant of time, but rather the image may represent the scene over a period of time. A fast moving object, a camera moving, or longer exposure time may result in blurring artifacts, which make it apparent as a blur. Any object moving with respect to the camera looks blurred or smeared along the direction of relative motion, and this smearing may occur on an object that is moving or on a static background or object if the camera is moving. A method and system for estimating motion blur of an image associated with a moving object by inspecting and computing a radon transform of a power spectrum associated with the image are described in U.S. Patent Application Publication No. 2011/0096180 to McCloskey et al., entitled: "Fourier Domain Blur Estimation Method and System", which is incorporated in its entirety for all purposes as if fully set forth herein.

Figure 7:
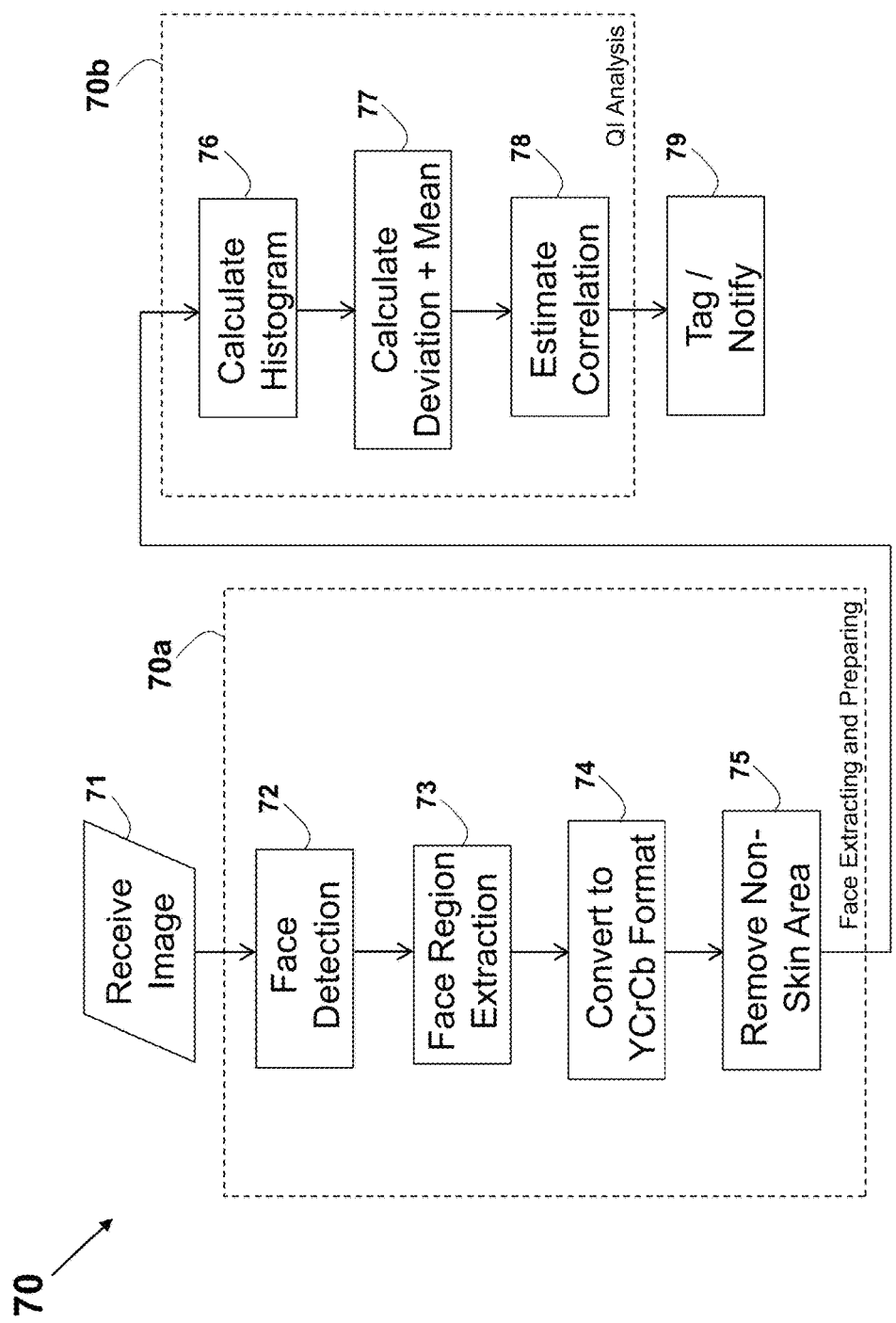
FIG. 7 illustrates schematically a flow diagram of calculating a QI for an image based on face detection and histogram analysis.

An example of estimating a QI of a human face exposure in an image is exampled in a flow chart 70 shown in FIG. 7. A captured image is received as part of a "Receive Image" step 71, typically from an image sensor such as the image sensor 32 that is part of the digital camera 30. A human face is detected in the captured image as part of a "Face Detection" step 72, using any face detection technique or algorithm.

The "Face Detection" step 72 typically includes an algorithm for identifying a group of pixels within the captured image that relates to the existence, location, and size, of human faces. Common face-detection algorithms focused on the detection of frontal human faces, and other algorithms attempt to solve the more general and difficult problem of multi-view face detection. That is, the detection of faces that are either rotated along the axis from the face of the observer (in-plane rotation), or rotated along the vertical or left-right axis (out-of-plane rotation), or both. Various face-detection techniques and devices (e.g., cameras) having face detection features are disclosed in U.S. Pat. No. 5,870,138 to Smith et al., entitled: "Facial Image Processing", in U.S. Pat. No. 5,987,154 to Gibbon et al., entitled: "Method and Means for Detecting People in Image Sequences", in U.S. Pat. No. 6,128,397 to Baluj a et al., entitled: "Method for Finding All Frontal Faces in Arbitrarily Complex Visual Scenes", in U.S. Pat. No. 6,188,777 to Darrell et al., entitled: "Method and Apparatus for Personnel Detection and Tracking", in U.S. Pat. No. 6,282,317 to Luo et al., entitled: "Method for Automatic Determination of Main Subjects in Photographic Images", in U.S. Pat. No. 6,301,370 to Steffens et al., entitled: "Face Recognition from Video Images", in U.S. Pat. No. 6,332,033 to Qian entitled: "System for Detecting Skin-Tone Regions within an Image", in U.S. Pat. No. 6,404,900 to Qian et al., entitled: "Method for Robust Human Face Tracking in Presence of Multiple Persons", in U.S. Pat. No. 6,407,777 to DeLuca entitled: "Red-Eye Filter Method and Apparatus", in U.S. Pat. No. 7,508,961 to Chen et al., entitled: "Method and System for Face Detection in Digital Images", in U.S. Pat. No. 7,317,815 to Steinberg et al., entitled: "Digital Image Processing Composition Using Face Detection Information", in U.S. Pat. No. 7,315,630 to Steinberg et al., entitled: "Perfecting a Digital Image Rendering Parameters within Rendering Devices using Face Detection", in U.S. Pat. No. 7,110,575 to Chen et al., entitled: "Method for Locating Faces in Digital Color Images", in U.S. Pat. No. 6,526,161 to Yan entitled: "System and Method for Biometrics-Based Facial Feature Extraction", in U.S. Pat. No. 6,516,154 to Parulski et al., entitled: "Image Revising Camera and Method", in U.S. Pat. No. 6,504,942 to Hong et al., entitled: "Method and Apparatus for Detecting a Face-Like Region and Observer Tracking Display", in U.S. Pat. No. 6,501,857 to Gotsman et al., entitled: "Method and System for Detecting and Classifying Objects in an Image", and in U.S. Pat. No. 6,473,199 to Gilman et al., entitled: "Correcting Exposure and Tone Scale of Digital Images Captured by an Image Capture Device", which are all incorporated in their entirety for all purposes as if fully set forth herein. Another camera with human face detection means is disclosed in U.S. Pat. No. 6,940,545 to Ray et al., entitled: "Face Detecting Camera and Method", which is incorporated in its entirety for all purposes as if fully set forth herein. The image processing may use algorithms and techniques described in the book entitled: "*The Image Processing Handbook*", Sixth Edition, by John C. Russ, which is incorporated in its entirety for all purposes as if fully set forth herein. Various face detection techniques are further described in an article published by Microsoft Research on June 2010 and authored by Cha Zhang and Zhengyou Zhang, entitled: "*A Survey of Recent Advances in Face Detection*", which is incorporated in its entirety for all purposes as if fully set forth herein.

Various object detection (or recognition) schemes in general, and face detection techniques in particular, are based on using Haar-like features (Haar wavelets) instead of the usual image intensities. A Haar-like feature considers adjacent rectangular regions at a specific location in a detection window, sums up the pixel intensities in each region, and calculates the difference between these sums. This difference is then used to categorize subsections of an image. Viola-Jones object detection framework. When applied to face detection, using Haar features is based on the assumption that all human faces share some similar properties, such as the eyes region is darker than the upper-cheeks, and the nose bridge region is brighter than the eyes. The Haar-features are used by the Viola-Jones object detection framework, described in articles by Paul Viola and Michael Jones, such as the International Journal of Computer Vision 2004 article entitled: "*Robust Real-Time Face Detection*" and in the Accepted Conference on Computer Vision and Pattern Recognition 2001 article entitled: "*Rapid Object Detection using a Boosted Cascade of Simple Features*", which are both incorporated in their entirety for all purposes as if fully set forth herein.

Some face detection algorithms allow for locating the exact detected human face contours in the captured image. However, common techniques used for face detection that may be used as part of the "Face Detection" step 72, only provide the general location of the detected face in the captured image, as well as various other characterizations, such as the face size. In a "Face Region Extraction" step 73, the region or part of the captured image containing at least the detected face, is extracted for further processing, allowing for ignoring the parts of the image that do not include the detected human face, being the only element of interest. For example, the extracted region may be rectangular or square shaped, including the oval or round-shaped human face.

The captured image received in the "Receive Image" step 71 may use any color space format, such as RGB, YUV, or YCrCb. For further processing (as described below), it may be preferred to use the YCrCb color model where the color and luminosity are carried over separate channels. Thus, in a "Convert to YCrCb Format" step 74 the extracted face region is converted to the YCrCb format using conventional conversion schemes.

Skin detection refers to the process of identifying skin-colored pixels or regions in an image, typically based on a pre-determined skin-tone color. Skin detection techniques are described in an article by Ahmed Elgammal, Crystal Muang, and Dunxu Hu from the Department of Computer Science, Rutgers University, entitled: "*Skin Detection—a Short Tutorial*", in an article by Chelsia Amy Doukim, Jamal Ahmed Dargham, and Ali Chekima of the School of Engineering & Information Technology, University Malaysia Sabah, entitled: "*Comparison of Three Colour Spaces in Skin Detection*", and in an article by Vladimir Vezhnevets, Vassili Sazonov, and Alla Andreeva of the Faculty of Computational Mathematics and Cybernetics, Moscow State University, entitled: "*A Survey on Pixel-Based Skin Color Detection Techniques*", which are all incorporated in their entirety for all purposes as if fully set forth herein.

The region extracted from the completely received image in the "Face Region Extraction" step 73 typically included background and other elements that are not the detected human face. In a "Remove Non-Skin Area" step 75, the parts (or pixels) that are not part of the detected human face are removed (or marked so that are ignored in further processing) to enable analysis solely on the detected face. In one example, the removal of the non-face portion is based on a known human skin color.

In one example, a human skin may be detected using the difference of the luminance component of the reflection in distinct light wavelengths. When the image was captured during day time, as may be validated by using GPS location or time, by using recognized objects (such a a vehicle), or based on a device white balance detection, the luminance value may be used. A reflectance of a human skin in the Blue-Violet (~450 nm) and Green-Yellow (~550 nm) spectra is lower than in the Orange-Red (600-700 nm) spectra. Hence, when the YCbCr color model is used, pixels having higher luminance (Y) values associated with higher Cr values may be considered as a human skin. For example, CbCr values of (80, 160) are likely to be skin related than the values of (80, 135). In one example, a probability (or confidence level) may be associated with the human skin detection, where equal intensity relating to an equal reflectance in the 550-650 nm suggests a low probability (such as 20%) to represent human skin, while CbCr values of (80, 135) that are three times the intensity level of CbCr values of (80, 160) suggests only 5% probability of representing a human skin. In one example, a threshold is set (such as 75%), and only pixels having probability above the threshold are considered as representing a human skin.

A flow-chart 70a designated as "Face Extracting and Preparing", being part of the flow-chart 70, includes the "Face Detection" step 72, the "Face Region Extraction" step 73, the "Convert to YCrCb Format" step 74, and the "Remove Non-Skin Area" step 75. The flow chart 70a provides a method for extracting only the detected face from the received image, and representing this human face in a color model suitable for future analysis, such as using the YCrCb color model.

The quality of an extracted detected face is estimated in a flow-chart 70b being part of the flow chart 70 and designated as "QI Analysis". The QI Analysis flow chart 70b includes a "Calculate Histogram" step 76, a "Calculate Deviation+Mean" step 77, and an "Estimate Correlation" step 78.

As part of the "Calculate Histogram" step 76, the distribution of one or all of the channels of the pixels of the extracted face image with the removed non-skin/non-face parts is calculated. For example, if a channel of a pixel is represented by 8 bits representing values from 0 to 255, a histogram of the possible 256 values is to be calculated. The formed histogram may then be used to calculate the mean (average) and the standard deviation of the histogram values, as part of the "Calculate Deviation+Mean" step 77. For example where YCrCb is used, the mean and standard deviation of each of the channels of the color model, namely mean and standard deviation for the 'Y' component (respectively designated as MEAN(Y) and DEV(Y)), for the 'Cr' component (respectively designated as MEAN(Cr) and DEV(Cr)), and for the 'Cb' component (respectively designated as MEAN(Cb) and DEV(Cb)), are calculated.

Based on former analysis or statistics, an image of a human face is known to exhibit various characteristics. In one example, the distribution of colors of human faces is known to show good correlation. In the example of using the YCrCb color model, the distribution of the Cr and Cb values are expected to be similar or even to be substantially the same. Hence, comparing the various channels and measuring the correlation between the two channels provide an indication of the quality of the extracted human face image, and may be performed as part of the "Estimate Correlation" step 78. For example, the MEAN(Cr) and MEAN(Cb) may be compared, and the absolute difference may be defined as MEAN_DIFF=|MEAN(Cr)−MEAN(Cb)|. In the optimal case, MEAN_DIFF=0 denoting the same average, indicating a high level of correlation between the two channels. Higher value denotes lower correlation between the channels. Alternatively or in addition, the standard deviation of the channels is used to calculate the correlation, where DEV_REL is defined to be DEV_REL=DEV(Cr)/DEV(Cb). In the optimal case, DEV_REL=1 denoting the same standard deviation, indicating a high level of correlation between the two channels. Much higher than 1 (such as 2.5), or much lower than 1 value (such as 0.25), denotes lower correlation between the channels. The correlation may combine both using the MEAN and the DEV values, providing higher confidence measurement of the correlation. The calculated correlation may be used as a basis for the QI, where lower correlation suggests lower QI value and higher correlation suggests higher QI value. In one example, the QI may be estimated as QI=1/MEAN_DIFF, so that similar MEAN values (high correlation) result high value of QI, while distant MEAN values suggest a low value of QI. In another example of using DEV for estimating the QI, the QI may be defined as QI=|1/(DEV_REL−1)|, so that similar DEV values result in a higher value of QI, while distant MEAN values suggest a low value of QI.

As part of a "Tag/Notify" step 79, the estimated QI (based on the color tones correlation) is then associated with the image captured in the "Receive Image" step 71. In one example, the estimated QI value is added to the image file metadata, such as a 'tag', available for tagging by the user or a machine. In another example, the user is notified of the QI of the image, such as by displaying the QI value as part of the image (when displayed).

Figure 8:
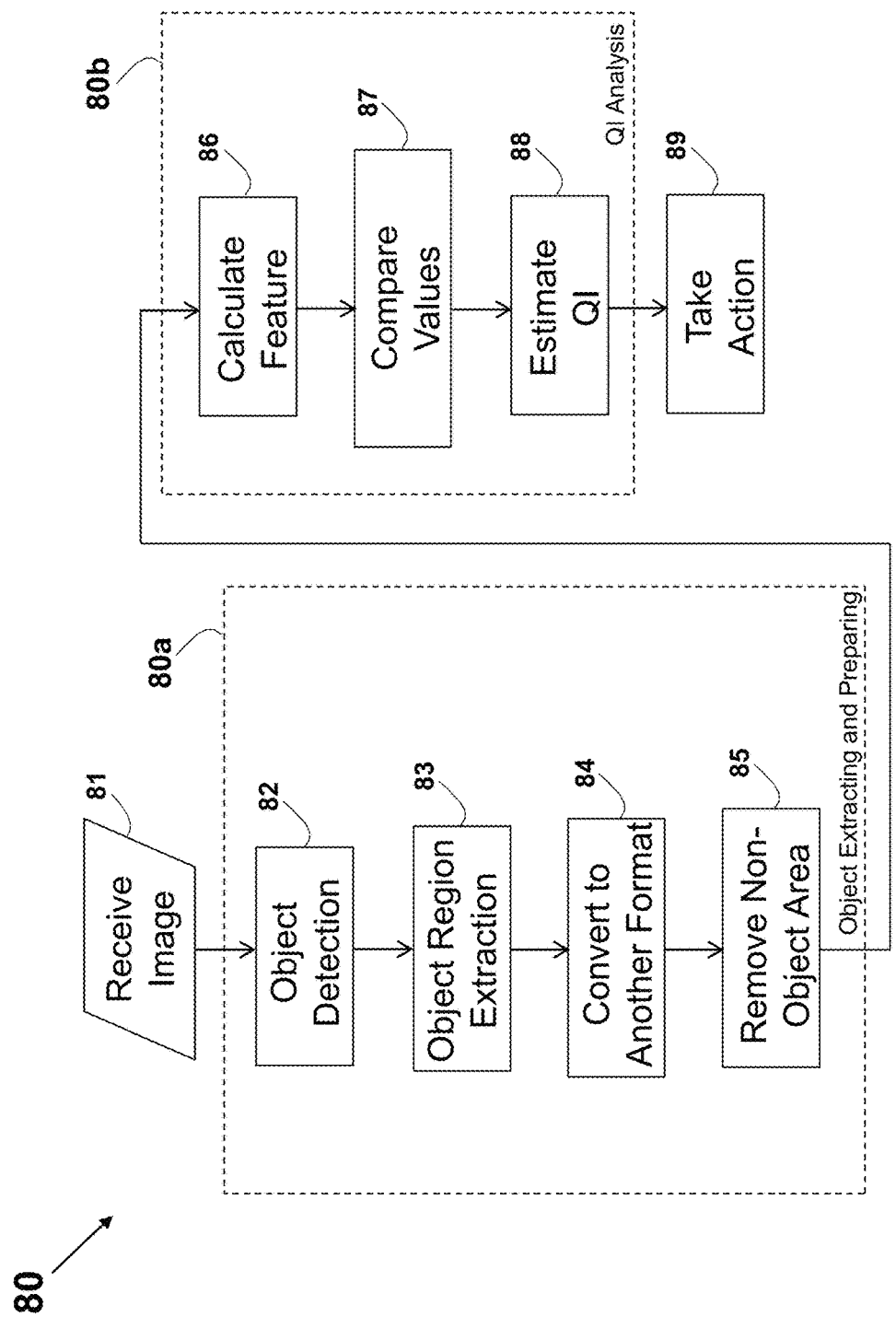
FIG. 8 illustrates schematically a flow diagram of calculating a QI for an image based on object detection and correlation analysis.

Referring now to flow chart 80 shown in FIG. 8, illustrating a generalized method for estimating and associating QI relating to an image. A captured image is received as part of a "Receive Image" step 81 (corresponding to the "Receive Image" step 71 in flow chart 70) typically from an image sensor such as the image sensor 32 that is part of the digital camera 30.

While the flow chart 70 was exampled regarding face detection in an image, the method may equally be applied to detecting and extracting any object in any image. A flow-chart 80a (corresponding to the "Face Extraction and Preparing" flow chart 70a in the flow chart 70) is part of the flow chart 80 and designated as "Object Extracting and Preparing", and includes an "Object Detection" step 82, an "Object Region Extraction" step 83, a "Convert to Another Format" step 84, and a "Remove Non-Object Area" step 85, respectively corresponding to the "Face Detection" step 72, the "Face Region Extraction" step 73, the "Convert to YCrCb Format" step 74, and the "Remove Non-Skin Area" step 75 of the flow chart 70 respectively.

Object detection (a.k.a. 'object recognition') is the process of detecting and finding semantic instances of real-world objects, typically of a certain class (such as humans, buildings, or cars), in digital images and videos. Object detection techniques are described in an article published International Journal of Image Processing (IJIP), Volume 6, Issue 6—2012, entitled: "*Survey of The Problem of Object Detection In Real Images*" by Dilip K. Prasad, and in a tutorial by A. Ashbrook and N. A. Thacker entitled: "*Tutorial: Algorithms For 2-dimensional Object Recognition*" published by the Imaging Science and Biomedical Engineering Division of the University of Manchester, which are both incorporated in their entirety for all purposes as if fully set forth herein. Various object detection techniques are based on pattern recognition, described in the Computer Vision: March 2000 Chapter 4 entitled: "*Pattern Recognition Concepts*", and in a book entitled: "*Hands-On Pattern Recognition—Challenges in Machine Learning, Volume 1*", published by Microtome Publishing, 2011 (ISBN-13:978-0-9719777-1-6), which are both incorporated in their entirety for all purposes as if fully set forth herein.

Using an object detection algorithm, the existence, type, and location of the object in the image is identified, and the associated region (including the object) is extracted in the "Object Region Extraction" step 83. It is noted that the extraction may be in the form of a new smaller image, or by marking and identifying the region in the original image. For example, the pixels not included in the region may be nullified or otherwise marked so that these pixels do not participate in any further processing. In the "Convert to Another Format" step 84, the extracted region is converted to another color model that may be preferred for further processing, such as to YCrCb format that may be better suited for estimating correlation between the Cr and the Cb components. In the case the algorithm used for the object detection in the step 82 is better or more efficient used on a specific color model (which is not the received image format), the conversion to the preferred color model as part of the "Convert to Another Format" step 84, may be performed before the "Object Detection" step 82 on the original image received in the "Receive Image" step 81. In order to isolate the object itself and remove any background or any other non-object related pixels or regions, the object known characteristics may be used, as part of the "Remove Non-Object Area" step 85.

While the flow chart 70 was exampled regarding estimating QI based on histograms and calculating the mean and the standard deviation of the channels, the method may equally be applied to any type of analysis of an extracted object region. A flow-chart 80*b* (corresponding to the "QI Analysis" flow chart 70*b* in flow chart 70) is part of the flow chart 80 and designated as well as "QI Analysis", and includes a "Calculate Feature" step 86, a "Compare Values" step 87, and an "Estimate QI" step 88, corresponding to the "Calculate Histogram" step 76, the "Calculate Deviation+Mean" step 77, and the "Estimate Correlation/QI" step 78 of flow chart 70 respectively.

One or more characteristics or features of the extracted object is used as the basis for calculating and for estimating QI. The features may be based on the characteristics or features of a specific channel, or of multiple channels of the color model, or may be based on correlation of two or more channels. Preferably, the characteristics or features relating to an optimal or ideal object are known based on prior statistics or otherwise known in the art. The extracted object region is then analyzed in order to obtain one or more values measuring or representing the characteristics or features, as part of the "Calculate Feature" step 86. The calculated values are then compared to known or expected values, as part of the "Compare Values" step 87. The QI is then calculated or estimated based on the difference between the optimal or expected values and the actually obtained values, and the differences are used to calculate the image QI in the "Estimate QI" step 88. The resulting QI is then associated with the captured image and may be used by a user or by a machine in a "Take Action" step 89, corresponding to the "Tag/Notify" step 79 in the flow chart 70. The user notification or feedback techniques described in the '690 PCT Publication are equally applicable herein as part of the "Take Action" step 89.

In a generic color model including three channels, generally referred to as A, B, C, (such as RGB), each representing a vector of the associated values, the image is defined by multiple pixels forming the image, such as a total of N pixels, where each pixel (i), (1≤i≤N) involves three values, $a_i$, $b_i$, and $c_i$ (ai, bi, ci), corresponding to the three channels. Similarly in a generic color model that includes four channels, generally referred to as A, B, C, D (such as CMYK) the image is defined by multiple pixels forming the image, such as total N pixels, where each pixel (i), (1≤i≤N) involves four values, $a_i$, $b_i$, $c_i$ and $d_i$, corresponding to the four channels. The mean (average) value associated with each channel can be calculated as:

$$MEAN(A) = \text{Average}(A) = \bar{a} = \mu a = \sum_{i=1}^{N} \frac{ai}{N}$$

$$MEAN(B) = \text{Average}(B) = \bar{b} = \mu b = \sum_{i=1}^{N} \frac{bi}{N}$$

$$MEAN(C) = \text{Average}(C) = \bar{c} = \mu c = \sum_{i=1}^{N} \frac{ci}{N}$$

The standard deviation of each channel may be calculated as:

$$DEV(A) = \sigma a = \sqrt{\frac{1}{N}\sum_{i=1}^{N}(ai-\bar{a})^2}$$

$$DEV(B) = \sigma b = \sqrt{\frac{1}{N}\sum_{i=1}^{N}(bi-\bar{b})^2}$$

$$DEV(C) = \sigma c = \sqrt{\frac{1}{N}\sum_{i=1}^{N}(ci-\bar{c})^2}$$

The mean values and the standard deviation values may be calculated as part of the "Calculate Feature" step 86 as part of the "QI Analysis" flow chart 80*b*, and may be used to estimate the QI value as part of the "Estimate QI" step 88. For example, the QI may be estimated or calculated based on the mean values, the standard deviation values, or both. The correlation may be based on two channels (out of the three or four channels), on three, or on four channels (if used). Further, the correlation may involve a linear or non-linear correlation. A correlation coefficient may be used as the basis for estimating the QI in the "Estimate QI" step 89.

In one example, the Pearson product-moment correlation coefficient is used as a measure of the degree of linear dependence between two variables, providing a measure of the linear correlation (dependence) between two variables X and Y, giving a value between +1 and −1 inclusive, where 1 is a total positive correlation, 0 is no correlation, and −1 is a total negative correlation. Pearson's correlation coefficient between two variables is defined as the covariance of the two variables divided by the product of their standard deviations.

The Pearson sample correlation coefficient (r) between two A and B channels ($r_{ab}$) may be calculated by:

$$R_{ab} = \frac{\sum_{i=1}^{N}((ai-\bar{a})(bi-\bar{b}))}{N\sigma a \sigma b},$$

and the QI is inversely dependent upon the correlation.

While the correlation was exampled to be calculated and represented using the Pearson product-moment correlation coefficient, other methods for calculating correlation may be equally used. For example, rank correlation coefficients may be used, such as Spearman's rank correlation coefficient and Kendall's rank correlation coefficient (τ), which measures the extent to which, as one variable increases, the other variable tends to increase, without requiring that increase to be represented by a linear relationship. If as the one variable increases, the other decreases, the rank correlation coefficients are negative.

Other techniques to measure correlation involve the Distance correlation, the Brownian covariance/Brownian correlation, the Randomized Dependence Coefficient, and the polychoric correlation schemes. The above and other correlation schemes that may be used are described in the JDMS 1:3539, January/February 1990 article by Richard Taylor entitled: "*Interpretation of the Correlation Coefficient: A Basic Review*", in Chapter 4 of the book named "*Practical Statistics*" entitled: *Pearson's* R, *Chi-Square,* T-*Test, and ANOVE*", and in Chapter 22 entitled: "*Correlation Coefficients*" by Dr. Rick Yount ($4^{th}$ ed. 2006), which are all incorporated in their entirety for all purposes as if fully set forth herein.

While the QI Analysis' flow chart 80*b* was described regarding analysis of the image in order to estimate a QI that relates to object detection, the analysis in general, and the calculated correlation in particular, may be used to estimate any feature or characteristic of the image as a whole, or of an extracted object with removed background after performing the "Object Extracting and Preparing" flow chart 80*a*. In one example, the correlation may be used to estimate a QI value that relates to an estimation or measurement of any factor relating to the image quality, such as image sharpness, noise, dynamic range, tone reproduction, contrast, color accuracy, distortion, vignetting, exposure accuracy, Lateral Chromatic Aberration (LCA), Lens flare, color moiré, backlighting, or artifacts.

The QI value may be calculated as part of "Estimate QI" step 88 based on the calculated correlation coefficient. In one example, the estimated correlation coefficient or the estimated QI are compared to a pre-set threshold value. An action may be taken as part of the "Take Action" step 89 if the estimated correlation coefficient or the estimated QI are above the pre-set threshold value, or alternately the action is taken if the estimated correlation coefficient or the estimated QI are below the pre-set threshold value. Further, any action described in the '690 PCT Publication may equally be used as part of the "Take Action" step 89. Further, the digital camera (such as the digital camera 30) may be controlled based on the estimated QI value itself, or based on the fact that the estimated QI is above (or below) a pre-set threshold value. For example, upon exceeding a maximum threshold or upon falling below a minimum threshold, the digital camera may automatically capture an additional image. Alternatively or in addition, the value may be used as a condition for saving the captured image to a memory, such that only captured images associated with a QI value above the minimum threshold are saved, while captured images associated with a QI value below the minimum threshold are discarded. In another example, the digital camera settings may be controlled, such as the changing the aperture size (e.g., aperture diameter), exposure time or index, focal length, exposure index, or any combination thereof. For example, the exposure index and the exposure time may be controlled in response to measured or estimated sharpness or other feature, in order to improve the captured image sharpness.

With a digital camera, the cost and effort associated with taking a photograph is negligible. Hence, in many cases, a user may take multiple consecutive pictures of a scene, so the photographer can then later select the best image of the group or arrange them in a sequence to study the transitions in detail. Many digital cameras provide 'burst' or continuous high speed shooting mode, where several photographs are captured in quick succession by either pressing or touching the shutter button or holding it down. Commonly digital cameras today are capable of capturing and recording 10-40 still images per second in burst mode, and faster rate of capture is allowed in some available digital cameras. Cameras capable of high continuous shooting rates are typically used when the subjects are in motion, as in sports photography, or where the opportunities are brief. Rather than anticipating the action precisely, photographers can simply start shooting from just before they believe the action will occur, giving a high chance of at least one frame being acceptable.

Similarly, video recording involves capturing multiple images using a fixed frame rate. The number of still pictures per unit of time of video ranges from six or eight frames per second (frame/s) for old mechanical cameras to 120 or more frames per second for new professional cameras. PAL standards (commonly used in most of Europe) and SECAM (popular in France and Russia) specify 25 frame/s, while NTSC standards (USA, Canada, Japan, etc.) specify 29.97 frames. The minimum frame rate to achieve a comfortable illusion of a moving image is about sixteen frames per second. Typically, in burst mode or in capturing video, the multi-frame shooting rate is continuous, so in the case of a rate of 10 fps (frames per second), the still images are captured every $\frac{1}{10}$ second, and a rate of 30 fps involves capturing every $\frac{1}{30}$ second.

A false positive error, or in short false positive, commonly called a "false alarm", is a result that indicates a given condition has been satisfied, when it actually has not been fulfilled. A false positive error is a type I error where the test is checking a single condition, and results in an affirmative or negative decision usually designated as "true or false". The false positive rate is the proportion of absent events that yield positive test outcomes, i.e., the conditional probability of a positive test result given an absent event. The false positive rate is equal to the significance level. The specificity of the test is equal to 1 minus the false positive rate. A false negative error, or in short false negative, is where a test result indicates that a condition failed, while it actually was successful. A false negative error is a type II error occurring in test steps where a single condition is checked for and the result can be either positive or negative. Complementarily, the false negative rate is the proportion of events that are being tested for which yield negative test outcomes with the test, i.e., the conditional probability of a negative test result given that the event being looked for has taken place.

A QI value may be associated with an image as a result of applying an image processing algorithm to that image. For example, the flow chart 70 above describes an exemplary method for estimating a QI for a human face detected in an image, and the flow chart 80 above describes an exemplary method for estimating a QI for an object detected in an image. However, the image processing algorithm may provide false negative or false positive result in the estimation or measurement due to any factor relating to the image quality, such as image sharpness, noise, dynamic range, tone reproduction, contrast, color accuracy, distortion, vignetting, exposure accuracy, Lateral Chromatic Aberration (LCA), Lens flare, color moiré, backlighting, or artifacts.

However, in the case of taking multiple images, such as by burst or video mode, the recently captured images may be used in order to reduce the false negative or false positive rates, and to improve the confidence level of the estimated QI. A QI that is estimated based on multiple (or a single) former frames is denoted as Multi-Frame QI (MFQI). For example, it may be assumed that there is a high degree of correlation between two consecutive images taken during a short period that is less than a second, such as 1/10 or 1/30 seconds apart, since most actions or scenes are not expected to quickly change. The high degree of correlation may be used when analyzing an image, by using information obtained by processing the recently former captured images.

Figure 9:
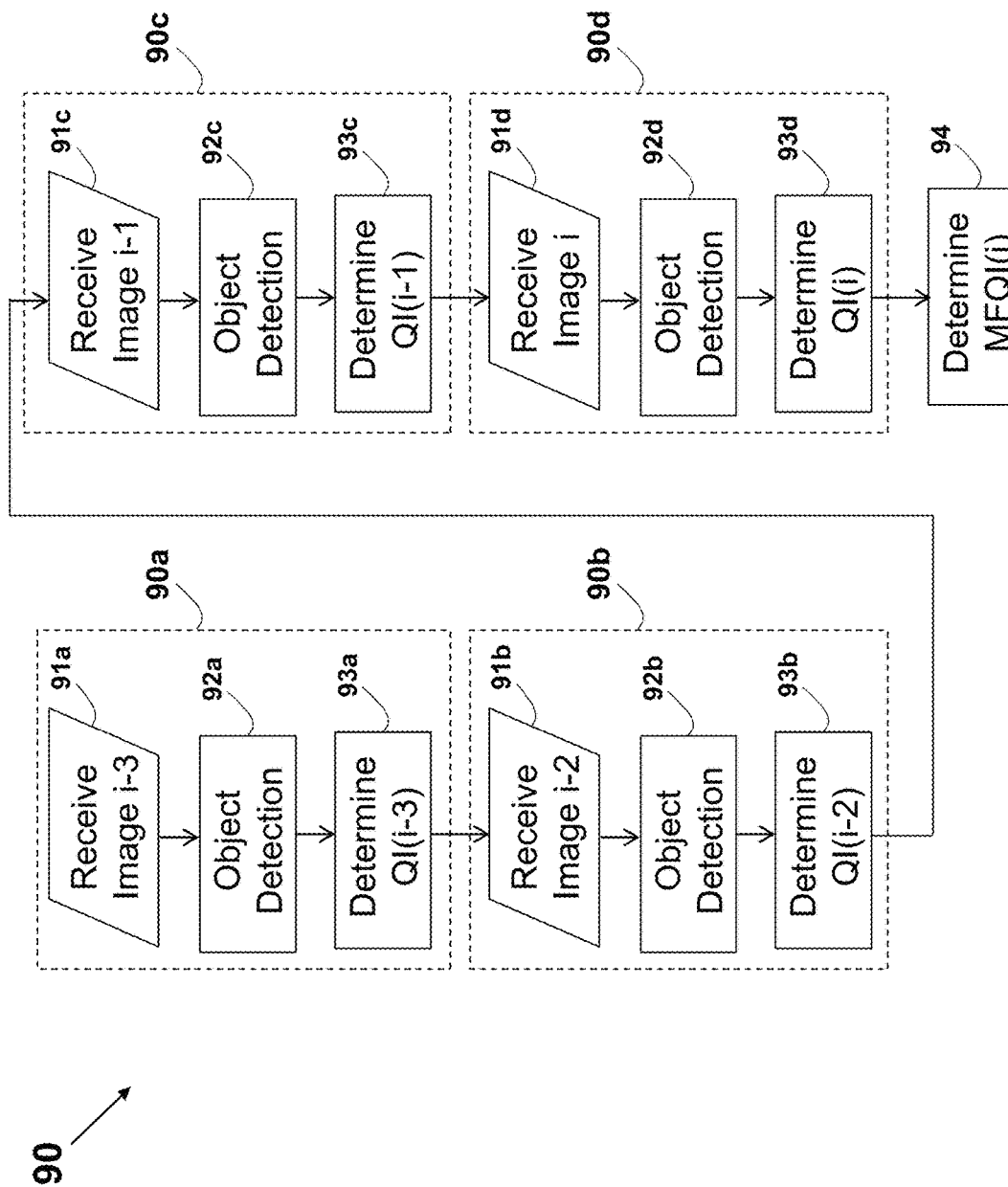
FIG. 9 illustrates schematically a flow diagram of calculating a multi-frame QI.

An example of a flow chart 90 for estimating a multi-frame QI (MFQI) for an image (i), denoted as MFQI(i), based on former three captured images, denoted as (i-3), (i-2), and (i-1), where (i-3) refers to the 'oldest' taken image and (i-1) refers to the last image captured before the current discussed (i), is shown in FIG. 9. A flow-chart 90a, being part of the flow chart 90, describes the handling of image (i-3), and includes a "Receive Image i-3" step 91a that involves taking the frame (e.g., by pressing a capture button), receiving and storing the taken image, followed by an "Object Detection" step 92a where an image processing algorithm is applied to the captured image (i-3), and based on the processing result, determining the QI of the captured image as part of a "Determine QI(i-3)" step 93a. Similarly, a flow-chart 90b, being part of the flow chart 90, describes the handling of image (i-2), and includes a "Receive Image i-2" step 91b that involves taking the frame (e.g., by pressing a capture button), receiving and storing the taken image, followed by an "Object Detection" step 92b where an image processing algorithm is applied to the captured image (i-2), and based on the processing result, determining the QI of the captured image as part of a "Determine QI(i-2)" step 93b. The image (i-1) is processed in a flow-chart 90c, being part of the flow chart 90, describes the handling of image (i-1), and includes a "Receive Image i-1" step 91c that involves taking the frame (e.g., by pressing a capture button), receiving and storing the taken image, followed by an "Object Detection" step 92c where an image processing algorithm is applied to the captured image (i-1), and based on the processing result, determining the QI of the captured image as part of a "Determine QI(i-1)" step 93c.

In a "Determine MFQI(i)" step 94, the multi-frame QI relating to image (i) is calculated, based not only on the QI value of estimated or calculated for image (i) denoted as $QI_i$, but in addition based on former images QI values, namely $QI_{i-3}$, $QI_{i-2}$, and $QI_{i-1}$. While exampled in the flow chart 90 regarding using three former images, any number of images may be equally used. For example, only the last taken frame may be used, the last two frames, or the last four images. While the image processing described in the flow chart 90 was described as object detection, for example in the "Object Detection" step 92a, any other image processing schemes may be equally applied. Further, different image processing algorithms may be used for the different former images.

In one example, a weighted arithmetic mean (average) is used for calculating the MFQI(i) as part of the "Determine MFQI(i)" step 94. A weighting factor w is associated with each QI value: a weight value $w_{i-3}$ is associated with $QI_{w-3}$, a weight value $w_{i-2}$ is associated with $QI_{i-2}$, a weight value $w_{i-1}$ is associated with $QI_{i-1}$, and a weight value $w_i$ is associated with $QI_i$. Using a weighted arithmetic mean the MFQI(i) may be calculated as:

$$MFQI(i) = \frac{QI(i-3)w(i-3) + QI(i-2)w(i-2) + QI(i-1)w(i-1) + QI(i)w(i)}{w(i-3) + w(i-2) + w(i-1) + w(i)}$$

In the general case where a total of N+1 frames is used to calculate the MFQI(i), it may be calculated as:

$$MFQI(i) = \frac{\sum_{j=0}^{N} w(i-j)QI(i-j)}{\sum_{j=0}^{N} w(i-j)}$$

In a normalized case where $\sum_{j=0}^{N} w(i-j)=1$, the calculation is simplified to be:

$$MFQI(i) = \sum_{j=0}^{N} w(i-j)QI(i-j)$$

In one example, equal weight is assigned to all frames, resulting in a simple average. In one example, a recent frame is assigned a higher weight than 'older' frame, assuming a higher correlation for later frames than in older frames. It is noted that the calculated MFQI(i) in the "Determine MFQI(i)" step 94 may be used as an alternative or in addition to the calculated QI(i), and as such may be used for taking an action, such as described in the "Tag/Notify" step 79 or in the "Take Action" step 89 described herein.

Common object detection algorithms (such as face detection algorithms) exhibit low false positive rate, hence in the case the algorithm used actually returns the object location, the probability that indeed the object (such as human faces) was detected reaches close to 100%, and hence we can assign a value of QI=100%. However, due to various impairments in the captured image, such as impacts of image sharpness, noise, dynamic range, tone reproduction, contrast, color accuracy, distortion, vignetting, exposure accuracy, Lateral Chromatic Aberration (LCA), Lens flare, color moiré, backlighting, or artifacts, the algorithm may exhibit false negative, where the object is indeed in the image, but could not be detected or located by the algorithm used. For example, a human may be shown in the image, but his face may not be detected, for example due to head pose. In such a case, the algorithm may return a value of 0% (QI=0%) as the probability of the presence of the object. In the case of multiple frames being captured rapidly and consecutively, where the object is detected in multiple consecutive frames (100% probability), and then the object is not detected in one frame (0% probability), a multi frame QI may be used to better estimate the probability of the existence of a human face in the image. Assuming N=4 and a simple average, each frame is assigned a weight factor of ¼ (1/N), and the resulting MFQI(i)=300%/4=75%. Using the same data in an example of using a weighted average, where the weight factors are $w_i$=0.4, $w_{i-1}$=0.3, $w_{i-2}$=0.2 and $w_{i-3}$=0.1, the resulting MFQI(i)=60%. In this example, the weighting factor is lowered according to the timing (or 'age') of the images, where 'older' images are being less dominant than new or 'young' ones, and thus $w_i > w_{i-1} > w_{i-2} > w_{i-3}$ . . . .

While exampled above regarding using the weighted arithmetic mean for the MFQI estimation or calculation, other schemes may equally be used. In one example, weighted geometric mean may be used, typically according to:

$$MFQI(i) = \left(\prod\nolimits_{j=0}^{N} QI(i-j)^{w(i-j)}\right)^{\frac{1}{\sum_{j=0}^{N} w(i-j)}}.$$

Similarly, weighted harmonic mean may be used, typically according to:

$$MFQI(i) = \frac{\sum_{j=0}^{N} w(i-j)}{\sum_{j=0}^{N} \frac{w(i-j)}{QI(i-j)}}.$$

While the above examples assumed linear impact of the weights, any non-linear dependency or function may be equally used.

The above examples were based on the existence of a correlation of the frames in the sequence, typically due to the short duration between their capturing (e.g., less than 1 second, less than 0.5 second, or less than 200 milliseconds). However, in some occasions the correlation may not exist. For example, in the case of object detection, the object may be located near a frame edge in one frame and absent from the frame in the next frame. Further, the object to be detected may be moving and thus forming an optical flow in the images, until reaching out of frame location. Such situation may be detected when a QI of a frame is substantially different from the QIs obtained for multiple former frames. For example, assuming a sequence where $QI_{i-3}=90$, $QI_{i-2}=87$, $QI_{i-1}=91$, and $QI_i=32$, the low QI associated with the last captured frame (i) may indicate a different scenario (e.g., a human face out of the frame), resulting no or low correlation to the former images. In such a case, calculating the MFQI(i) based only on age related weights, may result in inaccurate value. Preferably, such significantly different (non-correlated) QI value may not be used in the MFQI(i) calculation (such as assuming $w_i=0$), or may be used with a lowered weight. In the general case, instead of using the original age-only based $w_i$, a new weight $w'_i$ is used, where $w'_i=w_i*\theta$ where $\theta$ is a weight coefficient $0 \le \theta \le 1$, so that when assuming $\theta=1$, the 'age' weight is fully considered as part of the MFQI(i) calculation, and by assuming $\theta=0$, the 'age' weight is fully eliminated and not used as part of the MFQI(i) calculation. In any case, the $w_i$ in the above calculations and in the above equations is replaced with the $w'_i$, thus taking into account the weight coefficient $\theta$.

The average (mean) of the frames QI, assuming N frames denoted I=1 ... N, (N being the last frame that is under consideration) and each associated with a QI(i), may be calculated as:

$$MEAN(QI) = Average(QI) = \overline{QI} = \mu QI = \sum_{i=1}^{N} \frac{QI(i)}{N}$$

and the standard deviation may be calculated as:

$$DEV(QI) = \sigma QI = \sqrt{\frac{1}{N}\sum_{i=1}^{N}(QI(i)-\overline{QI})^2}.$$

Equally, only the former frames (i=1 ... N-1) may be used for calculating the mean and the standard deviation of former frames only, not taking into account the last frame under consideration. The weight coefficient θ may be dependent upon the 'distance' between the last frame QI value ($QI_N$) and the calculated QI average MEAN(QI), and may be represented by $|QI_N-MEAN(QI)|$. Preferably, the weight coefficient θ may be dependent upon the normalized distance between the last frame QI value ($QI_N$) and the calculated QI average MEAN(QI), represented by $$DISTANCE = \left|\frac{QI(N) - \overline{QI}}{\sigma QI}\right|.$$

A large DISTANCE value suggests a substantially different $QI_N$ value, and as such may result in a lower value for the weight coefficient θ. Conversely, a small DISTANCE value suggests a non-substantially different QIN value, and as such may result in a higher value for the weight coefficient θ. For example, DISTANCE=0 implies a value that is the same as the calculated average, thus not substantially different. In another example, DISTANCE=2 suggests a gap of two standard deviations, implying a substantially different $QI_N$ value. An example of calculating the weight coefficient θ according to the DISTANCE may be:

$$\theta = \frac{1}{1 + DISTANCE},$$

resulting the maximum θ=1 value when DISTANCE=0, and a value of θ=⅓ when DISTANCE=2. A non-continuous dependence may equally be used, such as assigning θ=1 when DISTANCE≤2 is satisfied, and θ=0 in a case where DISTANCE>2. In another example, the QIs are assumed to exhibit normal probability having an average of MEAN(QI) and standard deviation of DEV(QI), and the weight coefficient θ be equal to, or based on, the probability of the $QI_N$ value to be achieved, denoted as $\mathcal{N}(QI_N)$. The weight coefficient θ that is calculated based on the DISTANCE as described above is designated herein as θ(Distribution).

While exampled above regarding fitting the QI values to a normal (Gaussian) distribution, any other scheme of distribution fitting may equally be applied, and assuming any type of distribution. Preferably, symmetrical distribution with respect to the mean value is assumed, where the data relating to the QI values are symmetrically distributed around the mean while the frequency of occurrence of data farther away from the mean diminishes, such as the normal distribution, the logistic distribution, or the Student's t-distribution. The distribution fitting may be based on parametric methods, where the parameters of the distribution are calculated from the data series, such as the method of moments, the method of L-moments, and the Maximum Likelihood (ML) method. Alternatively or in addition, a regression-based method may be used, by using a transformation of the cumulative distribution function so that a linear relation is found between the cumulative probability and the values of the data, which may also need to be transformed, depending on the selected probability.

While in the example above it is assumed that the QI values are similar between consecutive frames, and are normally distributed, it may equally be that the QI values exhibit a trend. For example, assuming a consecutive set of QI values of 20, 25, 30, 35, 40, or 45 clearly suggest a steady linear growth of the QI values, and the next QI value is clearly predicted to be 50. In such a case, a frame associated with a $QI_N$ value that is substantially different from the predicted value, may be associated with a low value of the weight coefficient θ.

Curve fitting is the process of constructing a curve, or mathematical function that has the best fit to a series of data points, possibly subject to constraints. Curve fitting can involve either interpolation, where an exact fit to the data is required, or smoothing, in which a "smooth" function is constructed that approximately fits the data. Fitted curves can be used as an aid for data visualization, to infer values of a function where no data are available, and to summarize the relationships among two or more variables. Extrapolation refers to the use of a fitted curve beyond the range of the observed data, and is subject to a degree of uncertainty since it may reflect the method used to construct the curve as much as it reflects the observed data. Curve fitting is described in a guide entitled: "*The KaleidaGraph Guide to Curve Fitting*" and in NASA Technical Note (NATA TN D-6374) entitled: "*A Least-Square-Distance Curve-Fitting Technique*" by John Q. Howell, which are both incorporated in their entirety for all purposes as if fully set forth herein.

A curve fit may be used to fit the QI values to a first degree polynomial (linear) equation of the form y=ax+b, representing a line with slope a, where they variable represents the QI value and the x variable represents the frame number (i, i=1 . . . N). A second degree polynomial equation may be used having the form of $y=ax^2+bx+c$, or alternatively a third degree polynomial may be used having the form of $y=ax^3+bx^2+cx+d$. The equation used for the curve-fitting, may then be used for extrapolation in order to predict the value of $QI_N$, denoted herein as PREDICTED($QI_N$). In the example of a consecutive set of QI values of 20, 25, 30, 35, 40, 45 (corresponding to frames numbered 1, 2, 3, 4, 5, 6) the set fits a linear equation of y=5x+15 (a=5, b=15), and thus the next QI(7) is predicted to be PREDICTED ($QI_7$)=50. In such a case, a DISTANCE can be defined as DISTANCE=|PREDICTED($QI_N$)−$QI_N$|, and the weight coefficient θ may be calculated based on this value, where higher weight coefficient θ is assigned for a lower value of DISTANCE. The weight coefficient θ that is calculated based on curve fitting as described above is designated herein as θ(Curve-Fit). In one example, the used coefficient θ is based on the QI values by using both calculated θ(Distribution) and θ(Curve-Fit), and the combined coefficient θ, designated as θ(Fitting), is calculated as a function of both, for example using the equation: θ(Fitting)=θ(Curve-Fit)*θ(Distribution).

While the weight coefficient θ was exampled above to be estimated or calculated based on multiple consecutive frames each associated with its QI, the weight coefficient may further be estimated based on an input from a sensor. Devices (such as smartphones) are commercially available comprising both a digital camera and an environmental sensor, and the sensor output may be used to determine or impact the estimation of the weight coefficient, by sensing an environmental situation occurring while capturing a specific frame to the weighing factor that is associated to that frame. Any element capable of measuring or responding to a physical phenomenon may be used as a sensor. An appropriate sensor may be adapted for a specific physical phenomenon, such as a sensor responsive to temperature, humidity, pressure, audio, vibration, light, motion, sound, proximity, flow rate, electrical voltage, and electrical current. Further, the sensor may be any sensor described in U.S. Patent Application Publication No. 2013/0201316 to Binder et al., entitled: "System and Method for Server Based Control", which is incorporated in its entirety for all purposes as if fully set forth herein. The sensor may be semiconductor-based and may be based on MEMS technology. For example, the sensor may be an accelerometer for sensing or estimating motion, which is known to form a motion blur in the captured image. In such a case, a lower value may be assigned to the weight coefficient θ when higher motion is sensed, in order to minimize or eliminate the motion blur effected frames. The use of additional various sensors is further described in the '690 PCT Publication.

In one example, the sensor is a motion sensor, and may include one or more accelerometers, which measures the absolute acceleration or the acceleration relative to freefall. For example, one single-axis accelerometer per axis may be used, requiring three such accelerometers for three-axis sensing. The motion sensor may be a single or multi-axis sensor, detecting the magnitude and direction of the acceleration as a vector quantity, and thus can be used to sense orientation, acceleration, vibration, shock and falling. The motion sensor output may be analog or digital signals, representing the measured values. The motion sensor may be based on a piezoelectric accelerometer that utilizes the piezoelectric effect of certain materials to measure dynamic changes in mechanical variables (e.g., acceleration, vibration, and mechanical shock). Piezoelectric accelerometers commonly rely on piezoceramics (e.g., lead zirconate titanate) or single crystals (e.g., Quartz, Tourmaline). A piezoelectric quartz accelerometer is disclosed in U.S. Pat. No. 7,716,985 to Zhang et al. entitled: "Piezoelectric Quartz Accelerometer", U.S. Pat. No. 5,578,755 to Offenberg entitled: "Accelerometer Sensor of Crystalline Material and Method for Manufacturing the Same" and U.S. Pat. No. 5,962,786 to Le Traon et al. entitled: "Monolithic Accelerometric Transducer", which are all incorporated in their entirety for all purposes as if fully set forth herein. Alternatively or in addition, the motion sensor may be based on the Micro Electro-Mechanical Systems (MEMS, a.k.a. Micro-mechanical electrical system) technology. A MEMS based motion sensor is disclosed in U.S. Pat. No. 7,617,729 to Axelrod et al. entitled: "Accelerometer", U.S. Pat. No. 6,670,212 to McNie et al. entitled: "Micro-Machining" and in U.S. Pat. No. 7,892,876 to Mehregany entitled: "Three-axis Accelerometers and Fabrication Methods", which are all incorporated in their entirety for all purposes as if fully set forth herein. An example of MEMS motion sensor is LIS302DL manufactured by STMicroelectronics NV and described in Data-sheet LIS302DL STMicroelectronics NV, 'MEMS motion sensor 3-axis—±2 g/±8 g smart digital output "piccolo" accelerometer', Rev. 4, October 2008, which is incorporated in its entirety for all purposes as if fully set forth herein.

Alternatively or in addition, the motion sensor may be based on electrical tilt and vibration switch or any other electromechanical switch, such as the sensor described in U.S. Pat. No. 7,326,866 to Whitmore et al. entitled: "Omnidirectional Tilt and vibration sensor", which is incorporated in its entirety for all purposes as if fully set forth herein. An example of an electromechanical switch is SQ-SEN-200 available from SignalQuest, Inc. of Lebanon, N.H., USA, described in the data-sheet 'DATASHEET SQ-SEN-200 Omnidirectional Tilt and Vibration Sensor' Updated 2009 Aug. 3, which is incorporated in its entirety for all purposes as if fully set forth herein. Other types of motion sensors may be equally used, such as devices based on piezoelectric, piezoresistive, and capacitive components, to convert the mechanical motion into an electrical signal. Using an accelerometer to control is disclosed in U.S. Pat. No. 7,774,155 to Sato et al. entitled: "Accelerometer Based Controller", which is incorporated in its entirety for all purposes as if fully set forth herein.

A value output from the sensor that represent a physical phenomenon, or based on the sensor output, may be used for estimating the weight coefficient θ. For example, a measured value that may greatly impact the image, such as degrading the image quality (such as motion) or affect a feature of the image, may be associated with a lower value of the weight coefficient θ, in order to reduce the effect of the frame affected by the physical phenomenon. For example, in a case no motion is detected, it is reasonable to assume θ=1, while sensing a high degree of acceleration or velocity (such as above a pre-set threshold) may result in θ=0. The weight coefficient θ that is calculated based on a sensor output as described above is designated herein as θ(Sensor).

While exampled above regarding QI value representing the quality indicator associated with the respective image, the method herein may equally apply to any numerical value applied to an image. For example, any QI or other value described in the '690 PCT Publication may equally be used herein. Typically, an image processing algorithm is used to associate a numerical value to an image, defined herein as QI as well, including cases where the numerical value is not associated with any quality measure. For example, the image processing algorithm may be associated with a feature or characteristic of the captured image. In one example described above, the image processing algorithm is an object detection algorithm, such as a face detection algorithm, and the numerical value associated with an image is the probability that the image is indeed found in the captured image. In such a case, the object detection scheme may return for example a value of 100% if the object is detected in the image, or 0% in the case the algorithm failed to detect the object. In another example, the numerical value may be used to estimate image sharpness, noise, dynamic range, tone reproduction, contrast, color accuracy, distortion, vignetting, exposure accuracy, Lateral Chromatic Aberration (LCA), Lens flare, color moiré, backlighting, or artifacts. In another example, the numerical value refers to the location of an object in the image.

In the general case, the MFQI(i) may be calculated or estimated based on the values (such as QIs values) weighted according to the respective frames age, and the weighing factors may be further updated according to the weight coefficient θ, that may be based on analyzing for substantial different values of QI [θ(Distribution)], based on curve fitting in case of detecting a trend [θ(Curve-Fit)], based on a sensor output [θ(Sensor)], or a function of any combination thereof, generally denotes as θ=f[θ(Distribution), θ(Curve-Fit), θ(Sensor)]=f[θ(Distribution), θ(Fitting)]. In one example, the weights factors or the weight coefficient θ are based on, or are according to, the confidence level as described in the '690 PCT Publication.

Figure 10:
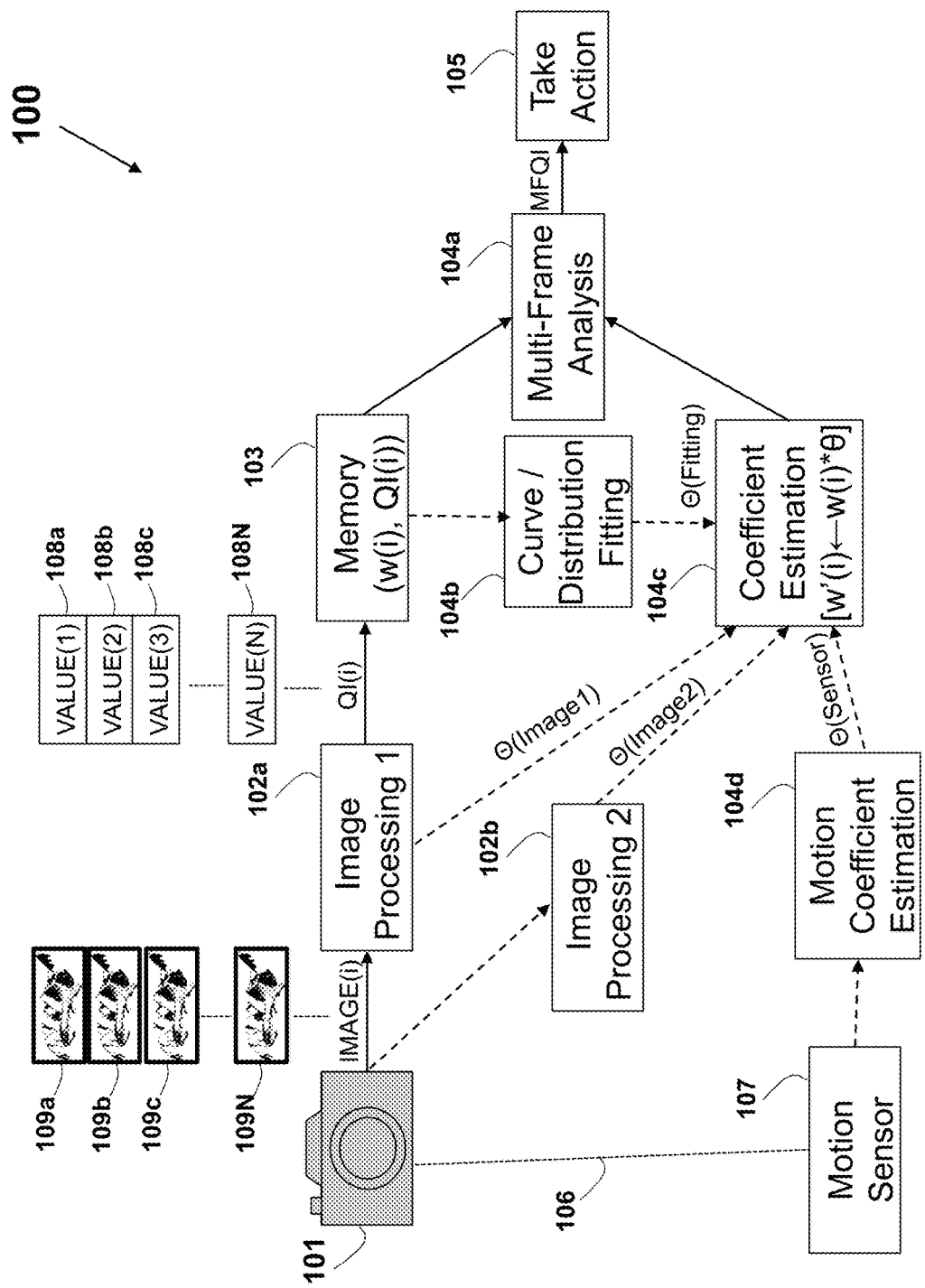
FIG. 10 illustrates schematically a flow diagram of calculating and using a multi-frame QI based on a coefficient that is calculated based on multiple factors.

A general flow chart 100 for a multi-frame analysis is shown in FIG. 10. A digital camera 101 (which may correspond with camera 30) captures N images, designated as image(1) 109a, image(2) 109b, image(3) 109c, and image (N) 109N, in a digital file format. Each image(i) (i=1 to N) is processed, preferably in real-time immediately after its capture, using image processing as part of an "Image Processing 1" step 102e, determining a value corresponding to a feature or characteristic of the respective captured image. A resulting Value(i) (such as the respective QI value) is associated with each image(i), such that a Value(1) 108a is corresponding to the image(1) 109a, a Value(2) 108b is corresponding to the image(2) 109b, a Value(3) 108c is corresponding to the image(3) 109c, and a Value(N) 108N is corresponding to the image(N) 109N. The values are stored in a memory (may correspond with the main memory 125a), also storing assigned age related weight factors $w_i$, as part of a "Memory (w(i),QI(i))" step 103. The multi-frame analysis for providing a value that is based on all of the captured images, such as the MFQI value, is performed as part of a "Multi-Frame Analysis" step 104a, and the calculated value may be used as a basis for taking an action in a "Take Action" step 105, which may correspond to the "Take Action" step 89. The analysis described in flow-chart 100 may be performed off-line at a remote location, such as a service provided over the Internet by a remote server. Preferably, the analysis described in flow-chart 100 may be performed locally, such as collocated with the digital camera, or integrated with the digital camera, and may be performed in real-time, such as before the next frame is captured in a burst mode or as part of video capturing. In one example, as part of the "Take Action" step 105, the digital camera (such as the digital camera 30) may be controlled based on multi-estimated or calculated multi-frame value (such as MFQI) itself, or based on the fact that the estimated MFQI value is above (or below) a pre-set threshold value. For example, upon exceeding a maximum threshold or upon falling below a minimum threshold, an additional image may automatically be captured by the digital camera. In another example, the digital camera settings may be controlled, such as the changing the aperture size (e.g., aperture diameter), exposure time or index, focal length, exposure index, or any combination thereof. For example, the exposure index and the exposure time may be controlled in response to measured or estimated sharpness or any other feature, in order to improve the captured image sharpness. Alternatively or in addition, the value may be used as a condition for saving the captured image to a memory, such that only captured images associated with an MFQI value above the minimum threshold are saved, while captured images associated with an MFQI value below the minimum threshold are discarded. The "Multi-Frame Analysis" step 104a may be based on, or use, a weighted mean where each value is weighted according to the weighting factors $W_i$, such as weighted arithmetic mean, weighted geometric mean, or weighted harmonic mean.

In a "Coefficient Estimation [w'(i)←w(i)*θ]" step 104c, one or more of the weighting factors $w_i$ (such as the weight $w_N$ of the last captured frame N) is modified to be $w_i*θ$, and in the case of the last frame, the multi-frame analysis in step 104a is using $w_N*θ$ instead of the original, age-based only, $w_N$. The weight coefficient θ may be calculated in a "Curve/Distribution Fitting" step 104b based on the curve-fitting of the values QI(i) (generally value(i)), as described above and designated as θ(Curve-Fit). Alternatively or in addition, the weight coefficient θ may be calculated in the "Curve/Distribution Fitting" step 104b based on the distribution of the values QI(i) (generally value(i)), as described above and designated as θ(Distribution), or may be based on both, as described above and designated as θ(Fitting).

Alternatively or in addition, the weight coefficient θ may be based on a sensor that is responsive to the digital camera 101 environment, preferably sensed at the time the respective image is captured by the digital camera 101. For example, the sensor may be a "Motion Sensor" 107 (which may be an accelerometer), which is mechanically housed with, attached, or otherwise mechanically coupled to the digital camera 101 as illustrated by the dashed line 106. The weight coefficient θ may be calculated in a "Motion Coefficient Estimation" step 104d and used in the "Curve/Distribution Fitting" step 104b based on the sensor output, as described above and designated as θ(Sensor).

Many image processing algorithms output two or more values as part of the processing. For example, an object detection algorithm may provide the location of the object in the image, as well as the probability that indeed the object was detected. In such a case, one of the values, for example the main feature of interest, may be used (as QI value) for the multi-frame calculation (such as MFQI) in the "Multi-Frame Analysis" step 104a. Simultaneously, the other value obtained from the image processing, may be used to calculate the weighting coefficient θ, shown designated as θ(Image1) in flow-chart 100. In the example of the object detection algorithm that provides both the detection probability and the location of the detected object in the image, the optical flow may be calculated as the MFQI, and the confidence/probability of the detection may be used to accordingly adjust the contribution of each image to the total multi-frame analysis.

In another example, the captured images image(1) 109a, image(2) 109b, . . . image (N) 109N are being processed by another image processing algorithm that is distinct from the image processing used for calculating the values 108a to 108N, and such a scheme is described by an "Image Processing 2" step 102b. The values obtained from this additional image processing may be used to calculate the weight coefficient θ, as designated by θ(Image 2). Hence, in the general case, the weight coefficient θ may be a function of all exampled factors, formalized as: θ=f[θ(Fitting), θ(Image 1), θ(Image 2), θ(Sensor)], and calculated as part of the "Coefficient Estimation [w'(i)←w(i)*θ]" step 104c. In one example, the total weight coefficient θ may be calculated by multiplying of all the impacting factors, namely calculated as: θ=θ(Fitting)*θ(Image 1)*θ(Image 2)*θ(Sensor).

In the "Take Action" step 66 above, an action is performed in response to the estimated value of the angle φ 59d, in the "Take Action" step 89 an action is performed in response to the estimated value of the estimated QI, and in the "Take Action" step 105 an action is performed in response to the estimated value of the estimated MFQI. The action taken in response to the estimated value (of the angle φ 59d, the QI, or the MFQI) may include control, activation, or initiation of an actuator for affecting a physical phenomenon, and the actuator and its control may be as described in U.S. Patent Application Publication No. 2013/0201316 to Binder et al., entitled: "System and Method for Server Based Control", which is incorporated in its entirety for all purposes as if fully set forth herein.

The action taken may include activation of an annunciator, that may consist of one or more visual or audible signaling component, or any other devices that indicate a status to the person. The annunciator may include a visual signaling device. For example, the annunciator may be activated when the estimated value (of the angle φ 59d, the QI, or the MFQI) exceeds a threshold that is either a minimum or a maximum one. Alternatively or in addition, the annunciator parameters may be controlled based on the estimated value. In one example, the device illuminates a visible light, such as a Light-Emitting-Diode (LED), or uses a Liquid Crystal Display (LCD) that uses changes in the reflectivity in an applied electric field. The LED may be a multi-color LED, such as LED Part No. 08L5015RGBC available from RSR Electronics, Inc. from NJ, U.S.A., described in Data-sheet Multi Color LED Part No. 08L5015RGBC, which is incorporated in its entirety for all purposes as if fully set forth herein. However, any type of visible electric light emitter such as a flashlight, an incandescent lamp, and compact fluorescent lamps can be used. Multiple light emitters may be used, and the illumination may be steady, blinking or flashing. Further, a single-state visual indicator may be used to provide multiple indications, such as by using different colors (of the same visual indicator), different intensity levels, variable duty-cycle and so forth. Further, the visual signaling may be associated with the device 10 function, theme or shape. Such conceptual relationships may include, for example, the light emitters' brightness, appearance, location, type, color and steadiness that are influenced by the estimated value. In one example, the annunciator operation is based on a numerical digital display that provides readings in the form of numbers of the estimated value of any value derived thereof. For example, the annunciator may use the quadruple digits, seven-segments, LED display Part No.: LTC-3610G available from Lite-On Electronics, Inc., and described in Lite-On Electronics, Inc., Publication BNS-OD-C131/A4 downloaded March 2011, which is incorporated in its entirety for all purposes as if fully set forth herein. Similarly, the annunciator may be based on an alphanumerical digital display that provides readings in the form of characters, including numbers, letters or symbols. For example, the annunciator may use the quadruple digits, seven-segments, LED display Part No.: LTM-8647AC available from Lite-On Electronics, Inc., and described in Lite-On Electronics, Inc., Publication BNS-OD-C131/A4 downloaded March 2011, which is incorporated in its entirety for all purposes as if fully set forth herein.

The invention can be similarly used to display word messages in a variety of fashions and formats, such as scrolling, static, bold and flashing. The device may further display visual display material beyond words and characters, such as arrows, symbols, ASCII and non-ASCII characters, still images such as pictures and video. The annunciator may use any electronic display or any other output device used for the presentation of visual information. The display may be a digital or analog video display, and may use technologies such as LCD (Liquid Crystal Display), TFT (Thin-Film Transistor), FED (Field Emission Display), CRT (Cathode Ray Tube) or any other electronic screen technology that visually shows information such as graphics or text. In many cases, an adaptor (not shown) is required in order to connect an analog display to the digital data. For example, the adaptor may convert to composite video (PAL, NTSC) or S-Video or HDTV signal. Analog displays commonly use interfaces such as composite video such as NTSC, PAL or SECAM formats. Similarly, analog RGB, VGA (Video Graphics Array), SVGA (Super Video Graphics Array), SCART, S-video and other standard analog interfaces can be used. Further, personal computer monitors, plasma or flat panel displays, CRT, DLP display or a video projector may be equally used. Standard digital interfaces such as an IEEE1394 interface, also known as FireWire™, may be used. Other digital interfaces that can be used are USB, SDI (Serial Digital Interface), FireWire, HDMI (High-Definition Multimedia Interface), DVI (Digital Visual Interface), UDI (Unified Display Interface), DisplayPort, Digital Component Video and DVB (Digital Video Broadcast).

In one example, the annunciator affects sound or music generation. The estimated value may be associated with a musical tune (or a tone) or any other single sound, which is played upon activation of the annunciator. The annunciator may include an audible signaling device (sounder) that emits audible sounds that can be heard by a human (having frequency components in the 20-20,000 Hz band). In one example, the device is a buzzer (or beeper), a chime, a whistle or a ringer. Buzzers are known in the art and are either electromechanical or ceramic-based piezoelectric sounders that make a high-pitch noise. The sounder may emit a single or multiple tones, and can be in continuous or intermittent operation. In another example, the sounder simulates the voice of a human being or generates music, typically by using an electronic circuit having a memory for storing the sounds (e.g., click, gong, music, song, voice message, etc.), a digital to analog converter to reconstruct the electrical representation of the sound and driver for driving a loudspeaker, which is an electro-acoustical transducer that converts an electrical signal to sound. An example of a greeting card providing music and mechanical movement is disclosed in U.S. Patent Application 2007/0256337 to Segan entitled: "User Interactive Greeting Card", which is incorporated in its entirety for all purposes as if fully set forth herein. A 'Gong' sound may be generated using SAE 800 from Siemens, described in Data-sheet "*Programmable Single-/Dual-/Triple-Tone Gong, SAE 800, Siemens semiconductor Group, 02.05*", which is incorporated in its entirety for all purposes as if fully set forth herein.

In one example, a human voice talking is played by the annunciator. The sound may be a syllable, a word, a phrase, a sentence, a short story or a long story, and can be based on speech synthesis or pre-recorded. Male or female voice can be used, being young or old. The text sounded is preferably associated with the shape or theme. For example, an estimated value or a quality associated value derived thereof of the system can be heard, such as 'good', 'not in field' and 'low quality'.

A tone, voice, melody or song sounder typically contains a memory storing a digital representation of the pre-recorder or synthesized voice or music, a digital to analog (D/A) converter for creating an analog signal, a speaker and a driver for feeding the speaker. An annunciator, which includes a sounder, may be based on Holtek HT3834 CMOS VLSI Integrated Circuit (IC) named '36 Melody Music Generator' available from Holtek Semiconductor Inc., headquartered in Hsinchu, Taiwan, and described with application circuits in a data sheet Rev. 1.00 dated Nov. 2, 2006, which is incorporated in their entirety for all purposes as if fully set forth herein. Similarly, the sounder may be based on EPSON 7910 series 'Multi-Melody IC' available from Seiko-Epson Corporation, Electronic Devices Marketing Division located in Tokyo, Japan, and described with application circuits in a data sheet PF226-04 dated 1998, which is incorporated in its entirety for all purposes as if fully set forth herein. A human voice synthesizer may be based on Magnevation SpeakJet chip available from Magnevation LLC and described in 'Natural Speech & Complex Sound Synthesizer' described in User's Manual Revision 1.0 Jul. 27, 2004, which is incorporated in its entirety for all purposes as if fully set forth herein. A general audio controller may be based on OPTi 82C931 'Plug and Play Integrated Audio Controller' described in Data Book 912-3000-035 Revision: 2.1 published on Aug. 1, 1997, which is incorporated in its entirety for all purposes as if fully set forth herein. Similarly, a music synthesizer may be based on YMF721 OPL4-ML2 FM+Wavetable Synthesizer LSI available from Yamaha Corporation described in YMF721 Catalog No. LSI-4MF721A20, which is incorporated in its entirety for all purposes as if fully set forth herein.

Some examples of devices that include generation of an audio signal such as music are disclosed in U.S. Pat. No. 4,496,149 to Schwartzberg entitled: "Game Apparatus Utilizing Controllable Audio Signals", in U.S. Pat. No. 4,516,260 to Breedlove et al. entitled: "Electronic Learning Aid or Game having Synthesized Speech", in U.S. Pat. No. 7,414,186 to Scarpa et al. entitled: "System and Method for Teaching Musical Notes", in U.S. Pat. No. 4,968,255 to Lee et al. entitled: "Electronic Instructional Apparatus", in U.S. Pat. No. 4,248,123 to Bunger et al. entitled: "Electronic Piano" and in U.S. Pat. No. 4,796,891 to Milner entitled: "Musical Puzzle Using Sliding Tiles", and toys with means for synthesizing human voice are disclosed in U.S. Pat. No. 6,527,611 to Cummings entitled: "Place and Find Toy", and in U.S. Pat. No. 4,840,602 to Rose entitled: "Talking Doll Responsive to External Signal", which are all incorporated in their entirety for all purposes as if fully set forth herein.

Figure 12:
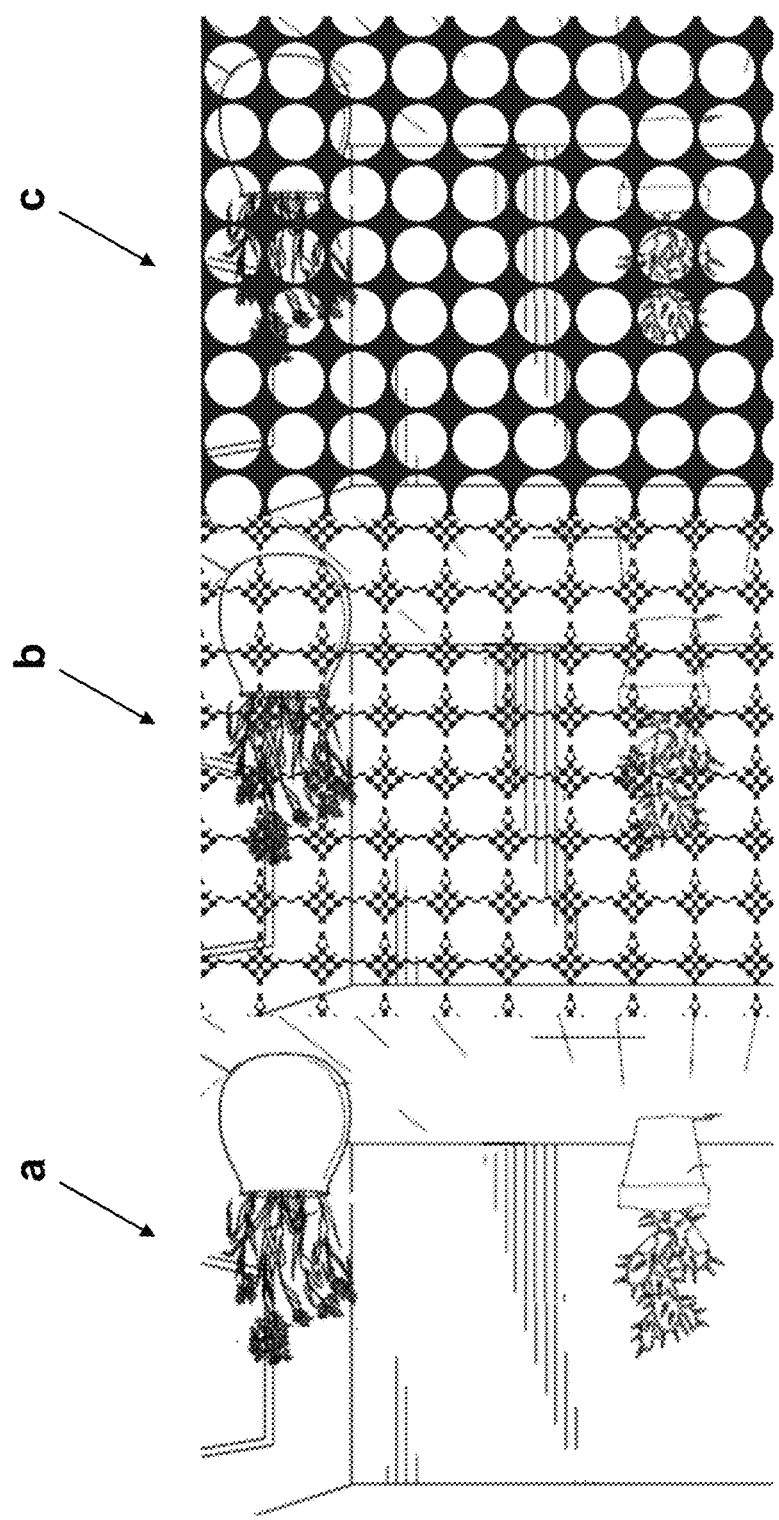
FIG. 12 depicts pictorially using a polka dots grid.

In one example, the action taken in response to the estimated value (of the angle $\phi$ 59$d$, the QI, or the MFQI) may be visualized to the user as part of the image captured, or as part of the image that is to be captured. For example, a grid may be overlaid on the image previewed on a display screen, either in real-time or off-line after an image was captured. The grid may be of a 'Polka dot' pattern, typically consisting of an array of filled or un-filled circles, commonly equally sized and spaced relatively closely in relation to their diameters. The grid pattern, such as the Polka-dot pattern, may further provide information to the viewer, such as the QI, by means of varying transparency, varying circles radius (or any other repetitive element). The grid elements, such as the circles in a Polka-dot pattern, may be transparent (or opaque) while the non-grid area (such as not in the circles in the Polka-dot example) may be blocked or non-transparent, or alternately the grid elements may be non-transparent while the rest of the image is transparent (or opaque). An example of an image is shown as a view 'a' in FIG. 12, an 'checkers'-like Polka-dot pattern (about 50% transparency) is shown as a view while non-transparent Polka-dot pattern is shown as a view 'c'.

Any part of, or the whole of, any of the methods described herein may be provided as part of, or used as, an Application Programming Interface (API), defined as an intermediary software serving as the interface allowing the interaction and data sharing between an application software and the application platform, across which few or all services are provided, and commonly used to expose or use a specific software functionality, while protecting the rest of the application. The API may be based on, or according to, Portable Operating System Interface (POSIX) standard, defining the API along with command line shells and utility interfaces for software compatibility with variants of Unix and other operating systems, such as POSIX.1-2008 that is simultaneously IEEE STD. 1003.1™—2008 entitled: "*Standard for Information Technology—Portable Operating System Interface (POSIX®) Description*", and The Open Group Technical Standard Base Specifications, Issue 7, IEEE STD. 1003.1™, 2013 Edition.

Any part of, or whole of, any of the methods described herein may be implemented by a processor such as processor 127, or by a processor that is part of a device that in integrated with a digital camera such as processor 33, and may further be used in conjunction with various devices and systems, for example a device may be a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, or a non-mobile or non-portable device.

Any device herein may serve as a client device in the meaning of client/server architecture, commonly initiating requests for receiving services, functionalities, and resources, from other devices (servers or clients). Each of the these devices may further employ, store, integrate, or operate a client-oriented (or end-point dedicated) operating system, such as Microsoft Windows® (including the variants: Windows 7, Windows XP, Windows 8, and Windows 8.1, available from Microsoft Corporation, headquartered in Redmond, Wash., U.S.A.), Linux, and Google Chrome OS available from Google Inc. headquartered in Mountain View, Calif., U.S.A. Further, each of the these devices may further employ, store, integrate, or operate a mobile operating system such as Android (available from Google Inc. and includes variants such as version 2.2 (Froyo), version 2.3 (Gingerbread), version 4.0 (Ice Cream Sandwich), Version 4.2 (Jelly Bean), and version 4.4 (KitKat)), iOS (available from Apple Inc., and includes variants such as versions 3-7), Windows® Phone (available from Microsoft Corporation and includes variants such as version 7, version 8, or version 9), or Blackberry® operating system (available from BlackBerry Ltd., headquartered in Waterloo, Ontario, Canada). Alternatively or in addition, each of the devices that are not denoted herein as servers may equally function as a server in the meaning of client/server architecture. Any one of the servers herein may be a web server using Hyper Text Transfer Protocol (HTTP) that responds to HTTP requests via the Internet, and any request herein may be an HTTP request.

Examples of web browsers include Microsoft Internet Explorer (available from Microsoft Corporation, headquartered in Redmond, Wash., U.S.A.), Google Chrome which is a freeware web browser (developed by Google, headquartered in Googleplex, Mountain View, Calif., U.S.A.), Opera™ (developed by Opera Software ASA, headquartered in Oslo, Norway), and Mozilla Firefox® (developed by Mozilla Corporation headquartered in Mountain View, Calif., U.S.A.). The web-browser may be a mobile browser, such as Safari (developed by Apple Inc. headquartered in Apple Campus, Cupertino, Calif., U.S.A), Opera Mini™ (developed by Opera Software ASA, headquartered in Oslo, Norway), and Android web browser.

Any device herein may be integrated with part or an entire appliance. The appliance primary function may be associated with food storage, handling, or preparation, such as microwave oven, an electric mixer, a stove, an oven, or an induction cooker for heating food, or the appliance may be a refrigerator, a freezer, a food processor, a dishwashers, a food blender, a beverage maker, a coffeemaker, or an iced-tea maker. The appliance primary function may be associated with environmental control such as temperature control, and the appliance may consist of, or may be part of, an HVAC system, an air conditioner or a heater. The appliance primary function may be associated with cleaning, such as a washing machine, a clothes dryer for cleaning clothes, or a vacuum cleaner. The appliance primary function may be associated with water control or water heating. The appliance may be an answering machine, a telephone set, a home cinema system, a HiFi system, a CD or DVD player, an electric furnace, a trash compactor, a smoke detector, a light fixture, or a dehumidifier. The appliance may be a handheld computing device or a battery-operated portable electronic device, such as a notebook or laptop computer, a media player, a cellular phone, a Personal Digital Assistant (PDA), an image processing device, a digital camera, or a video recorder. The integration with the appliance may involve sharing a component such as housing in the same enclosure, sharing the same connector such as sharing a power connector for connecting to a power source, where the integration involves sharing the same connector for being powered from the same power source. The integration with the appliance may involve sharing the same power supply, sharing the same processor, or mounting onto the same surface.

The steps described herein may be sequential, and performed in the described order. For example, in a case where a step is performed in response to another step, or upon completion of another step, the steps are executed one after the other. However, in case where two or more steps are not explicitly described as being sequentially executed, these steps may be executed in any order or may be simultaneously performed. Two or more steps may be executed by two different network elements, or in the same network element, and may be executed in parallel using multiprocessing or multitasking.

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions causes the processor to perform the one or more of the methods or steps described herein.

The arrangements and methods described herein may be implemented using hardware, software or a combination of both. The term "software integration" or any other reference to the integration of two programs or processes herein, is used herein to include, but not limited to, software components (e.g., programs, modules, functions, processes, etc.) that are (directly or via another component) combined, working or functioning together or form a whole, commonly for sharing a common purpose or set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "hardware integration" or integration of hardware components is used herein to include, but not limited to, hardware components that are (directly or via another component) combined, working or functioning together or form a whole, commonly for sharing a common purpose or set of objectives. Such hardware integration can take the form of sharing the same power source (or power supply) or sharing other resources, exchanging data or control (e.g., by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled with the same software or hardware. The term "integration" herein is used herein to include as applicable, but not limited to, a software integration, a hardware integration, or any combination thereof.

Any networking protocol may be utilized for exchanging information between the network elements (e.g., clients, and servers) within the network (such as the Internet 22). For example, it is contemplated that communications can be performed using TCP/IP. Generally, HTTP and HTTPS are utilized on top of TCP/IP as the message transport envelope. These two protocols are able to deal with firewall technology better than other message management techniques. However, partners may choose to use a message-queuing system instead of HTTP and HTTPS if greater communications reliability is needed. A non-limiting example of a message queuing system is IBM's MQ-Series or the Microsoft Message Queue (MSMQ). The system described hereinafter is suited for both HTTP/HTTPS, message-queuing systems, and other communications transport protocol technologies. Furthermore, depending on the differing business and technical requirements of the various partners within the network, the physical network may embrace and utilize multiple communication protocol technologies.

The term "port" refers to a place of access to a device, electrical circuit or network, where energy or signal may be supplied or withdrawn. The term "interface" of a networked device refers to a physical interface, a logical interface (e.g., a portion of a physical interface or sometimes referred to in the industry as a sub-interface—for example, such as, but not limited to a particular VLAN associated with a network interface), and/or a virtual interface (e.g., traffic grouped together based on some characteristic—for example, such as, but not limited to, a tunnel interface). As used herein, the term "independent" relating to two (or more) elements, processes, or functionalities, refers to a scenario where one does not affect nor preclude the other. For example, independent communication such as over a pair of independent data routes means that communication over one data route does not affect nor preclude the communication over the other data routes.

Some embodiments may be used in conjunction with various devices, network elements, and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

As used herein, the terms "program", "programmable", and "computer program" are meant to include any sequence or human or machine cognizable steps, which perform a function. Such programs are not inherently related to any particular computer or other apparatus, and may be rendered in virtually any programming language or environment including, for example, C/C++, Fortran, COBOL, PASCAL, assembly language, markup languages (e.g., HTML, SGML, XML, VoXML), and the likes, as well as object-oriented environments such as the Common Object Request Broker Architecture (CORBA), Java™ (including J2ME, Java Beans, etc.) and the likes, as well as in firmware or other implementations. Generally, program modules include routines, programs, objects, components, data structures, and the like, that perform particular tasks or implement particular abstract data types. The term "application program" (also referred to as 'application', 'software application', or 'application software') is used herein to include, but not limited to, a computer program designed to perform a specific function directly for a user, or for another application program. Application software is typically a set of one or more programs designed to carry out operations for a specific application. Commonly, an application software is dependent on system software that manages and integrates computer capabilities, but does not directly perform tasks that benefit the user, such as an operating system, to execute. Examples of types of application software may include accounting software, media players, and office suites. Applications may be bundled with the computer and its system software, or may be published separately, and further may be developed and coded as a proprietary, or as an open-source, software. Most applications are designed to help people perform an activity.

The terms "task" and "process" are used generically herein to describe any type of running programs, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing the value—the value must be obtained prior to processing it, although some of the associated processing may be performed prior to, concurrently with, and/or after the read operation). Where certain process steps are described in a particular order or where alphabetic and/or alphanumeric labels are used to identify certain steps, the embodiments are not limited to any particular order of carrying out such steps. In particular, the labels are used merely for convenient identification of steps and are not intended to imply, specify or require a particular order for carrying out such steps. Furthermore, other embodiments may use more or fewer steps than those discussed herein. They may also be practiced in distributed computing environments where tasks are performed by remote processing devices that are linked through a communications network. In a distributed computing environment, program modules may be located in both local and remote memory storage devices.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed, upon review of the present disclosure.

All publications, standards, patents, and patent applications cited in this specification are incorporated herein by reference as if each individual publication, patent, or patent application were specifically and individually indicated to be incorporated by reference and set forth in its entirety herein.

The invention claimed is:

1. A method for controlling a first camera by estimating the angular deviation between a person gaze direction and a digital camera line of sight, for use with a device including a first digital camera having a first center line of sight and a second digital camera having a second center line of sight that is parallel and opposing the first center line of sight, the method comprising the steps of:
   capturing an image to an image file by the second digital camera;
   detecting a human face in the image by using a face detection algorithm;
   estimating an angular deviation α between the second center line of sight and an imaginary line from the second camera to the detected human face based on the captured image;
   estimating an angular deviation β between the imaginary line from the second camera to the detected face and the human face gaze direction based on the captured image;
   estimating an angular deviation φ between the first center line of sight and the human face gaze direction based on the estimated angular deviation α and the estimated angular deviation β; and
   initiating, controlling, stopping, or inhibiting an action is response to the value of the estimated angular deviation φ.

2. The method according to claim 1 wherein the step of estimating of the angular deviation α includes estimating a horizontal angular deviation between the second horizontal center line of sight and the horizontally detected human face; and wherein the step of estimating of the angular deviation β, includes estimating the horizontal angular deviation between the horizontal line of sight to the detected face and the horizontal human face gaze direction.

3. The method according to claim 1 wherein the step of estimating of the angular deviation α includes estimating an vertical angular deviation between the second vertical center line of sight and the horizontally detected human face; and wherein the step of estimating of the angular deviation β, includes estimating the vertical angular deviation between the vertical line of sight to the detected face and the vertical human face gaze direction.

4. A non-transitory tangible computer readable storage media comprising code to perform the steps of the method of claim 1.

5. The device housed in a single enclosure and comprising in the single enclosure the first and second digital cameras, a memory for storing computer executable instructions, and a processor for executing the instructions, the processor configured by the memory to perform acts comprising the method of claim 1.

6. The device according to claim 5 wherein the single enclosure is a portable or a hand-held enclosure and the device is battery-operated.

7. The device according to claim 5 wherein the device is a notebook, a laptop computer, a media player, a cellular phone, a Personal Digital Assistant (PDA), or an image processing device.

8. The method according to claim 1 wherein the angular deviation α is estimated to be a set value.

9. The method according to claim 8 wherein the set value is 30°, 45°, or 60°.

10. The method according to claim 1 wherein the angular deviation α is estimated based on the detected face location in the captured image.

11. The method according to claim 10 wherein the angular deviation α is estimated based on the detected face location deviation from the center of the image.

12. The method according to claim 11 wherein the angular deviation α is calculated based on the equation α=γ*(DEV/HD), wherein DEV is the detected face location horizontal deviation from the center of the image, HD is the total horizontal distance of the captured image, and γ is the horizontal angular field of view of the second camera.

13. The method according to claim 11 wherein the angular deviation α is calculated based on the equation α=γ*(DEV/HD), wherein DEV is the detected face location vertical deviation from the center of the image, HD is the total vertical distance of the captured image, and γ is the vertical angular field of view of the second camera.

14. The method according to claim 1 wherein the step of estimating the angular deviation β, is based on applying a human gaze direction estimation algorithm on the captured image.

15. The method according to claim 14 wherein the human gaze direction estimation algorithm is based on, or using, eye detection, or eye tracking.

16. The method according to claim 14 wherein the human gaze direction estimation algorithm is based on, or using, head pose detection.

17. The method according to claim 16 wherein the human gaze direction estimation algorithm is further based on, or using, eye detection, or eye tracking.

18. The method according to claim 14 wherein the human gaze direction estimation algorithm is further based on, or using, facial landmarks detection.

19. The method according to claim 14 wherein the human gaze direction estimation algorithm is further based on, or using, detection of one or more human face parts.

20. The method according to claim 19 wherein the human face parts include nose, right nostril, left nostril, right cheek, left cheek, right eye, left eye, right ear, or left ear.

21. The method according to claim 19 wherein the angular deviation β, is estimated based on the detected human face parts.

22. The method according to claim 21 wherein in response to detecting both a right ear and a left ear, the angular deviation β, is estimated to be 0°.

23. The method according to claim 21 wherein in response to detecting a right ear, a left eye, and a right eye, and not detecting a left ear, the angular deviation β, is estimated to be 30°.

24. The method according to claim 21 wherein in response to detecting only a right ear and a right eye, and not detecting a left ear and a left eye, the angular deviation β, is estimated to be 90°.

25. The method according to claim 14 wherein the device further comprises a third digital camera having a third center line of sight that is parallel and opposing to the first center line of sight, the method further comprising the steps of:
    capturing an additional image to an additional image file by the third digital camera; and
    forming a 3D representation of the detected human face by combining the captured image and the additional captured image; and
    wherein the step of estimating the angular deviation β, includes analyzing the formed 3D human face representation.

26. The method according to claim 1 wherein the image file is in a format that is according to, based on, or consists of Portable Network Graphics (PNG), Graphics Interchange Format (GIF), Joint Photographic Experts Group (JPEG), Windows bitmap (BMP), Exchangeable image file format (Exif), Tagged Image File Format (TIFF), or Raw Image Formats (RIF).

27. The method according to claim 1 wherein the angular deviation φ is calculated as φ=β−α.

28. The method according to claim 1 wherein the action comprises controlling the first camera.

29. The method according to claim 28 wherein the controlling of the first digital camera includes changing a setting of the first digital camera.

30. The method according to claim 28 wherein the controlling of the first digital camera includes saving an image captured by the first camera in a memory.

31. The method according to claim 1 for use with a maximum threshold value or a minimum threshold value, and wherein the method further comprising the step of respectively comparing the angular deviation φ to the maximum or minimum threshold.

32. The method according to claim 31 further comprising the step of respectively initiating, stopping, controlling, or inhibiting the action if the value of the angular deviation φ is higher than the maximum value or is lower than the minimum value.

33. The method according to claim 32 further comprising the step of respectively initiating, stopping, controlling, or inhibiting the action if the value of the angular deviation φ is higher than the maximum value or is lower than the minimum value for a time interval.

34. The method according to claim 33 wherein the time interval is 0.5, 1, 2, or 3 seconds.

35. The method according to claim 1 wherein the device further includes a visual annunciator comprising a visual signaling component, and wherein the taking an action comprises activating or controlling the visual annunciator.

36. The method according to claim 35 wherein the visual signaling component is a visible light emitter.

37. The method according to claim 36 wherein the visible light emitter is a semiconductor device, an incandescent lamp or fluorescent lamp.

38. The method according to claim 36 wherein the visible light emitter is adapted for a steady illumination and for blinking in response to the value of the estimated angular deviation φ.

39. The method according to claim 36 wherein the illumination level of the visible light emitter is in response to the value of the estimated angular deviation.

40. The method according to claim 36 wherein the visible light emitter location, type, color, or steadiness is in response to the value of the estimated angular deviation φ.

41. The method according to claim 36 wherein the visible light emitter is a numerical or an alphanumerical display for displaying a value corresponding to the value of the estimated angular deviation.

42. The method according to claim 41 wherein the visible light emitter is based on one out of LCD (Liquid Crystal Display), TFT (Thin-Film Transistor), FED (Field Emission Display) or CRT (Cathode Ray Tube).

43. The method according to claim 1 wherein the device further includes an audible annunciator comprising an audible signaling component for emitting a sound, and wherein the taking an action comprises activating or controlling the audible annunciator.

44. The method according to claim 43 wherein the audible signaling component comprising electromechanical or piezoelectric sounder.

45. The method according to claim 44 wherein the audible signaling component comprising a buzzer, a chime or a ringer.

46. The method according to claim 43 wherein the audible signaling component comprising a loudspeaker and the device further comprising a digital to analog converter coupled to the loudspeaker.

47. The method according to claim 43 wherein the audible signaling component is operative to generate a single or multiple tones.

48. The method according to claim 43 wherein the sound emitted from the audible signaling component is in response to the value of the estimated angular deviation cp.

49. The method according to claim 48 wherein the volume, type, steadiness, pitch, rhythm, dynamics, timbre, or texture of the sound emitted from the audible signaling component is in response to the value of the estimated angular deviation φ.

50. The method according to claim 43 wherein the sound emitted from the audible signaling component is a human voice talking.

51. The method according to claim 50 wherein the sound is a syllable, a word, a phrase, a sentence, a short story or a long story in response to the value of the estimated angular deviation φ.

52. A device for controlling a camera operation based on image processing of an image captured by another camera, the device comprising:
    a first digital camera having a first center line of sight;
    a second digital camera having a second center line of sight that is parallel and opposing to the first center line of sight, and configured to capturing an image to an image file;
    a memory for storing computer executable instructions and for storing the image file;
    a processor for executing the instructions, the processor coupled to the memory and to the first and second digital cameras, and configured by the memory for detecting a human face in the image by using a face detection algorithm and for estimating an angular deviation φ between the first center line of sight and a human face gaze direction based on an estimated angular deviation α and an estimated angular deviation β;

a control port coupled to the processor for outputting a control signal in response to the value of the estimated angular deviation φ; and a single portable or hand-held enclosure housing the first and second digital cameras, the memory, the processor, and the control port, wherein the angular deviation α is defined between the second center line of sight and an imaginary line from the second camera to the detected human face, and the angular deviation β is defined between the imaginary line from the second camera to the detected face and the human face gaze direction.

53. The device according to claim 52 wherein the angular deviation α is defined between the second horizontal center line of sight and a horizontal imaginary line from the second camera to the detected human face, and the angular deviation β, is defined between the horizontal imaginary line from the second camera to the detected face and the horizontal human face gaze direction.

54. The device according to claim 52 wherein the angular deviation α is defined between the second vertical center line of sight and a vertical imaginary line from the second camera to the detected human face, and the angular deviation β, is defined between the vertical imaginary line from the second camera to the detected face and the vertical human face gaze direction.

55. The device according to claim 52 wherein the device is a notebook, a laptop computer, a media player, a cellular phone, a Personal Digital Assistant (PDA), or an image processing device.

56. The device according to claim 52 wherein the angular deviation α is estimated by the processor to be a set value.

57. The device according to claim 56 wherein the set value is 30°, 45°, or 60°.

58. The device according to claim 52 wherein the angular deviation α is estimated by the processor based on the detected face location in the captured image.

59. The device according to claim 58 wherein the angular deviation α is estimated by the processor based on the detected face location deviation from the center of the image.

60. The device according to claim 59 wherein the angular deviation α is calculated by the processor based on the equation α=γ*(DEV/HD), wherein DEV is the detected face location horizontal deviation from the center of the image, HD is the total horizontal distance of the captured image, and γ is the horizontal angular field of view of the second camera.

61. The device according to claim 59 wherein the angular deviation α is calculated by the processor based on the equation α=γ*(DEV/HD), wherein DEV is the detected face location vertical deviation from the center of the image, HD is the total vertical distance of the captured image, and γ is the vertical angular field of view of the second camera.

62. The device according to claim 52 wherein the angular deviation β, by the processor is estimated based on applying a human gaze direction estimation algorithm on the captured image.

63. The device according to claim 62 wherein the human gaze direction estimation algorithm is based on, or using, eye detection or eye tracking.

64. The device according to claim 62 wherein the human gaze direction estimation algorithm is based on, or using, head pose detection.

65. The device according to claim 64 wherein the human gaze direction estimation algorithm is further based on, or using, eye detection or eye tracking.

66. The device according to claim 62 wherein the human gaze direction estimation algorithm is further based on, or using, facial landmarks detection.

67. The device according to claim 62 wherein the human gaze direction estimation algorithm is further based on, or using, detection of one or more human face parts.

68. The device according to claim 67 wherein the human face parts include nose, right nostril, left nostril, right cheek, left cheek, right eye, left eye, right ear, or left ear.

69. The device according to claim 67 wherein the angular deviation β is estimated based on the detected human face parts.

70. The device according to claim 69 wherein in response to detecting both a right ear and a left ear, the angular deviation β is estimated to be 0°.

71. The device according to claim 69 wherein in response to detecting a right ear, a left eye, and a right eye, and not detecting a left ear, the angular deviation β is estimated to be 30°.

72. The device according to claim 69 wherein in response to detecting only a right ear and a right eye, and not detecting a left ear and a left eye, the angular deviation β is estimated to be 90°.

73. The device according to claim 62 further comprising a third digital camera coupled to the processor for capturing an additional image to an additional image file, the third digital camera having a third center line of sight that is parallel and opposing to the first center line of sight, and wherein estimating the angular deviation β is estimated by the processor based on analyzing a 3D human face representation that is formed by combining the captured image and the additional captured image.

74. The device according to claim 52 wherein the image file is in a format that is according to, based on, or consists of Portable Network Graphics (PNG), Graphics Interchange Format (GIF), Joint Photographic Experts Group (JPEG), Windows bitmap (BMP), Exchangeable image file format (Exif), Tagged Image File Format (TIFF), or Raw Image Formats (RIF).

75. The device according to claim 52 wherein the angular deviation φ is calculated as φ=β−α.

76. The device according to claim 52 wherein the control port is coupled to control the first digital camera.

77. The device according to claim 76 wherein the control port is (Original) coupled to control the first digital camera by changing a setting of the first digital camera.

78. The device according to claim 52 for use with a maximum threshold value or a minimum threshold value, and wherein the control signal is produced as a response to comparing the angular deviation φ to the maximum or minimum threshold.

79. The device according to claim 78 wherein the control signal is produced in response to the value of the angular deviation φ being higher than the maximum value or being lower than the minimum value.

80. The device according to claim 52 further comprising a visual annunciator comprising a visual signaling component coupled to the control port for activating or controlling the visual annunciator.

81. The device according to claim 80 wherein the visual signaling component is a visible light emitter.

82. The device according to claim 81 wherein the visible light emitter is a semiconductor device, an incandescent lamp or fluorescent lamp.

83. The device according to claim 81 wherein the visible light emitter is adapted for a steady illumination and for blinking in response to the value of the estimated angular deviation φ.

84. The device according to claim 81 wherein the illumination level of the visible light emitter is in response to the value of the estimated angular deviation.

85. The device according to claim 81 wherein the visible light emitter location, type, color, or steadiness is in response to the value of the estimated angular deviation φ.

86. The device according to claim 81 wherein the visible light emitter is a numerical or an alphanumerical display for displaying a value corresponding to the value of the estimated angular deviation.

87. The device according to claim 86 wherein the visible light emitter is based on one out of LCD (Liquid Crystal Display), TFT (Thin-Film Transistor), FED (Field Emission Display) or CRT (Cathode Ray Tube).

88. The device according to claim 52 further comprising an audible annunciator comprising an audible signaling component for emitting a sound coupled to the control port for activating or controlling the audible annunciator.

89. The device according to claim 88 wherein the audible signaling component comprising electromechanical or piezoelectric sounder.

90. The device according to claim 89 wherein the audible signaling component comprising a buzzer, a chime or a ringer.

91. The device according to claim 88 wherein the audible signaling component comprising a loudspeaker and the device further comprising a digital to analog converter coupled to the loudspeaker.

92. The device according to claim 88 wherein the audible signaling component is operative to generate a single or multiple tones.

93. The device according to claim 88 wherein the sound emitted from the audible signaling component is in response to the value of the estimated angular deviation φ.

94. The device according to claim 93 wherein the volume, type, steadiness, pitch, rhythm, dynamics, timbre, or texture of the sound emitted from the audible signaling component is in response to the value of the estimated angular deviation φ.

95. The device according to claim 88 wherein the sound emitted from the audible signaling component is a human voice talking.

96. The device according to claim 95 wherein the sound is a syllable, a word, a phrase, a sentence, a short story or a long story in response to the value of the estimated angular deviation φ.

* * * * *

UNITED STATES PATENT AND TRADEMARK OFFICE
CERTIFICATE OF CORRECTION

PATENT NO. : 9,661,215 B2  
APPLICATION NO. : 15/028852  
DATED : May 23, 2017  
INVENTOR(S) : Ishay Sivan It is certified that error appears in the above-identified patent and that said Letters Patent is hereby corrected as shown below:

In the Claims

In Column 65, Line 32, Claim 1, reads "the angular"; should read -- an angular --.
In Column 65, Line 32, Claim 1, reads "a person gaze direction"; should read -- a human gaze direction --.
In Column 65, Line 54, Claim 1, reads "an action is response"; should read -- an action in response --.
In Column 65, Line 66, Claim 3, reads "an vertical angular"; should read -- a vertical angular --.
In Column 66, Line 1, Claim 3, reads "horizontally detected"; should read -- vertical detected --.
In Column 66, Line 9, Claim 5, reads "The device"; should read -- A device --.
In Column 66, Line 34, Claim 12, reads "the equation"; should read -- an equation --.
In Column 66, Line 41, Claim 13, reads "the equation"; should read -- an equation --.
In Column 66, Line 47, Claim 14, the "," after the "β" should be removed.
In Column 67, Line 34, Claim 26, reads "Formats (RIF)."; should read -- Format (RIF). --.
In Column 68, Line 28, Claim 44, the word "an" should be added after the word "comprising".
In Column 68, Line 42, Claim 48, reads "cp"; should read -- φ --.
In Column 69, Line 49, Claim 60, reads "the equation"; should read -- an equation --.
In Column 69, Line 56, Claim 61, reads "the equation"; should read -- an equation --.
In Column 69, Line 62, Claim 62, the "," after the "β" should be removed.
In Column 70, Line 45, Claim 74, reads "Formats (RIF)."; should read -- Format (RIF). --.
In Column 70, Line 51, Claim 77, the word "(Original)" after the word "is" should be removed.
In Column 71, Line 10, Claim 84, reads "the estimated angular"; should read -- an estimated angular --.
In Column 71, Line 13, Claim 85, reads "cp"; should read -- φ --.
In Column 71, Line 26, Claim 89, the word "an" should be added after the word "comprising".
In Column 72, Line 1, Claim 90, reads "according to claim 89"; should read -- according to claim 88 --.

Signed and Sealed this  
Sixth Day of February, 2018

Joseph Matal  
*Performing the Functions and Duties of the*  
*Under Secretary of Commerce for Intellectual Property and*  
*Director of the United States Patent and Trademark Office*